(12) United States Patent
Yamazaki et al.

(10) Patent No.: US 8,988,337 B2
(45) Date of Patent: Mar. 24, 2015

(54) DRIVING METHOD OF LIQUID CRYSTAL DISPLAY DEVICE

(75) Inventors: Shunpei Yamazaki, Setagaya (JP); Jun Koyama, Sagamihara (JP)

(73) Assignee: Semiconductor Energy Laboratory Co., Ltd., Atsugi-shi, Kanagawa-ken (JP)

(*) Notice: Subject to any disclaimer, the term of this patent is extended or adjusted under 35 U.S.C. 154(b) by 286 days.

(21) Appl. No.: 13/165,977

(22) Filed: Jun. 22, 2011

(65) Prior Publication Data

US 2012/0002132 A1  Jan. 5, 2012

(30) Foreign Application Priority Data

Jul. 2, 2010  (JP) ................................ 2010-152016

(51) Int. Cl.
*G09G 3/36* (2006.01)
*G09G 3/34* (2006.01)
*G02F 1/1335* (2006.01)

(52) U.S. Cl.
CPC .............. *G09G 3/3413* (2013.01); *G09G 3/342* (2013.01); *G09G 3/3648* (2013.01); *G09G 3/3677* (2013.01); *G09G 3/3688* (2013.01); G02F 2001/133622 (2013.01); G09G 2310/0235 (2013.01); G09G 2310/024 (2013.01); G09G 2320/0242 (2013.01)
USPC ........................................................ 345/102

(58) Field of Classification Search
CPC .................... G09G 2310/0235; G09G 3/3413; G09G 2320/0242; G09G 3/32; G02B 6/0028; A61K 6/083; C09D 129/04
See application file for complete search history.

(56) References Cited

U.S. PATENT DOCUMENTS

| | | | |
|---|---|---|---|
| 5,121,233 A * | 6/1992 | Spencer et al. ................. | 349/69 |
| 6,115,016 A * | 9/2000 | Yoshihara et al. .............. | 345/88 |
| 6,597,348 B1 | 7/2003 | Yamazaki et al. | |
| 6,882,012 B2 | 4/2005 | Yamazaki et al. | |
| 7,193,593 B2 | 3/2007 | Koyama et al. | |
| 7,224,339 B2 | 5/2007 | Koyama et al. | |
| 7,268,756 B2 | 9/2007 | Koyama et al. | |
| 7,317,438 B2 | 1/2008 | Yamazaki et al. | |
| 7,385,579 B2 | 6/2008 | Satake | |

(Continued)

FOREIGN PATENT DOCUMENTS

| | | |
|---|---|---|
| JP | 2002-062518 | 2/2002 |
| JP | 2006-220685 A | 8/2006 |

(Continued)

OTHER PUBLICATIONS

Baron et al., "36.4: Can Motion Compensation Eliminate Color Breakup of Moving Objects in Field-Sequential Color Displays?" SID Digest '96: SID International Symposium Digest of Technical Papers, 1996, vol. 27, pp. 843-846.

(Continued)

*Primary Examiner* — Alexander Eisen
*Assistant Examiner* — Nan-Ying Yang
(74) *Attorney, Agent, or Firm* — Eric J. Robinson; Robinson Intellectual Property Law Office, P.C.

(57) ABSTRACT

Disclosed is a field-sequential liquid crystal display device having a plurality of pixels each of which is arranged to sequentially transmit light obtained by mixing at least two lights in addition to lights of three primary colors generated by a plurality of light sources.

46 Claims, 33 Drawing Sheets

(56) References Cited

U.S. PATENT DOCUMENTS

| | | |
|---|---|---|
| 7,403,177 B2 | 7/2008 | Tanada et al. |
| 7,425,937 B2 | 9/2008 | Inukai |
| 7,773,066 B2 | 8/2010 | Yamazaki et al. |
| 7,791,571 B2 | 9/2010 | Ohtani et al. |
| 7,834,830 B2 | 11/2010 | Yamazaki et al. |
| 7,855,770 B2 | 12/2010 | Egi et al. |
| 8,537,086 B2 | 9/2013 | Koyama et al. |
| 8,564,529 B2 | 10/2013 | Kurokawa et al. |
| 8,564,629 B2 | 10/2013 | Toyotaka et al. |
| 2002/0075249 A1 | 6/2002 | Kubota et al. |
| 2005/0012097 A1 | 1/2005 | Yamazaki |
| 2007/0279374 A1 | 12/2007 | Kimura et al. |
| 2009/0321737 A1 | 12/2009 | Isa et al. |
| 2010/0148177 A1 | 6/2010 | Koyama et al. |
| 2010/0182282 A1 | 7/2010 | Kurokawa et al. |
| 2010/0265281 A1 * | 10/2010 | Furukawa et al. ............ 345/691 |
| 2010/0321420 A1 | 12/2010 | Ohtani et al. |
| 2011/0001725 A1 | 1/2011 | Kurokawa |
| 2011/0025729 A1 | 2/2011 | Yamazaki et al. |
| 2011/0051034 A1 | 3/2011 | Egi et al. |
| 2011/0248970 A1 | 10/2011 | Koyama et al. |
| 2011/0248978 A1 | 10/2011 | Koyama et al. |
| 2011/0249037 A1 | 10/2011 | Koyama et al. |

FOREIGN PATENT DOCUMENTS

| | | |
|---|---|---|
| JP | 2007-264211 A | 10/2007 |
| JP | 2009-042405 | 2/2009 |
| JP | 2009-042405 A | 2/2009 |

OTHER PUBLICATIONS

Kurita et al., "Evaluation and Improvement of Picture Quality for Moving Images on Field-sequential Color Displays," IDW '00: Proceedings of the 17$^{th}$ International Display Workshops, 2000, pp. 69-72.

Taira et al., "A15 Field-Sequential Display without Color Break-Up using an AFLC Color Shutter," IDW '00: Proceedings of the 17$^{th}$ International Display Workshops, 2000, pp. 73-76.

Jarvenpaa, "7.2: Measuring Color Breakup of Stationary Images in Field-Sequential-Color Displays," SID Digest '04: SID International Symposium Digest of Technical Papers, 2004, vol. 35, pp. 82-85.

* cited by examiner

FIG. 16A
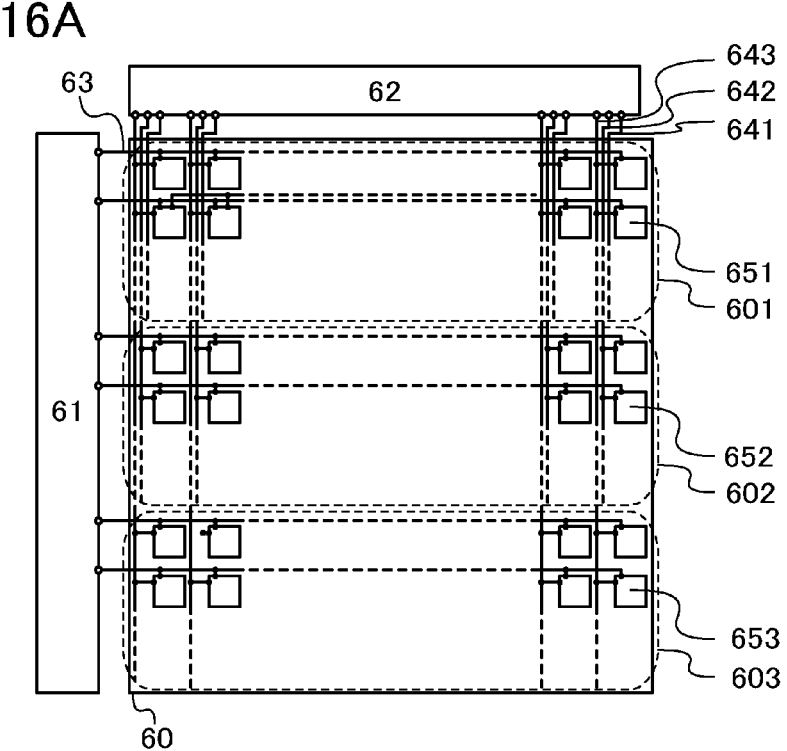
FIG. 16B     FIG. 16C     FIG. 16D
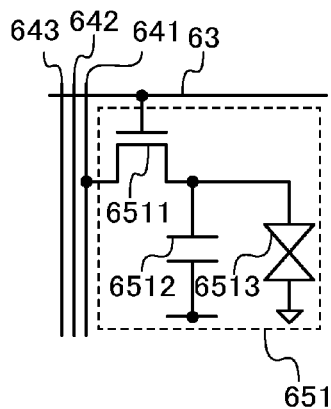 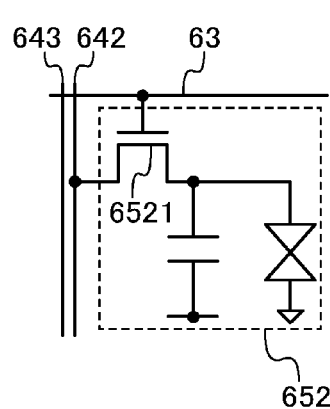 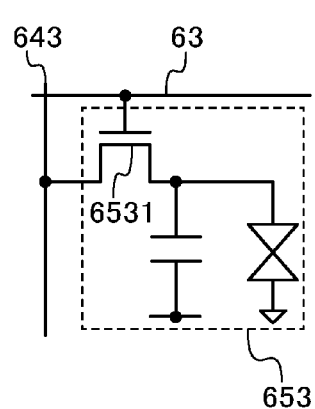

DRIVING METHOD OF LIQUID CRYSTAL DISPLAY DEVICE

BACKGROUND OF THE INVENTION

1. Field of the Invention

The present invention relates to driving methods of liquid crystal display devices. In particular, the present invention relates to driving methods of field-sequential liquid crystal display devices.

2. Description of the Related Art

As display methods of liquid crystal display devices, a color filter method and a field sequential method are known. In a color-filter liquid crystal display device, a plurality of subpixels which has color filters for transmitting only light of wavelengths with given colors (e.g., red (R), green (G), and blue (B)) is provided in each pixel. A desired color is expressed by control of transmission of white light in each subpixel and mixture of a plurality of colors in each pixel. In contrast, in a field-sequential liquid crystal display device, a plurality of light sources that emit lights of different colors (e.g., red (R), green (G), and blue (B)) are provided. A desired color is expressed by on/off of the plurality of light sources that emit lights of different colors and control of transmission of light of different colors in each pixel. In other words, the color filter method is a method by which a desired color is expressed by division of one pixel according to lights of given colors, and the field sequential method is a method by which a desired color is expressed by division of a display period according to lights of given colors.

The field-sequential liquid crystal display device has the following advantages over the color-filter liquid crystal display device. First, in the field-sequential liquid crystal display device, it is not necessary to provide subpixels in each pixel. Thus, the aperture ratio can be increased or the number of pixels can be increased. Second, in the field-sequential liquid crystal display device, it is not necessary to provide color filters. In other words, light loss caused by light absorption in the color filters does not occur. Therefore, transmittance can be improved and power consumption can be reduced.

Patent Document 1 discloses a field-sequential liquid crystal display device. Specifically, Patent Document 1 discloses a liquid crystal display device in which each pixel includes a transistor for controlling input of an image signal, a signal storage capacitor for holding the image signal, and a transistor for controlling transfer of an electrical charge from the signal storage capacitor to a display pixel capacitor. In the liquid crystal display device with the structure, input of an image signal to the signal storage capacitor and display based on an electrical charge held in the display pixel capacitor can be performed concurrently.

REFERENCE

Patent Document 1: Japanese Published Patent Application No. 2009-42405

SUMMARY OF THE INVENTION

As described above, in the field-sequential liquid crystal display device, color information is time-divided. For that reason, display perceived by a user is sometimes changed (degraded) from display based on original display information (such a phenomenon is also referred to as color breaks) because of a lack of a given piece of display information due to temporary interruption of display, such as a blink of the user. Thus, an object of one embodiment of the present invention is to suppress a decrease in image quality of a field-sequential liquid crystal display device.

One embodiment of the present invention is a driving method of a liquid crystal display device in which a plurality of light sources emitting different colors is repeatedly turned on and off and transmission of light of different colors is controlled in each of a plurality of pixels of m rows and n columns (m and n are natural numbers that are 4 or more) so that an image is formed in a pixel portion. The driving method includes the steps of: irradiating the plurality of pixels in first to B-th rows (B is a natural number that is less than or equal to A/2) with light of a first color and the plurality of pixels in (A+1)-th to (A+B)-th rows (A is a natural number that is less than or equal to m/2) with light of a second color, after inputting an image signal for controlling transmission of the light of the first color and an image signal for controlling transmission of the light of the second color to the plurality of pixels arranged in the first to B-th rows and to the plurality of pixels arranged in the (A+1)-th to (A+B)-th rows, respectively, in a period during which the image signal for controlling transmission of the light of the first color and the image signal for controlling transmission of the light of the second color are input to the plurality of pixels arranged in the first to A-th rows and to the plurality of pixels arranged in the (A+1)-th to 2A-th rows, respectively. One of the light of the first color and the light of the second color is mixed color light formed by turning on at least two light sources of the plurality of light sources emitting different colors.

In the liquid crystal display device according to one embodiment of the present invention, image signal input and the turning on of backlights are not sequentially performed in the entire pixel portion but can be sequentially performed per specific region of the pixel portion. Thus, it is possible to increase the frequency of input of an image signal to each pixel of the liquid crystal display device. Accordingly, deterioration of display such as color break or the like generated in the liquid crystal display device can be suppressed, and the image quality can be improved.

BRIEF DESCRIPTION OF THE DRAWINGS

FIG. 16A illustrates a structure example of a liquid crystal display device, and FIGS. 16B to 16D illustrate structure examples of pixels of the liquid crystal display device.

FIGS. 28A, 28B, 28C1, 28C2, 28D1, 28D2, 28E1, and 28E2 illustrate examples of one embodiment of a substrate used in a liquid crystal display device.

DETAILED DESCRIPTION OF THE INVENTION

Hereinafter, embodiments of the present invention will be described in detail with reference to the accompanying drawings. Note that the present invention is not limited to the description below, and it is easily understood by those skilled in the art that a variety of changes and modifications can be made without departing from the spirit and scope of the present invention. Therefore, the present invention should not be limited to the descriptions of the embodiments below.

Embodiment 1

In this embodiment, a liquid crystal display device according to one embodiment of the present invention will be described with reference to FIGS. 1A and 1B, FIGS. 2A to 2C, FIGS. 3A to 3D, FIGS. 4A and 4B, FIG. 5, and FIG. 6.

<Structure Example of Liquid Crystal Display Device>

Figure 1A:
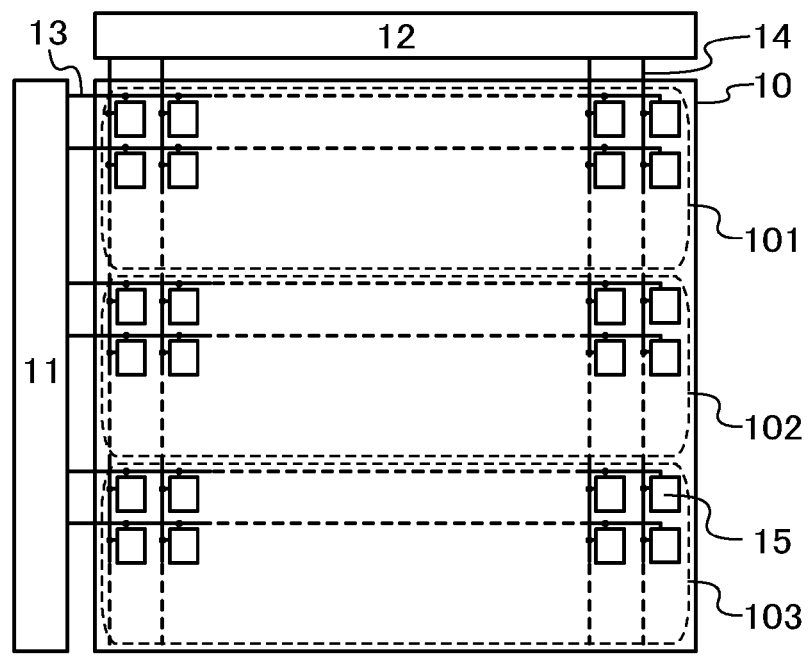
FIG. 1A illustrates a structure example of a liquid crystal display device.

FIG. 1A illustrates a structure example of a liquid crystal display device. The liquid crystal display device illustrated in FIG. 1A includes a pixel portion 10, a scan line driver circuit 11, a signal line driver circuit 12, m scan lines 13 which are arranged parallel (or substantially parallel) to each other and whose potentials are controlled by the scan line driver circuit 11, and n signal lines 14 which are arranged parallel (or substantially parallel) to each other and whose potentials are controlled by the signal line driver circuit 12. The pixel portion 10 is divided into three regions (regions 101 to 103), and each region includes a plurality of pixels arranged in a matrix. Each of the scan lines 13 is electrically connected to the n pixels in the corresponding row among the plurality of pixels arranged in m rows and n columns in the pixel portion 10. Each of the signal lines 14 is electrically connected to the m pixels in the corresponding column among the plurality of pixels arranged in the m rows and the n columns.

Figure 1B:
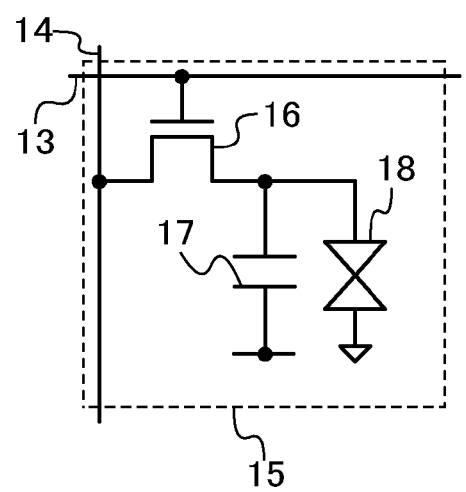
FIG. 1B illustrates a structure example of a pixel of the liquid crystal display device.

FIG. 1B illustrates an example of a circuit configuration of a pixel 15 included in the liquid crystal display device illustrated in FIG. 1A. The pixel 15 in FIG. 1B includes a transistor 16, a capacitor 17, and a liquid crystal element 18. A gate of the transistor 16 is electrically connected to the scan line 13, and one of a source and a drain of the transistor 16 is electrically connected to the signal line 14. One of electrodes of the capacitor 17 is electrically connected to the other of the source and the drain of the transistor 16, and the other of the electrodes of the capacitor 17 is electrically connected to a wiring for supplying a capacitor potential (the wiring is also referred to as a capacitor wiring). One of electrodes (also referred to as a pixel electrode) of the liquid crystal element 18 is electrically connected to the other of the source and the drain of the transistor 16 and one of the electrodes of the capacitor 17, and the other of the electrodes (also referred to as a counter electrode) of the liquid crystal element 18 is electrically connected to a wiring for supplying a counter potential. The transistor 16 is an n-channel transistor. The capacitor potential and the counter potential can be the same potential.

<Structure Example of Scan Line Driver Circuit 11>

Figure 2A:
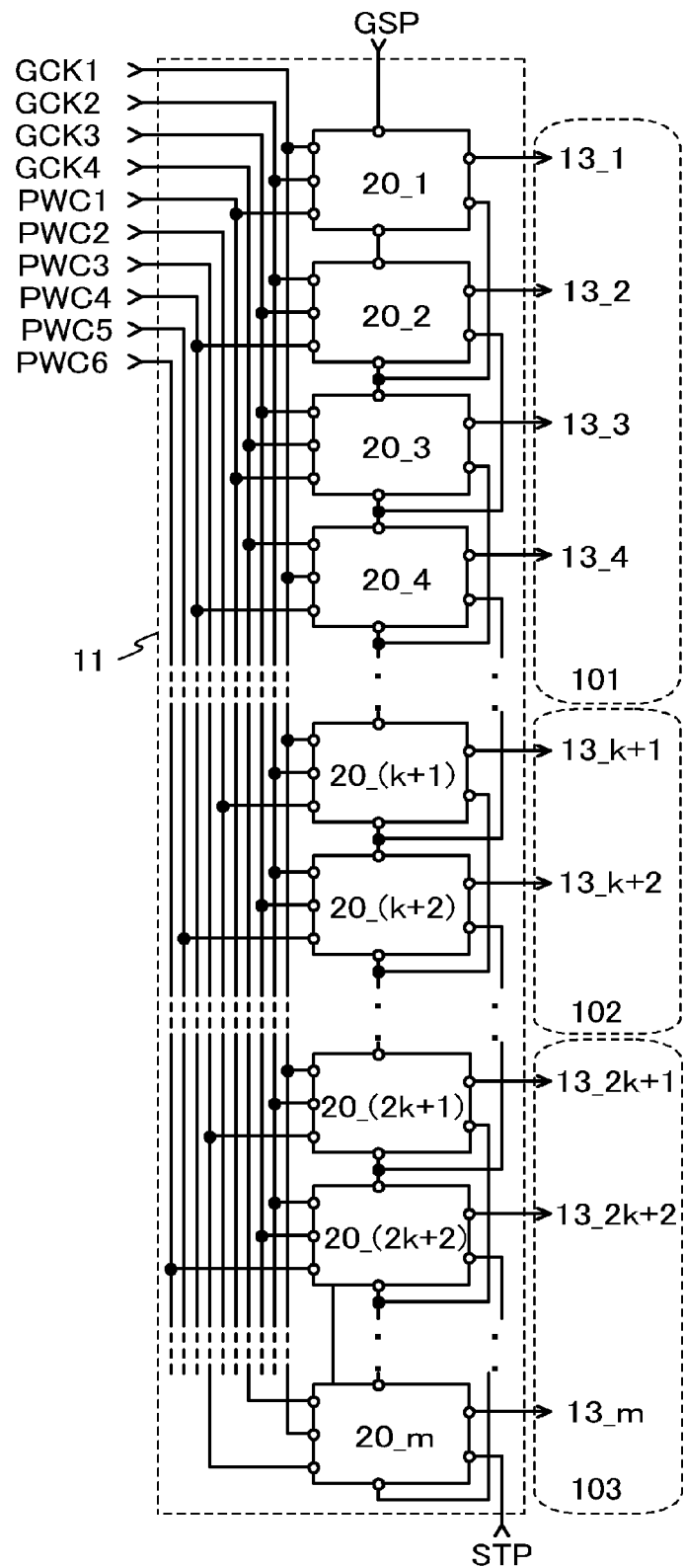
FIG. 2A illustrates a structure example of a scan line driver circuit.

FIG. 2A illustrates a structure example of the scan line driver circuit 11 included in the liquid crystal display device in FIG. 1A. The scan line driver circuit 11 illustrated in FIG. 2A includes: respective wirings for supplying first to fourth clock signals (GCK1 to GCK4) for the scan line driver circuit; respective wirings for supplying first to sixth pulse-width control signals (PWC1 to PWC6); and a first pulse output circuit 20_1 which is electrically connected to the scan line 13_1 in the first row to an m-th pulse output circuit 20_m which is electrically connected to the scan line 13_m in the m-th row. Note that here, the first pulse output circuit 20_1 to the k-th pulse output circuit 20_k (k is less than m/2 and a multiple of 4) are electrically connected to the respective scan lines 13_1 to 13_k provided for the region 101; the (k+1)-th pulse output circuit 20_(k+1) to the 2k-th pulse output circuit 20_2k are electrically connected to the respective scan lines 13_(k+1) to 13_k provided for the region 102; and the (2k+1)-th pulse output circuit 20_(2k+1) to the m-th pulse output circuit 20_m are electrically connected to the respective scan lines 13_(2k+1) to 13_m provided for the region 103. The first pulse output circuit 20_1 to the m-th pulse output circuit 20_m are configured to shift a shift pulse sequentially per shift period in response to a start pulse (GSP) for the scan line driver circuit which is input to the first pulse output circuit 20_1. Note that a plurality of shift pulses can be shifted in parallel in the first pulse output circuit 20_1 to the m-th pulse output circuit 20_m. In other words, even in a period in which a shift pulse is shifted in the first pulse output circuit 20_1 to the m-th pulse output circuit 20_m, the start pulse (GSP) for the scan line driver circuit can be input to the first pulse output circuit 20_1.

Figure 2B:
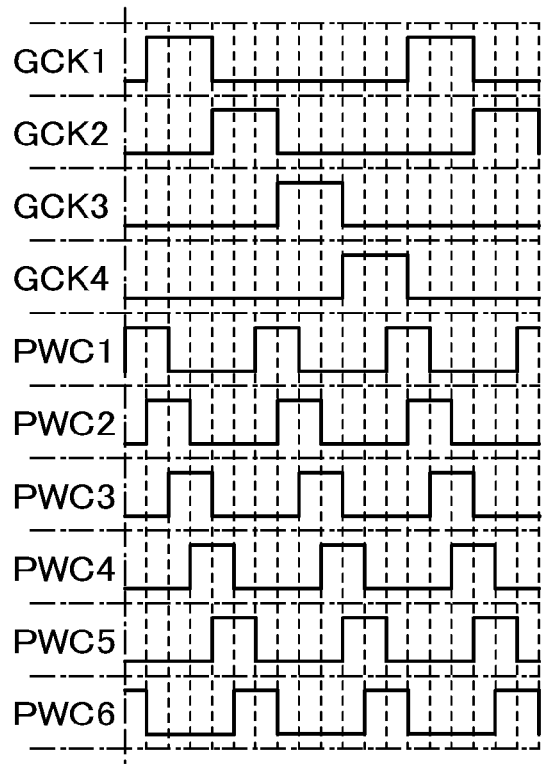
FIG. 2B is a timing diagram illustrating an example of signals for a scan line driver circuit.

FIG. 2B illustrates examples of specific waveforms of the above-described signals. The first clock signal (GCK1) for the scan line driver circuit in FIG. 2B periodically repeats a high-level potential (high power supply potential (Vdd)) and a low-level potential (low power supply potential (Vss)), and has a duty ratio of 1/4. The second clock signal (GCK2) for the scan line driver circuit is a signal whose phase is deviated by ¼ period from the first clock signal (GCK1) for the scan line driver circuit; the third clock signal (GCK3) for the scan line driver circuit is a signal whose phase is deviated by ½ period from the first clock signal (GCK1) for the scan line driver circuit; and the fourth clock signal (GCK4) for the scan line driver circuit is a signal whose phase is deviated by ¾ period from the first clock signal (GCK1) for the scan line driver circuit. The first pulse-width control signal (PWC1) periodically repeats the high-level potential (high power supply potential (Vdd)) and the low-level potential (low power supply potential (Vss)), and has a duty ratio of 1/3. The second pulse-width control signal (PWC2) is a signal whose phase is deviated by ⅙ period from the first pulse-width control signal (PWC1); the third pulse-width control signal (PWC3) is a signal whose phase is deviated by ⅓ period from the first pulse-width control signal (PWC1); the fourth pulse-width control signal (PWC4) is a signal whose phase is deviated by ½ period from the first pulse-width control signal (PWC1); the fifth pulse-width control signal (PWC5) is a signal whose phase is deviated by ⅔ period from the first pulse-width control signal (PWC1); and the sixth pulse-width control signal (PWC6) is a signal whose phase is deviated by ⅚ period from the first pulse-width control signal (PWC1). Note that here, the ratio of the pulse width of each of the first to fourth clock signals (GCK1 to GCK4) for the scan line driver circuit, to the pulse width of each of the first to sixth pulse-width control signals (PWC1 to PWC6) is 3:2.

In the above-described liquid crystal display device, the same configuration can be applied to the first pulse output circuit 20_1 to the m-th pulse output circuit 20__m. However, electrical connections of a plurality of terminals included in the pulse output circuit differ depending on the pulse output circuits. Specific connection relation will be described with reference to FIGS. 2A and 2C.

Figure 2C:
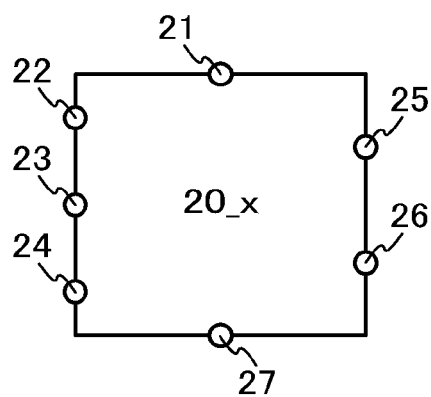
FIG. 2C illustrates a structure example of a pulse output circuit.

Each of the first pulse output circuit 20_1 to the m-th pulse output circuit 20__m has terminals 21 to 27 (FIG. 2C). The terminals 21 to 24 and the terminal 26 are input terminals; the terminals 25 and 27 are output terminals.

First, the terminal 21 will be described. The terminal 21 of the first pulse output circuit 20_1 is electrically connected to a wiring for supplying the start signal (GSP) for the scan line driver circuit. The terminals 21 of the second to m-th pulse output circuits 20_2 to 20__m are electrically connected to respective terminals 27 of their respective previous-stage pulse output circuits.

Next, the terminal 22 will be described. The terminal 22 of the (4a−3)-th pulse output circuit (a is a natural number less than or equal to m/4) is electrically connected to the wiring for supplying the first clock signal (GCK1) for the scan line driver circuit. The terminal 22 of the (4a−2)-th pulse output circuit is electrically connected to the wiring for supplying the second clock signal (GCK2) for the scan line driver circuit. The terminal 22 of the (4a−1)-th pulse output circuit is electrically connected to the wiring for supplying the third clock signal (GCK3) for the scan line driver circuit. The terminal 22 of the 4a-th pulse output circuit is electrically connected to the wiring for supplying the fourth clock signal (GCK4) for the scan line driver circuit.

Then, the terminal 23 will be described. The terminal 23 of the (4a−3)-th pulse output circuit is electrically connected to the wiring for supplying the second clock signal (GCK2) for the scan line driver circuit. The terminal 23 of the (4a−2)-th pulse output circuit is electrically connected to the wiring for supplying the third clock signal (GCK3) for the scan line driver circuit. The terminal 23 of the (4a−1)-th pulse output circuit is electrically connected to the wiring for supplying the fourth clock signal (GCK4) for the scan line driver circuit. The terminal 23 of the 4a-th pulse output circuit is electrically connected to the wiring for supplying the first clock signal (GCK1) for the scan line driver circuit.

Next, the terminal 24 will be described. The terminal 24 of the (2b−1)-th pulse output circuit (b is a natural number less than or equal to k/2) is electrically connected to the wiring for supplying the first pulse-width control signal (PWC1). The terminal 24 of the 2b-th pulse output circuit is electrically connected to the wiring for supplying the fourth pulse-width control signal (PWC4). The terminal 24 of the (2c−1)-th pulse output circuit (c is a natural number greater than or equal to (k/2+1) and less than or equal to k) is electrically connected to the wiring for supplying the second pulse-width control signal (PWC2). The terminal 24 of the 2c-th pulse output circuit is electrically connected to the wiring for supplying the fifth pulse-width control signal (PWC5). The terminal 24 of the (2d−1)-th pulse output circuit (d is a natural number greater than or equal to (k+1) and less than or equal to m/2) is electrically connected to the wiring for supplying the third pulse-width control signal (PWC3). The terminal 24 of the 2d-th pulse output circuit is electrically connected to the wiring for supplying the sixth pulse-width control signal (PWC6).

Then, the terminal 25 will be described. The terminal 25 of the x-th pulse output circuit (x is a natural number less than or equal to m) is electrically connected to the scan line 13__x in the x-th row.

Next, the terminal 26 will be described. The terminal 26 of the y-th pulse output circuit (y is a natural number less than or equal to m−1) is electrically connected to the terminal 27 of the (y+1)-th pulse output circuit. The terminal 26 of the m-th pulse output circuit is electrically connected to a wiring for supplying a stop signal (STP) for the m-th pulse output circuit. In the case where a (m+1)-th pulse output circuit is provided, the stop signal (STP) for the m-th pulse output circuit corresponds to a signal output from the terminal 27 of the (m+1)-th pulse output circuit. Specifically, the stop signal (STP) for the m-th pulse output circuit can be supplied to the m-th pulse output circuit by the (m+1)-th pulse output circuit provided as a dummy circuit or by inputting the signal directly from the outside.

Connection relation of the terminal 27 of each pulse output circuit is described above. Therefore, the above description is to be referred to.

<Structure Example of Pulse Output Circuit>

Figure 3A:
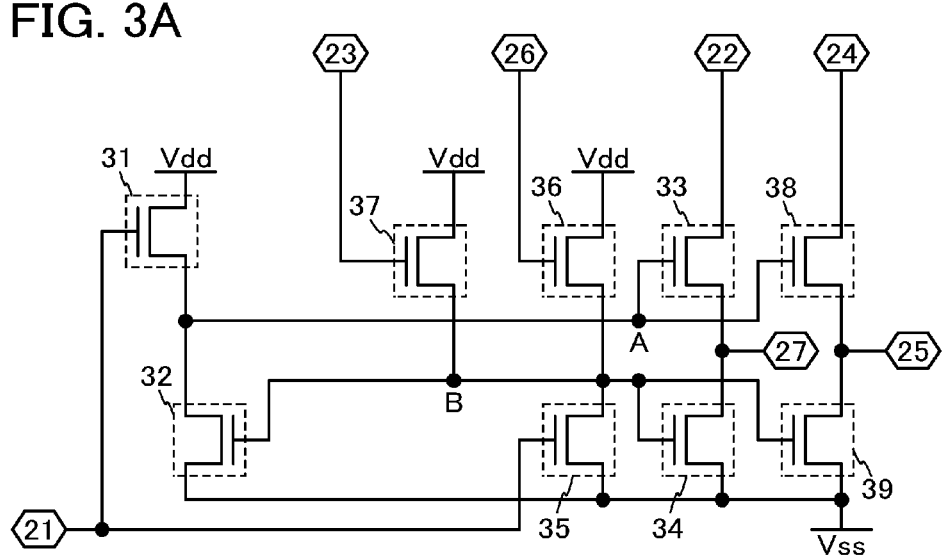
FIG. 3A is a circuit diagram illustrating an example of a pulse output circuit.

FIG. 3A illustrates a structure example of the pulse output circuit illustrated in FIGS. 2A and 2C. A pulse output circuit illustrated in FIG. 3A includes transistors 31 to 39.

One of a source and a drain of the transistor 31 is electrically connected to a wiring for supplying the high power supply potential (Vdd) (hereinafter also referred to as a high power supply potential line). A gate of the transistor 31 is electrically connected to the terminal 21.

One of a source and a drain of the transistor 32 is electrically connected to a wiring for supplying the low power supply potential (Vss) (hereinafter also referred to as a low power supply potential line). The other of the source and the drain of the transistor 32 is electrically connected to the other of the source and the drain of the transistor 31.

One of a source and a drain of the transistor 33 is electrically connected to the terminal 22. The other of the source and the drain of the transistor 33 is electrically connected to the terminal 27. A gate of the transistor 33 is electrically connected to the other of the source and the drain of the transistor 31 and the other of the source and the drain of the transistor 32.

One of a source and a drain of the transistor 34 is electrically connected to the low power supply potential line. The other of the source and the drain of the transistor 34 is electrically connected to the terminal 27. A gate of the transistor 34 is electrically connected to a gate of the transistor 32.

One of a source and a drain of the transistor 35 is electrically connected to the low power supply potential line. The other of the source and the drain of the transistor 35 is electrically connected to the gate of the transistor 32 and the gate of the transistor 34. A gate of the transistor 35 is electrically connected to the terminal 21.

One of a source and a drain of the transistor 36 is electrically connected to the high power supply potential line. The other of the source and the drain of the transistor 36 is electrically connected to the gate of the transistor 32, the gate of the transistor 34, and the other of the source and the drain of the transistor 35. A gate of the transistor 36 is electrically connected to the terminal 26. Note that it is possible to employ a structure in which one of the source and the drain of the transistor 36 is electrically connected to a wiring for supplying a power supply potential (Vcc) which is higher than the low power supply potential (Vss) and lower than the high power supply potential (Vdd).

One of a source and a drain of the transistor 37 is electrically connected to the high power supply potential line. The other of the source and the drain of the transistor 37 is electrically connected to the gate of the transistor 32, the gate of the transistor 34, the other of the source and the drain of the transistor 35, and the other of the source and the drain of the transistor 36. A gate of the transistor 37 is electrically connected to the terminal 23. Note that it is possible to employ a structure in which one of the source and the drain of the transistor 37 is electrically connected to a wiring for supplying the power supply potential (Vcc).

One of a source and a drain of the transistor 38 is electrically connected to the terminal 24. The other of the source and the drain of the transistor 38 is electrically connected to the terminal 25. A gate of the transistor 38 is electrically connected to the other of the source and the drain of the transistor 31, the other of the source and the drain of the transistor 32, and the gate of the transistor 33.

One of a source and a drain of the transistor 39 is electrically connected to the low power supply potential line. The other of the source and the drain of the transistor 39 is electrically connected to the terminal 25. A gate of the transistor 39 is electrically connected to the gate of the transistor 32, the gate of the transistor 34, the other of the source and the drain of the transistor 35, the other of the source and the drain of the transistor 36, and the other of the source and the drain of the transistor 37.

In the following description, a node where the other of the source and the drain of the transistor 31, the other of the source and the drain of the transistor 32, the gate of the transistor 33, and the gate of the transistor 38 are electrically connected to each other is referred to as a node A; a node where the gate of the transistor 32, the gate of the transistor 34, the other of the source and the drain of the transistor 35, the other of the source and the drain of the transistor 36, the other of the source and the drain of the transistor 37, and the gate of the transistor 39 are electrically connected to each other is referred to as a node B.

<Operation Example of Pulse Output Circuit>

Figure 3B:
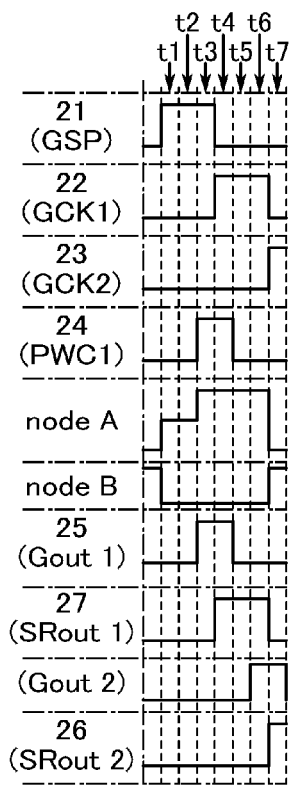
FIGS. 3B to 3D are timing diagrams illustrating an operation example of the pulse output circuit.
Figure 3C:
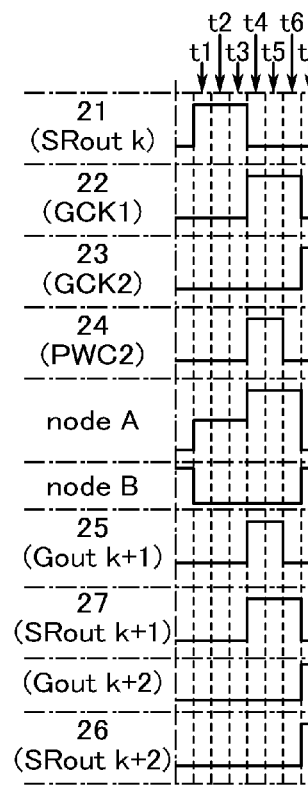
Figure 3D:
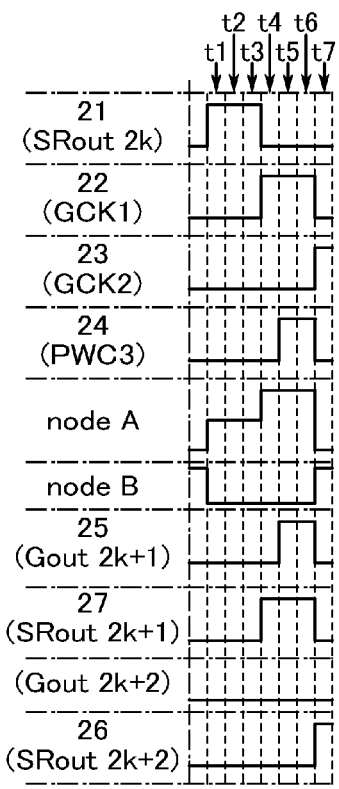

An operation example of the above-described pulse output circuit will be described with reference to FIGS. 3B to 3D. Described here is an operation example in the case where timing of inputting the start pulse (GSP) for the scan line driver circuit to the terminal 21 of the first pulse output circuit 20_1 is controlled such that shift pulses are output from the terminals 27 of the first pulse output circuit 20_1, the (k+1)-th pulse output circuit 20_(k+1), and the (2k+1)-th pulse output circuit 20_(2k+1) at the same timing. Specifically, the potentials of the signals which are input to the terminals of the first pulse output circuit 20_1 and the potentials of the node A and the node B when the start pulse (GSP) for the scan line driver circuit is input are illustrated in FIG. 3B; the potentials of the signals which are input to the terminals of the (k+1)-th pulse output circuit 20_(k+1) and the potentials of the node A and the node B when the high-level potential is input from the k-th pulse output circuit 20_k are illustrated in FIG. 3C; and the potentials of the signals which are input to the terminals of the (2k+1)-th pulse output circuit 20_(2k+1) and the potentials of the node A and the node B when the high-level potential is input from the 2k-th pulse output circuit 20_2k are illustrated in FIG. 3D. In FIGS. 3B to 3D, the signals which are input to the terminals are each provided in parentheses. In addition, the signal (Gout 2, Gout k+2, Gout 2k+2) which is output from the terminal 25 of the subsequent-stage pulse output circuit (the second pulse output circuit 20_2, the (k+2)-th pulse output circuit 20_(k+2), the (2k+2)-th pulse output circuit 20_(2k+2)), and the output signal of the terminal 27 of the subsequent-stage pulse output circuit (SRout 2: input signal of the terminal 26 of the first pulse output circuit 20_1, SRout k+2: input signal of the terminal 26 of the (k+1)-th pulse output circuit 20_(k+1), SRout 2k+2: input signal of the terminal 26 of the (2k+1)-th pulse output circuit 20_(2k+1)) are also illustrated. Note that in FIGS. 3B to 3D, Gout represents an output signal from the pulse output circuit to the scan line, and SRout represents an output signal from the pulse output circuit to the subsequent-stage pulse output circuit.

First, the case where the high-level potential is input as the start pulse (GSP) for the scan line driver circuit to the first pulse output circuit 20_1 will be described with reference to FIG. 3B.

In a period t1, the high-level potential (high power supply potential (Vdd)) is input to the terminal 21. Thus, the transistors 31 and 35 are turned on. As a result, the potential of the node A is increased to the high-level potential (potential that is decreased from the high power supply potential (Vdd) by the threshold voltage of the transistor 31), and the potential of the node B is decreased to the low power supply potential (Vss), so that the transistors 33 and 38 are turned on and the transistors 32, 34, and 39 are turned off. Thus, in the period t1, a signal output from the terminal 27 is a signal input to the terminal 22, and a signal output from the terminal 25 is a signal input to the terminal 24. Here in the period t1, both the signal input to the terminal 22 and the signal input to the terminal 24 are the low-level potential (low power supply potential (Vss)). Accordingly, in the period t1, the first pulse output circuit 20_1 outputs the low-level potential (low power supply potential (Vss)) to the terminal 21 of the second pulse output circuit 20_2 and the scan line in the first row in the pixel portion.

In a period t2, the levels of the signals input to the terminals are the same as in the period t1. Therefore, the potentials of the signals output from the terminals 25 and 27 are also not changed; the low-level potentials (low power supply potentials (Vss)) are output.

In a period t3, the high-level potential (high power supply potential (Vdd)) is input to the terminal 24. Note that the potential of the node A (the source potential of the transistor 31) has been increased to the high-level potential (potential that is decreased from the high power supply potential (Vdd) by the threshold voltage of the transistor 31) in the period t1. Therefore, the transistor 31 is turned off. At this time, the input of the high-level potential (high power supply potential (Vdd)) to the terminal 24 further increases the potential of the node A (the potential of the gate of the transistor 38) by capacitive coupling between the source and the gate of the transistor 38 (bootstrapping). Owing to the bootstrapping, the potential of the signal output from the terminal 25 is not decreased from the high-level potential (high power supply potential (Vdd)) input to the terminal 24. Accordingly, in the period t3, the first pulse output circuit 20_1 outputs the high-level potential (high power supply potential (Vdd)=a selection signal) to the scan line in the first row in the pixel portion.

In a period t4, the high-level potential (high power supply potential (Vdd)) is input to the terminal 22. As a result, since the potential of the node A has been increased by the bootstrapping, the potential of the signal output from the terminal 27 is not decreased from the high-level potential (high power supply potential (Vdd)) input to the terminal 22. Accordingly, in the period t4, the terminal 27 outputs the high-level potential (high power supply potential (Vdd)) which is input to the terminal 22. In other words, the first pulse output circuit 20_1 outputs the high-level potential (high power supply potential (Vdd)=a shift pulse) to the terminal 21 of the second pulse output circuit 20_2. In the period t4 also, the signal input to the terminal 24 maintains the high-level potential (high power supply potential (Vdd)), so that the signal output to the scan line in the first row in the pixel portion from the first pulse output circuit 20_1 remains at the high-level potential (high power supply potential (Vdd)=the selection signal). Further, the low-level potential (low power supply potential (Vss)) is input to the terminal 21 to turn off the transistor 35, which does not directly influence the output signal of the pulse output circuit in the period t4.

In a period t5, the low-level potential (low power supply potential (Vss)) is input to the terminal 24. In that period, the transistor 38 maintains the on state. Accordingly, in the period t5, the first pulse output circuit 20_1 outputs the low-level potential (low power supply potential (Vss)) to the scan line arranged in the first row in the pixel portion.

In a period t6, the levels of the signals input to the terminals are the same as in the period t5. Therefore, the potentials of the signals output from the terminals 25 and 27 are also not changed; the low-level potential (low power supply potentials (Vss)) is output from the terminal 25 and the high-level potential (high power supply potential (Vdd)=the shift pulse) is output from the terminal 27.

In a period t7, the high-level potential (high power supply potential (Vdd)) is input to the terminal 23. Thus, the transistor 37 is turned on. As a result, the potential of the node B is increased to the high-level potential (potential that is decreased from the high power supply potential (Vdd) by the threshold voltage of the transistor 37). In other words, the transistors 32, 34, and 39 are turned on. On the other hand, the potential of the node A is decreased to the low-level potential (low power supply potential (Vss)). In other words, the transistors 33 and 38 are turned off. Accordingly, in the period t7, both of the signals output from the terminals 25 and 27 are at the low power supply potentials (Vss). In other words, in the period t7, the first pulse output circuit 20_1 outputs the low power supply potential (Vss) to the terminal 21 of the second pulse output circuit 20_2 and the scan line arranged in the first row in the pixel portion.

Next, the case where the high-level potential is input as the shift pulse from the k-th pulse output circuit 20_k to the terminal 21 of the (k+1)-th pulse output circuit 20_(k+1) will be described with reference to FIG. 3C.

Operation of the (k+1)-th pulse output circuit 20_(k+1) is as of the first pulse output circuit 20_1 in the periods t1 and t2. Therefore, the above description is to be referred to.

In the period t3, the levels of the signals input to the terminals are the same as in the period t2. Therefore, the potentials of the signals output from the terminals 25 and 27 are also not changed; the low-level potentials (low power supply potentials (Vss)) are output.

In the period t4, the high-level potentials (high power supply potentials (Vdd)) are input to the terminals 22 and 24. Note that the potential of the node A (the source potential of the transistor 31) has been increased to the high-level potential (potential that is decreased from the high power supply potential (Vdd) by the threshold voltage of the transistor 31) in the period t1. Therefore, the transistor 31 is off in the period t1. The input of the high-level potentials (high power supply potentials (Vdd)) to the terminals 22 and 24 further increases the potential of the node A (the potentials of the gates of the transistors 33 and 38) by capacitive coupling between the source and the gate of the transistor 33 and capacitive coupling between the source and the gate of the transistor 38 (bootstrapping). Owing to the bootstrapping, the potentials of the signals output from the terminals 25 and 27 are not decreased from the high-level potentials (high power supply potentials (Vdd)) input to the terminals 22 and 24, respectively. Accordingly, in the period t4, the (k+1)-th pulse output circuit 20_(k+1) outputs the high-level potentials (high power supply potentials (Vdd)=a selection signal and a shift pulse) to the scan line in the (k+1)-th row in the pixel portion and the terminal 21 of the (k+2)-th pulse output circuit 20_(k+2).

In the period t5, the levels of the signals input to the terminals are the same as in the period t4. Therefore, the potentials of the signals output from the terminals 25 and 27 are also not changed; the high-level potentials (high power supply potentials (Vdd)=the selection signal and the shift pulse) are output.

In the period t6, the low-level potential (low power supply potential (Vss)) is input to the terminal 24. In that period, the transistor 38 maintains the on state. Accordingly, in the period t6, the (k+1)-th pulse output circuit 20_(k+1) outputs the low-level potential (low power supply potential (Vss)) to the scan line arranged in the (k+1)-th row in the pixel portion.

In the period t7, the high-level potential (high power supply potential (Vdd)) is input to the terminal 23. Thus, the transistor 37 is turned on. As a result, the potential of the node B is increased to the high-level potential (potential that is decreased from the high power supply potential (Vdd) by the threshold voltage of the transistor 37). In other words, the transistors 32, 34, and 39 are turned on. On the other hand, the potential of the node A is decreased to the low-level potential (low power supply potential (Vss)). In other words, the transistors 33 and 38 are turned off. Accordingly, in the period t7, both of the signals output from the terminals 25 and 27 are at the low power supply potentials (Vss). In other words, in the period t7, the (k+1)-th pulse output circuit 20_(k+1) outputs the low power supply potential (Vss) to the terminal 21 of the (k+2)-th pulse output circuit 20_(k+2) and the scan line arranged in the (k+1)-th row in the pixel portion.

Next, the case where the high-level potential is input as the shift pulse from the 2k-th pulse output circuit 20__2k to the terminal 21 of the (2k+1)-th pulse output circuit 20_(2k+1) will be described below with reference to FIG. 3D.

Operation of the (2k+1)-th pulse output circuit 20_(2k+1) is as of the (k+1)-th pulse output circuit 20_(k+1) in the periods t1 to t3. Therefore, the above description is to be referred to.

In the period t4, the high-level potential (high power supply potential (Vdd)) is input to the terminal 22. Note that the potential of the node A (the source potential of the transistor 31) has been increased to the high-level potential (potential that is decreased from the high power supply potential (Vdd) by the threshold voltage of the transistor 31) in the period t1. Therefore, the transistor 31 is turned off in the period t1. The input of the high-level potential (high power supply potential (Vdd)) to the terminal 22 further increases the potential of the node A (the potential of the gate of the transistor 33) by capacitive coupling between the source and the gate of the transistor 33 (bootstrapping). Owing to the bootstrapping, the potential of the signal output from the terminal 27 is not decreased from the high-level potential (high power supply potential (Vdd)) input to the terminal 22. Accordingly, in the period t4, the (2k+1)-th pulse output circuit 20_(2k+1) outputs the high-level potential (high power supply potential (Vdd)=a shift pulse) to the terminal 21 of the (2k+2)-th pulse output circuit 20_(2k+2). Further, the low-level potential (low power supply potential (Vss)) is input to the terminal 21 to turn off the transistor 35, which does not directly influence the output signal of the pulse output circuit in the period t4.

In the period t5, the high-level potential (high power supply potential (Vdd)) is input to the terminal 24. As a result, since the potential of the node A has been increased by the bootstrapping, the potential of the signal output from the terminal 25 is not decreased from the high-level potential (high power supply potential (Vdd)) input to the terminal 24. Accordingly, in the period t5, the terminal 25 outputs the high-level potential (high power supply potential (Vdd)) which is input to the terminal 22. In other words, the (2k+1)-th pulse output circuit 20_(2k+1) outputs the high-level potential (high power supply potential (Vdd)=a selection signal) to the scan line arranged in the (2k+1)-th row in the pixel. In the period t5 also, the signal input to the terminal 22 maintains the high-level potential (high power supply potential (Vdd)), so that the signal output from the (2k+1)-th pulse output circuit 20_(2k+1) to the terminal 21 of the (2k+2)-th pulse output circuit 20_(2k+2) remains at the high-level potential (high power supply potential (Vdd)=the shift pulse).

In the period t6, the levels of the signals input to the terminals are the same as in the period t5. Therefore, the potentials of the signals output from the terminals 25 and 27 are also not changed; the high-level potentials (high power supply potentials (Vdd)=the selection signal and the shift pulse) are output.

In the period t7, the high-level potential (high power supply potential (Vdd)) is input to the terminal 23. Thus, the transistor 37 is turned on. As a result, the potential of the node B is increased to the high-level potential (potential that is decreased from the high power supply potential (Vdd) by the threshold voltage of the transistor 37). In other words, the transistors 32, 34, and 39 are turned on. On the other hand, the potential of the node A is decreased to the low-level potential (low power supply potential (Vss)). In other words, the transistors 33 and 38 are turned off. Accordingly, in the period t7, both of the signals output from the terminals 25 and 27 are the low power supply potential (Vss). In other words, in the period t7, the (2k+1)-th pulse output circuit 20_(2k+1) outputs the low power supply potential (Vss) to the terminal 21 of the (2k+2)-th pulse output circuit 20_(2k+2) and the scan line arranged in the (2k+1)-th row in the pixel portion.

As illustrated in FIGS. 3B to 3D, with the first pulse output circuit 20_1 to the m-th pulse output circuit 20__m, a plurality of shift pulses can be shifted in parallel by controlling the timing of inputting the start pulse (GSP) for the scan line driver circuit. Specifically, after the start pulse (GSP) for the scan line driver circuit is input, the start pulse (GSP) for the scan line driver circuit is input again at the timing at which the terminal 27 of the k-th pulse output circuit 20__k outputs a shift pulse, whereby shift pulses can be output from the first pulse output circuit 20_1 and the (k+1)-th pulse output circuit 20_(k+1) at the same timing. The start pulse (GSP) for the scan line driver circuit can be further input in a similar manner, whereby shift pulses can be output from the first pulse output circuit 20_1, the (k+1)-th pulse output circuit 20_(k+1), and the (2k+1)-th pulse output circuit 20_(2k+1) at the same timing.

In addition, the first pulse output circuit 20_1, the (k+1)-th pulse output circuit 20_(k+1), and the (2k+1)-th pulse output circuit 20_(2k+1) can supply selection signals to respective scan lines at different timings in parallel to the above-described operation. In other words, with the scan line driver circuit, a plurality of shift pulses including a specific shift period can be shifted, and a plurality of pulse output circuits to which shift pulses are input at the same timing can supply selection signals to their respective scan lines at different timings.

<Structure Example of Signal Line Driver Circuit 12>

Figure 4A:
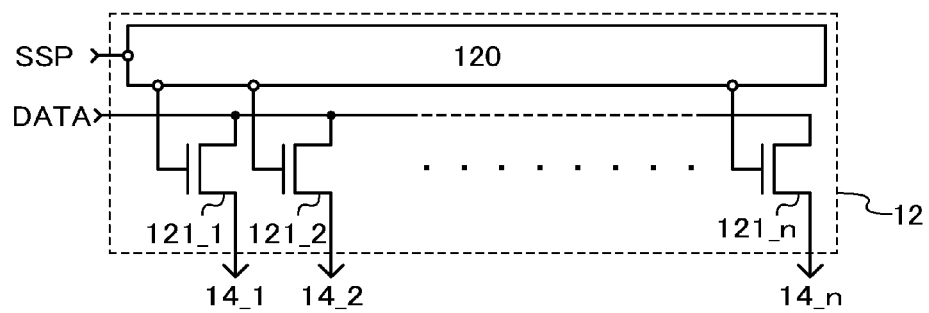
FIG. 4A illustrates a structure example of a signal line driver circuit.

FIG. 4A illustrates a structure example of the signal line driver circuit 12 included in the liquid crystal display device in FIG. 1A. The signal line driver circuit 12 illustrated in FIG. 4A includes a shift register 120 having first to n-th output terminals, a wiring for supplying an image signal (DATA), and transistors 121_1 to 121__n. One of a source and a drain of the transistor 121_1 is electrically connected to the wiring for supplying the image signal (DATA), the other of the source and the drain of the transistor 121_1 is electrically connected to the signal line 14_1 in the first column in the pixel portion, and a gate of the transistor 121_1 is electrically connected to a first output terminal of the shift register 120. One of a source and a drain of the transistor 121__n is electrically connected to the wiring for supplying the image signal (DATA), the other of the source and the drain of the transistor 121__n is electrically connected to the signal line 14__n in the n-th column in the pixel portion, and a gate of the transistor 121__n is electrically connected to the n-th output terminal of the shift register 120. The shift register 120 outputs the high-level potential sequentially from the first to n-th output terminals per shift period in response to a start pulse for the signal line driver circuit (SSP). In other words, the transistors 121_1 to 121__n are sequentially turned on per shift period.

Figure 4B:
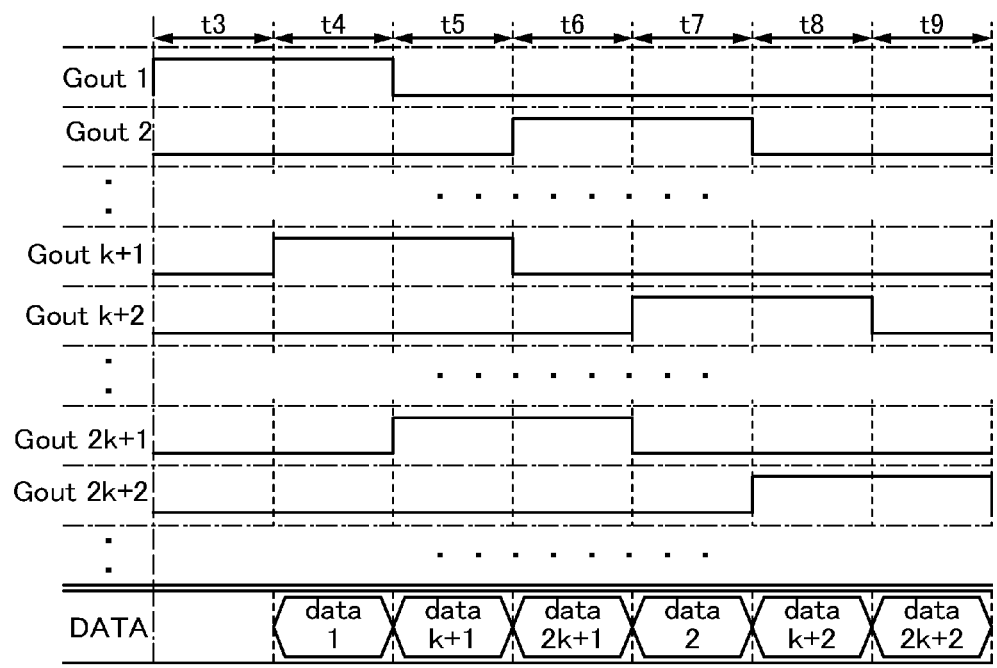
FIG. 4B illustrates an operation example of the signal line driver circuit.

FIG. 4B illustrates an example of timing of image signals which are supplied through the wiring for supplying the image signal (DATA). As illustrated in FIG. 4B, the wiring for supplying the image signal (DATA) supplies a pixel image signal for the first row (data 1) in the period t4; a pixel image signal for the (k+1)-th row (data k+1) in the period t5; a pixel image signal for the (2k+1)-th row (data 2k+1) in the period t6; and a pixel image signal for the second row (data 2) in the period t7. In this manner, the wiring for supplying the image signal (DATA) supplies pixel image signals for respective rows sequentially. Specifically, image signals are supplied in the following order: the pixel image signal for the s-th row (s is a natural number less than k)→the pixel image signal for the (k+s)-th row→the pixel image signal for the (2k+s)-th row→the pixel image signal for the (s+1)-th row. According to the above-described operation of the scan line driver circuit and the signal line driver circuit, the image signals can be input to the pixels in three rows in the pixel portion per shift period of the pulse output circuit in the scan line driver circuit.

<Structure Example of Backlight>

Figure 5:
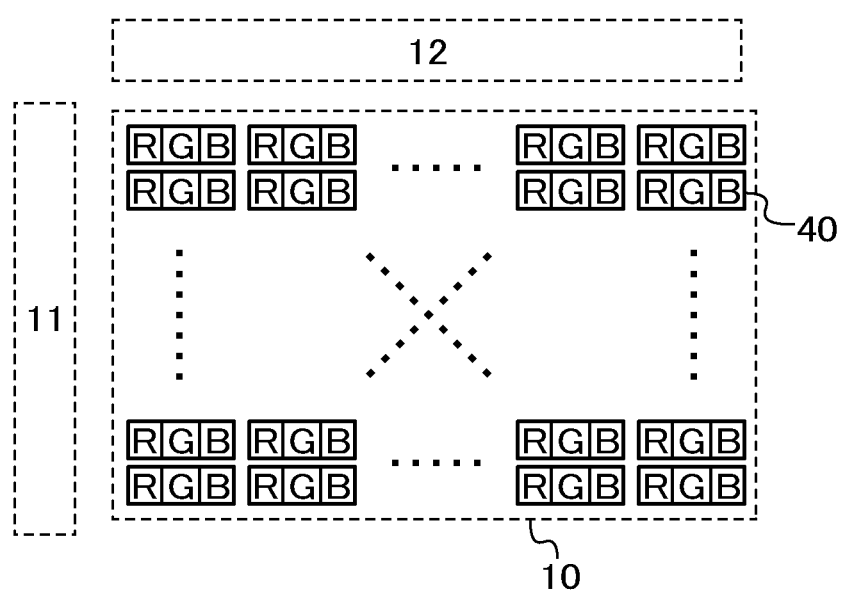
FIG. 5 illustrates a structure example of a backlight.

FIG. 5 illustrates a structure example of a backlight provided behind the pixel portion 10 in the liquid crystal display device illustrated in FIG. 1A. The backlight illustrated in FIG. 5 includes a plurality of backlight units 40 each including a light source that emits red (R) light, a light source that emits green (G) light, and a light source that emits blue (B) light. The plurality of backlight units 40 is arranged in a matrix, and can be controlled to be turned on per specific region. Here, the backlight unit 40 is provided at least at positions in every t row and n column (here, t is k/4) as the backlight for the plurality of pixels 15 of the m rows and the n columns, and the turning on of the backlight units 40 can be controlled individually. In other words, the backlight includes at least a backlight unit for the first to t-th rows to a backlight unit for the (2k+3t+1)-th to m-th rows, and the turning on of the backlight units 40 can be controlled individually. Further, in the backlight unit 40, the turning on of each of the light source that emits red (R) light, the light source that emits green (G) light, and the light source that emits blue (B) light can also be controlled individually. In other words, in the backlight unit 40, red (R) light, green (G) light, or blue (B) light can be delivered to the pixel portion 10 by turning on any one of the light source that emits red (R) light, the light source that emits green (G) light, and the light source that emits blue (B) light; mixed color light formed by a mixture of lights of two colors can be delivered to the pixel portion 10 by turning on any two of the light source that emits red (R) light, the light source that emits green (G) light, and the light source that emits blue (B) light; white (W) light formed by a mixture of lights of three colors can be delivered to the pixel portion 10 by turning on all the light source that emits red (R) light, the light source that emits green (G) light, and the light source that emits blue (B) light.

<Operation Example of Liquid Crystal Display Device>

Figure 6:
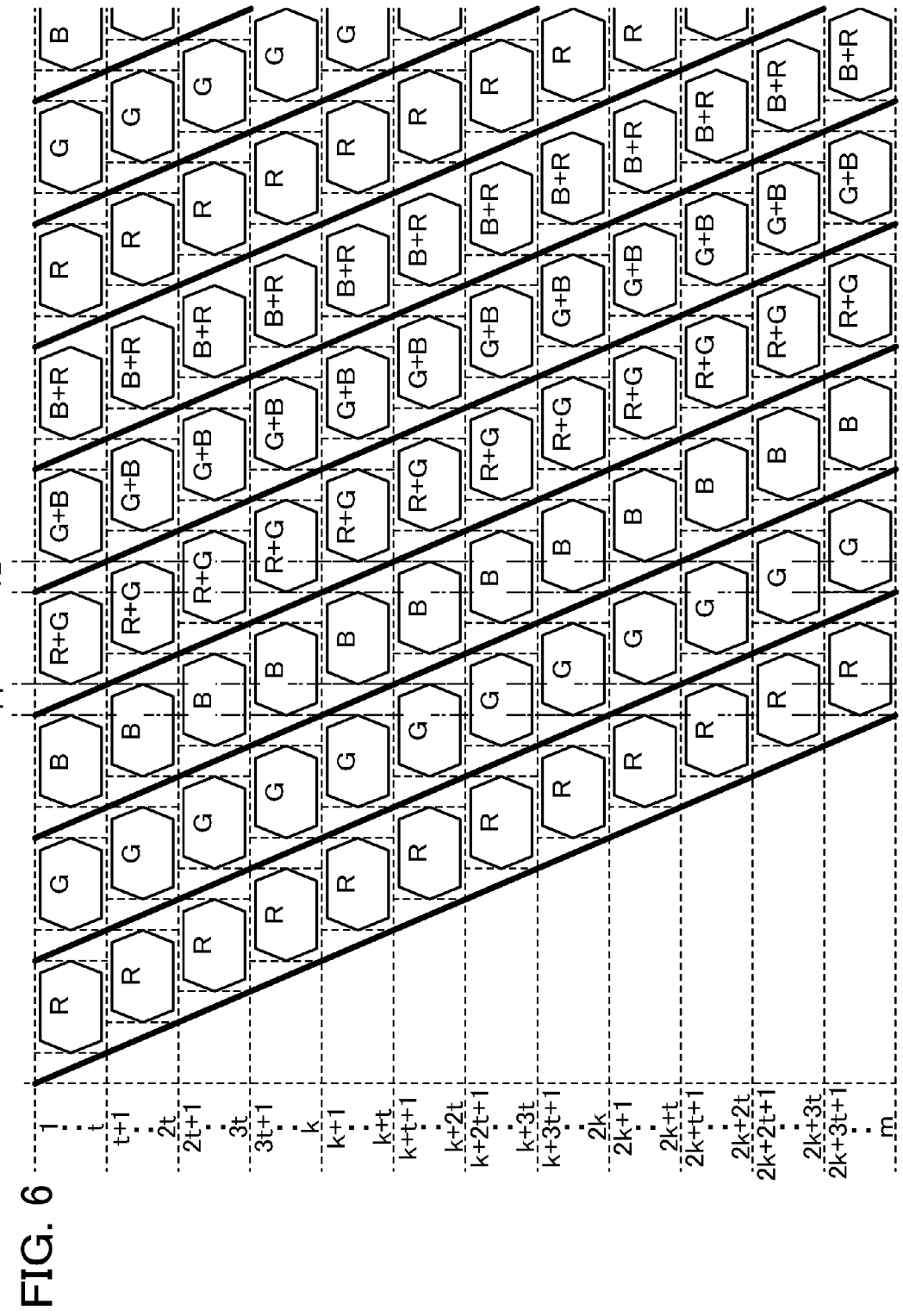
FIG. 6 illustrates an operation example of a liquid crystal display device.

FIG. 6 illustrates timing of scanning of a selection signal in the above-described liquid crystal display device and timing of turning on the backlight unit for the first to t-th rows to the backlight unit for the (2k+3t+1)-th to m-th rows included in the backlight. Note that the vertical axis represents rows (first to m-th rows) in the pixel portion, and the horizontal axis represents time in FIG. 6. Specifically, in FIG. 6, 1 to m each indicate the number of row and solid lines each indicate timing of the input of the image signal to the row. As illustrated in FIG. 6, in the liquid crystal display device, selection signals are not sequentially supplied to the scan lines arranged in the first to the m-th rows but are sequentially supplied to the rows which are spaced by k rows (e.g., in the following order: the scan line in the first row the scan line in the (k+1)-th row→the scan line in the (2k+1)-th row→the scan line in the second row). Therefore, in a period T1, the n pixels arranged in the first row to the n pixels arranged in the t-th row are sequentially selected, the n pixels arranged in the (k+1)-th row to the n pixels arranged in the (k+t)-th row are sequentially selected, and the n pixels arranged in the (2k+1)-th row to the n pixels arranged in the (2k+t)-th row are sequentially selected, so that image signals can be input to the pixels. Note that here, image signals for controlling transmission of mixed color light formed by a mixture of red (R) light and green (G) light are input to the n pixels arranged in the first row to the n pixels arranged in the t-th row, image signals for controlling transmission of blue (B) light are input to the n pixels arranged in the (k+1)-th row to the n pixels arranged in the (k+t)-th row, and image signals for controlling transmission of green (G) light are input to the n pixels arranged in the (2k+1)-th row to the n pixels arranged in the (2k+t)-th row.

Further, in the liquid crystal display device, the backlight unit 40 can be turned on in a period provided between periods in which the image signal is input in a specific region, as illustrated in FIG. 6. Specifically, in a period between the period T1 and a period T2, the light source that emits red (R) light and the light source that emits green (G) light can be turned on in the backlight unit for the first to t-th rows, the light source that emits blue (B) light can be turned on in the backlight unit for the (k+1)-th to (k+t)-th rows, and the light source that emits green (G) light can be turned on in the backlight unit for the (2k+1)-th to (2k+t)-th rows. Note that in the liquid crystal display device, an image is formed in the pixel portion by the operation from the input of the image signals for controlling transmission of red (R) light to the turning on of the light source that emits blue (B) light and the light source that emits red (R) light in the backlight unit, as illustrated in FIG. 6.

<Liquid Crystal Display Device Disclosed in this Embodiment>

The liquid crystal display device of this embodiment can perform input of an image signal and the turning on of a backlight in parallel. Therefore, it is possible to increase the frequency of input of an image signal to each pixel of the liquid crystal display device. Accordingly, color break generated in a field-sequential liquid crystal display device can be suppressed, and the quality of an image displayed by the liquid crystal display device can be improved.

The liquid crystal display device disclosed in this embodiment can achieve the above-mentioned operation while having a simple pixel configuration. Specifically, for a pixel of the liquid crystal display device disclosed in Patent Document 1, the transistor for controlling charge transfer is necessary in addition to the components of the pixel of the liquid crystal display device disclosed in this embodiment. Further, a signal line for controlling on/off of the transistor is also required. In contrast, a pixel configuration of the liquid crystal display device of this embodiment is simple. In other words, the liquid crystal display device of this embodiment can increase the aperture ratio of a pixel, as compared to the liquid crystal display device disclosed in Patent Document 1. Further, the number of wirings extending to a pixel portion is small, so that parasitic capacitance generated between various wirings can be decreased. In other words, various wirings extending to the pixel portion can operate at high speed.

Further, in the case where the backlight is turned on as the operation example in FIG. 6, colors of lights of backlight units adjacent to each other are not different from each other. Specifically, when the backlight is turned on in a region where an image signal is input in the period T1, which follows the image signal writing, the other backlight unit which is adjacent to the one backlight unit does not emit light of a different color. For example, in the period T1, when the light source that emits blue (B) light is turned on in the backlight unit for the (k+1)-th to (k+t)-th rows after the image signals for controlling transmission of blue (B) light are input to the n pixels arranged in the (k+1)-th row to the n pixels arranged in the (k+t)-th row, the light source that emits blue (B) light is turned on or emission itself is not performed (neither red (R) light nor green (G) light is emitted) in the backlight unit for the (3t+1)-th to k-th rows and the backlight unit for the (k+t+1)-th to (k+2t)-th rows. Thus, the probability of transmission of light of a color different from a given color through a pixel to which image data on the given color is input can be reduced.

In the case where a period in which two light sources included in the backlight unit are turned on at the same time is provided as in the operation example in FIG. 6, it is possible to improve display luminance of the liquid crystal display device. Further, a lighting period of each of a plurality of light sources included in the backlight unit is ensured for a long period, whereby display color tones of the liquid crystal display device can be subdivided (shades of color to be displayed or the like can be expressed more finely). Here, in the operation example in FIG. 6, there are not only a period in which any one of the light source that emits red (R) light, the light source that emits green (G) light, and the light source that emits blue (B) light is turned on but also a period in which two of them are turned on at the same time. Therefore, in the operation example in FIG. 6, scanning of image signals is performed six times, whereby it is possible to ensure a period in which the light source that emits red (R) light, the light source that emits green (G) light, and the light source that emits blue (B) light are each turned on three times. In other words, in the operation example in FIG. 6, it is possible to increase a lighting period of each of the plurality of light sources efficiently. Accordingly, in the operation example in FIG. 6, display color tones can be subdivided efficiently.

Modification Example

The liquid crystal display device described in this embodiment is one embodiment of the present invention, and the present invention includes a liquid crystal display device which is different from the above-described liquid crystal display device.

For example, the liquid crystal display device of this embodiment has a structure in which the pixel portion 10 is divided into three regions and image signals are supplied in parallel to the three regions; however, a liquid crystal display device according to one embodiment of the present invention is not limited to the structure. In other words, the liquid crystal display device according to one embodiment of the present invention can have a structure in which the pixel portion 10 is divided into a plurality of regions the number of which is not three and image signals are supplied in parallel to the plurality of regions. In the case where the number of regions is changed, it is necessary to set clock signals for the scan line driver circuit and pulse-width control signals in accordance with the number of regions.

The liquid crystal display device of this embodiment includes a capacitor for retaining voltage applied to a liquid crystal element (see FIG. 1B); however, it is possible not to include the capacitor. In this case, the aperture ratio of the pixel can be increased. Since a capacitor wiring extending to a pixel portion can be removed, various wirings extending to the pixel portion can operate at high speed.

Figure 7A:
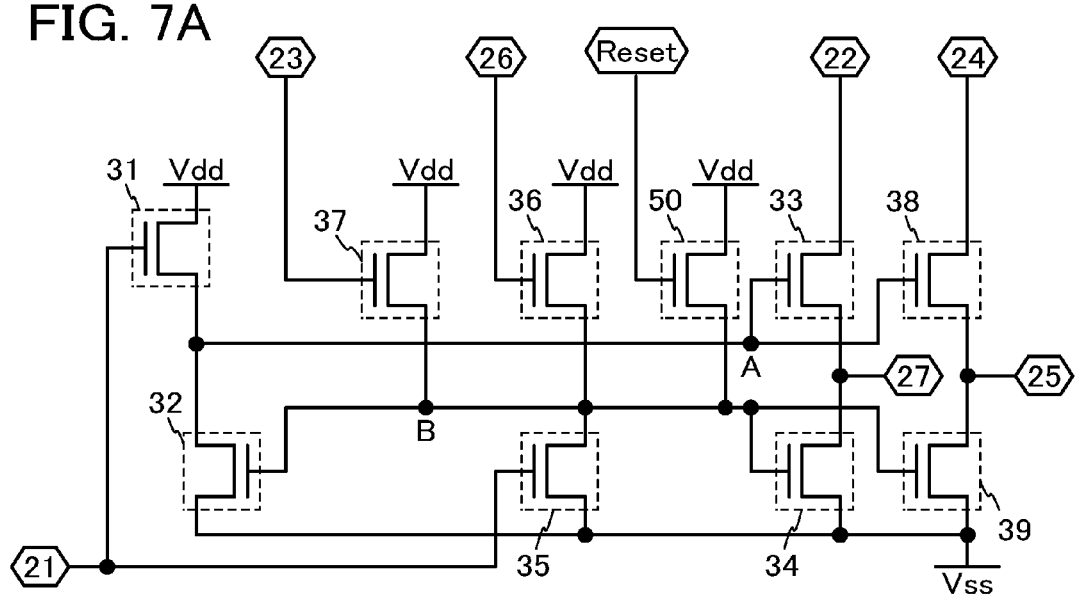
FIGS. 7A and 7B are circuit diagrams illustrating examples of a pulse output circuit.

Further, the pulse output circuit can have a structure in which a transistor 50 is added to the pulse output circuit illustrated in FIG. 3A (see FIG. 7A). One of a source and a drain of the transistor 50 is electrically connected to the high power supply potential line; the other of the source and the drain of the transistor 50 is electrically connected to the gate of the transistor 32, the gate of the transistor 34, the other of the source and the drain of the transistor 35, the other of the source and the drain of the transistor 36, the other of the source and the drain of the transistor 37, and the gate of the transistor 39; and a gate of the transistor 50 is electrically connected to a reset terminal (Reset). To the reset terminal, the high-level potential is input in a period after an image is formed in the pixel portion; the low-level potential is input in the other period. Note that the high-level potential is input, whereby the transistor 50 is turned on. Thus, the potential of each node can be initialized, so that malfunction can be prevented. Note that in the case where the initialization is performed, it is necessary to provide an initialization period after the period in which an image is formed in the pixel portion. In the case where a period in which the backlight is turned off is provided after the period in which an image is formed in the pixel portion, which is to be described later with reference to FIG. 9, the initialization can be performed in the period in which the backlight is turned off.

Figure 7B:
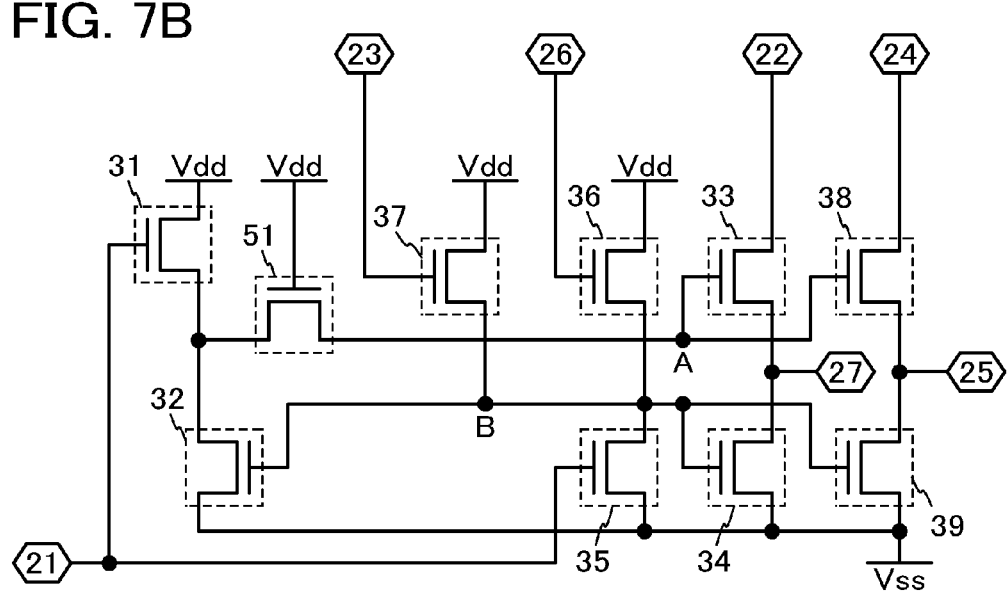

Further alternatively, the pulse output circuit can have a structure in which a transistor 51 is added to the pulse output circuit illustrated in FIG. 3A (see FIG. 7B). One of a source and a drain of the transistor 51 is electrically connected to the other of the source and the drain of the transistor 31 and the other of the source and the drain of the transistor 32; the other of the source and the drain of the transistor 51 is electrically connected to the gate of the transistor 33 and the gate of the transistor 38; and a gate of the transistor 51 is electrically connected to the high power supply potential line. The transistor 51 is turned off in a period in which the potential of the node A is at a high level (the periods t1 to t6 in FIGS. 3B to 3D). With the transistor 51, the gate of the transistor 33 and the gate of the transistor 38 can be electrically disconnected to the other of the source and the drain of the transistor 31 and the other of the source and the drain of the transistor 32 in the periods t1 to t6. Thus, a load at the time of the bootstrapping in the pulse output circuit can be reduced in the periods t1 to t6.

Figure 8A:
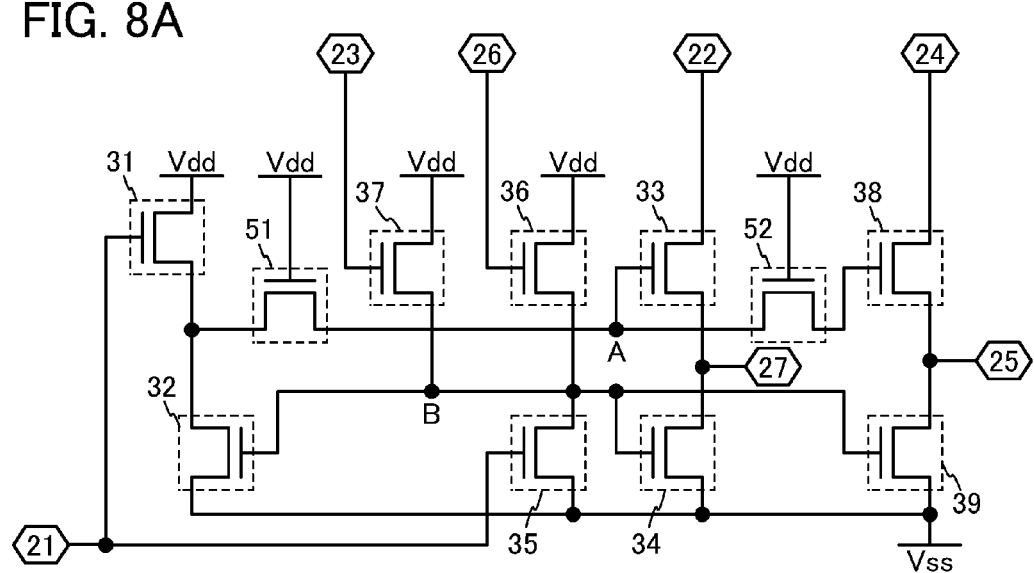
FIGS. 8A and 8B are circuit diagrams illustrating examples of a pulse output circuit.

Further alternatively, the pulse output circuit can have a structure in which a transistor 52 is added to the pulse output circuit illustrated in FIG. 7B (see FIG. 8A). One of a source and a drain of the transistor 52 is electrically connected to the gate of the transistor 33 and the other of the source and the drain of the transistor 51; the other of the source and the drain of the transistor 52 is electrically connected to the gate of the transistor 38; and a gate of the transistor 52 is electrically connected to the high power supply potential line. As described above, a load at the time of the bootstrapping in the pulse output circuit can be reduced with the transistor 52. In particular, the load-reduction effect is large in the case where the potential of the node A is increased only by the capacitive coupling between the source and the gate of the transistor 33 (see FIG. 3D).

Figure 8B:
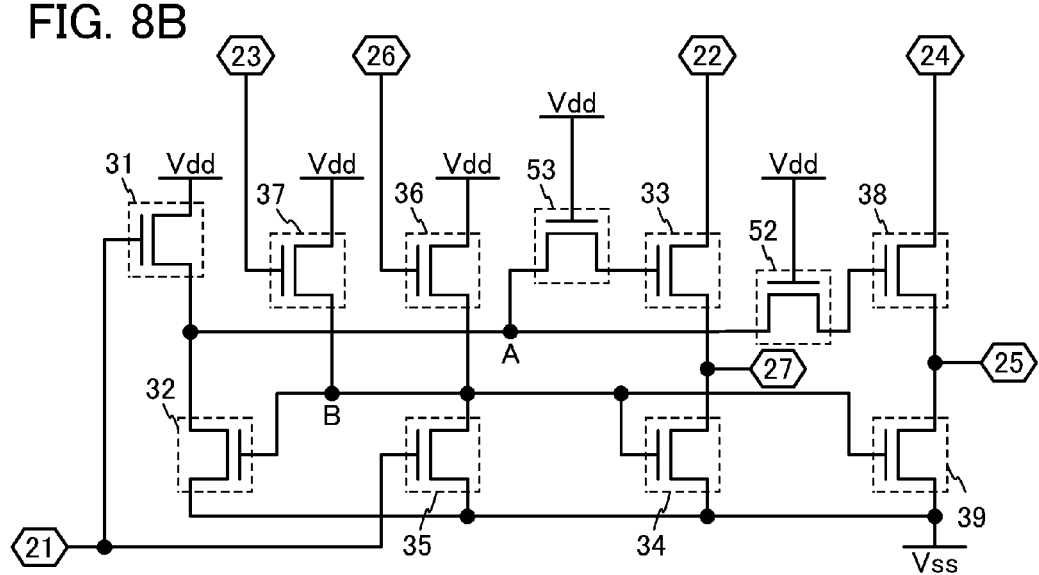

Further alternatively, the pulse output circuit can have a structure in which the transistor 51 is removed from the pulse output circuit illustrated in FIG. 8A and a transistor 53 is added to the pulse output circuit illustrated in FIG. 8A (see FIG. 8B). One of a source and a drain of the transistor 53 is electrically connected to the other of the source and the drain of the transistor 31, the other of the source and the drain of the transistor 32, and one of the source and the drain of the transistor 52; the other of the source and the drain of the transistor 53 is electrically connected to the gate of the transistor 33; and a gate of the transistor 53 is electrically connected to the high power supply potential line. As described above, with the transistor 53, a load at the time of the bootstrapping in the pulse output circuit can be reduced. Further, an effect of a fraud pulse generated in the pulse output circuit on the switching of the transistors 33 and 38 can be decreased.

Further, in the liquid crystal display device of this embodiment, the three kinds of light sources, that is, the light source that emits red (R) light, the light source that emits green (G) light, and the light source that emits blue (B) light are aligned linearly and horizontally as the backlight unit (see FIG. 5); however, the structure of the backlight unit is not limited to this. For example, the three kinds of light sources may be arranged triangularly, or linearly and longitudinally; or a red (R) backlight unit, a green (G) backlight unit, and a blue (B) backlight unit may be provided individually. Moreover, the above-described liquid crystal display device is provided with a direct-lit backlight as the backlight (see FIG. 5); alternatively, an edge-lit backlight can be used as the backlight.

Figure 9:
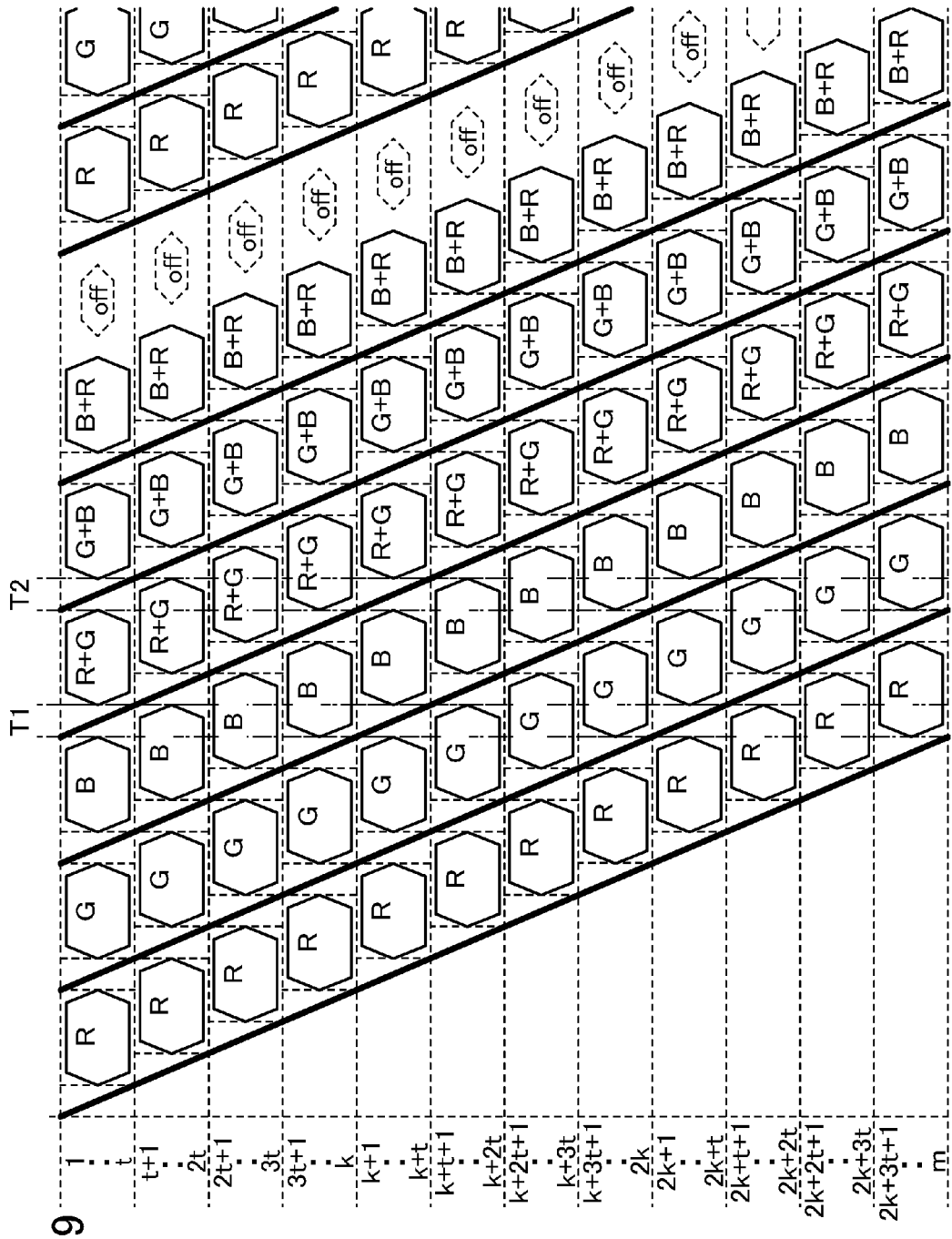
FIG. 9 illustrates an operation example of a liquid crystal display device.

The liquid crystal display device of this embodiment successively performs scanning of a selection signal and the turning on of the backlight unit (see FIG. 6); however, the operation of the liquid crystal display device is not limited to that of this structure. For example, before and after a period in which an image is formed in the pixel portion (the period corresponds to a period in which an input of an image signal for controlling transmission of red (R) light to the turning on of the light source that emits blue (B) light and the light source that emits red (R) light in the backlight unit are performed in FIG. 6), it is possible to provide a period in which scanning of a selection signal and the turning on of the backlight unit are not performed (see FIG. 9). Thus, color break generated in the liquid crystal display device can be suppressed and the quality of an image displayed by the liquid crystal display device can be improved. Note that the structure in which neither scanning of a selection signal nor the turning on of the backlight unit are performed is illustrated in FIG. 9; however, a structure in which scanning of a selection signal is performed and an image signal for not transmitting light to each pixel is input can also be formed.

Figure 10:
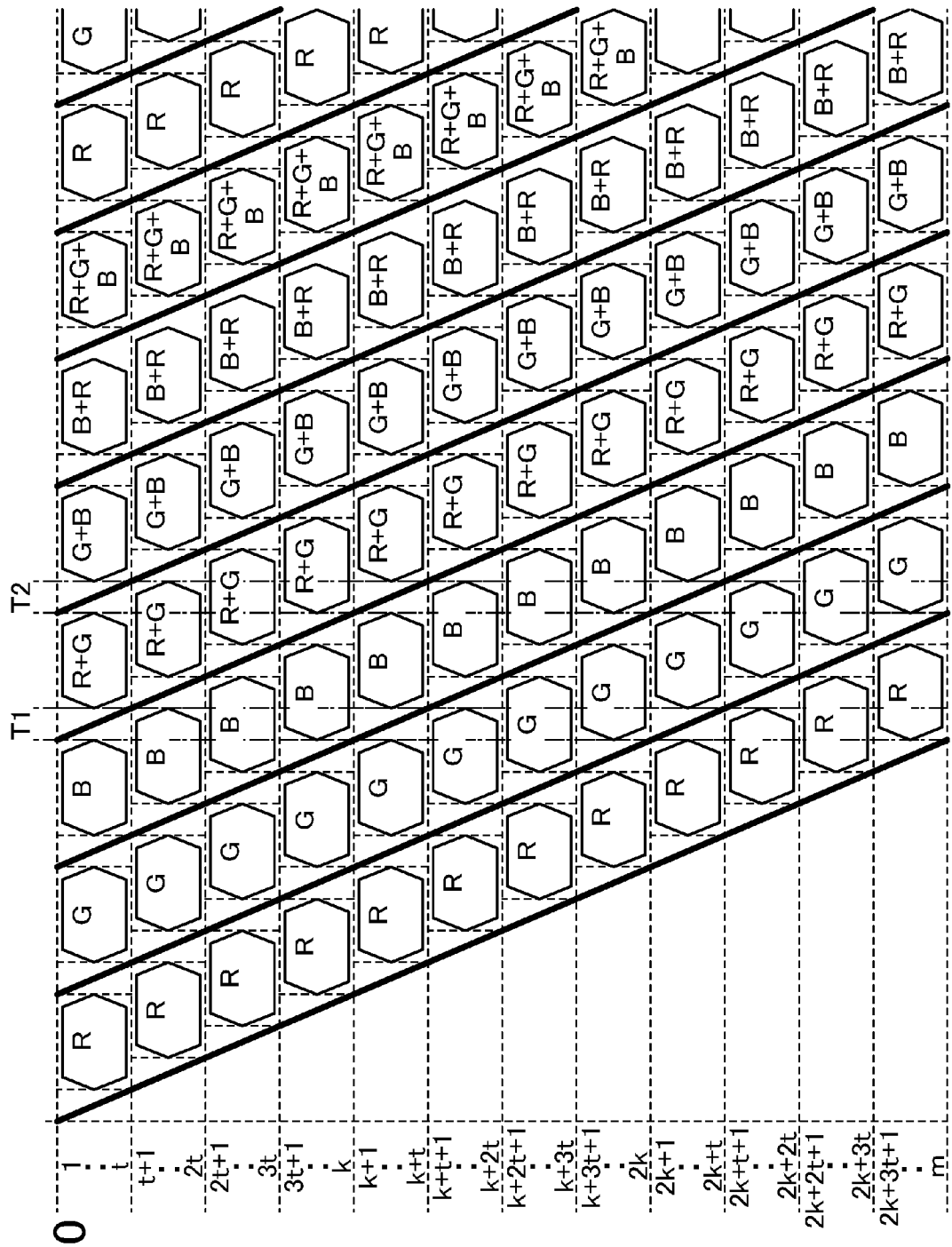
FIG. 10 illustrates an operation example of a liquid crystal display device.

The liquid crystal display device of this embodiment is provided with a period in which one or two light sources of three light sources included in the backlight unit is/are turned on per specific region in the pixel portion (see FIG. 6); however, it is possible to provide a period in which all three light sources included in the backlight unit are turned on (see FIG. 10). In this case, it is possible to further improve display luminance of the liquid crystal display device and to further subdivide display color tones of the liquid crystal display device. Note that in the operation example illustrated in FIG. 10, an image is formed in the pixel portion by the operation from the input of the image signals for controlling transmission of red (R) light to the turning on of the light source that emits red (R) light, the light source that emits green (G) light, and the light source that emits blue (B) light in the backlight unit.

Figure 11:
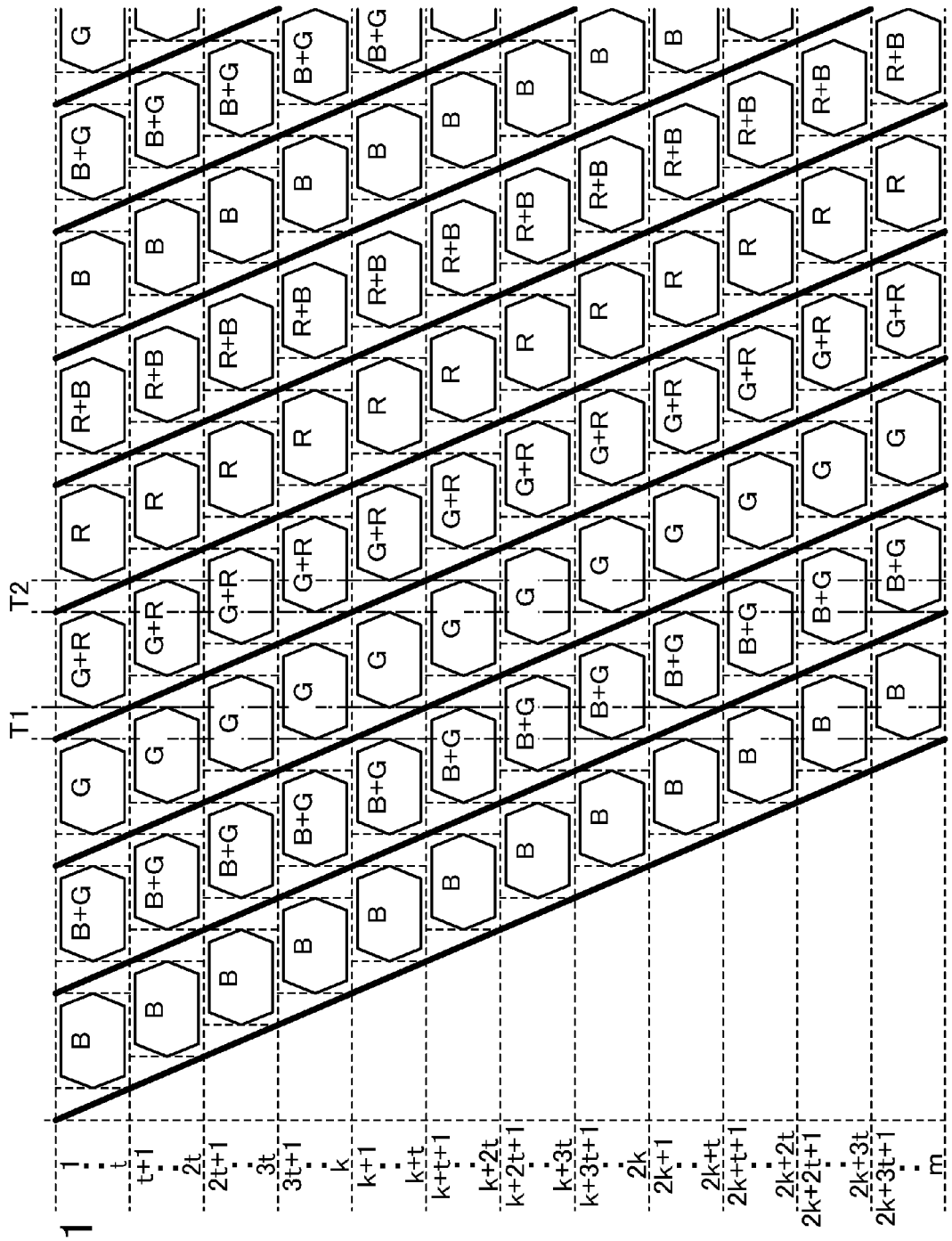
FIG. 11 illustrates an operation example of a liquid crystal display device.
Figure 12:
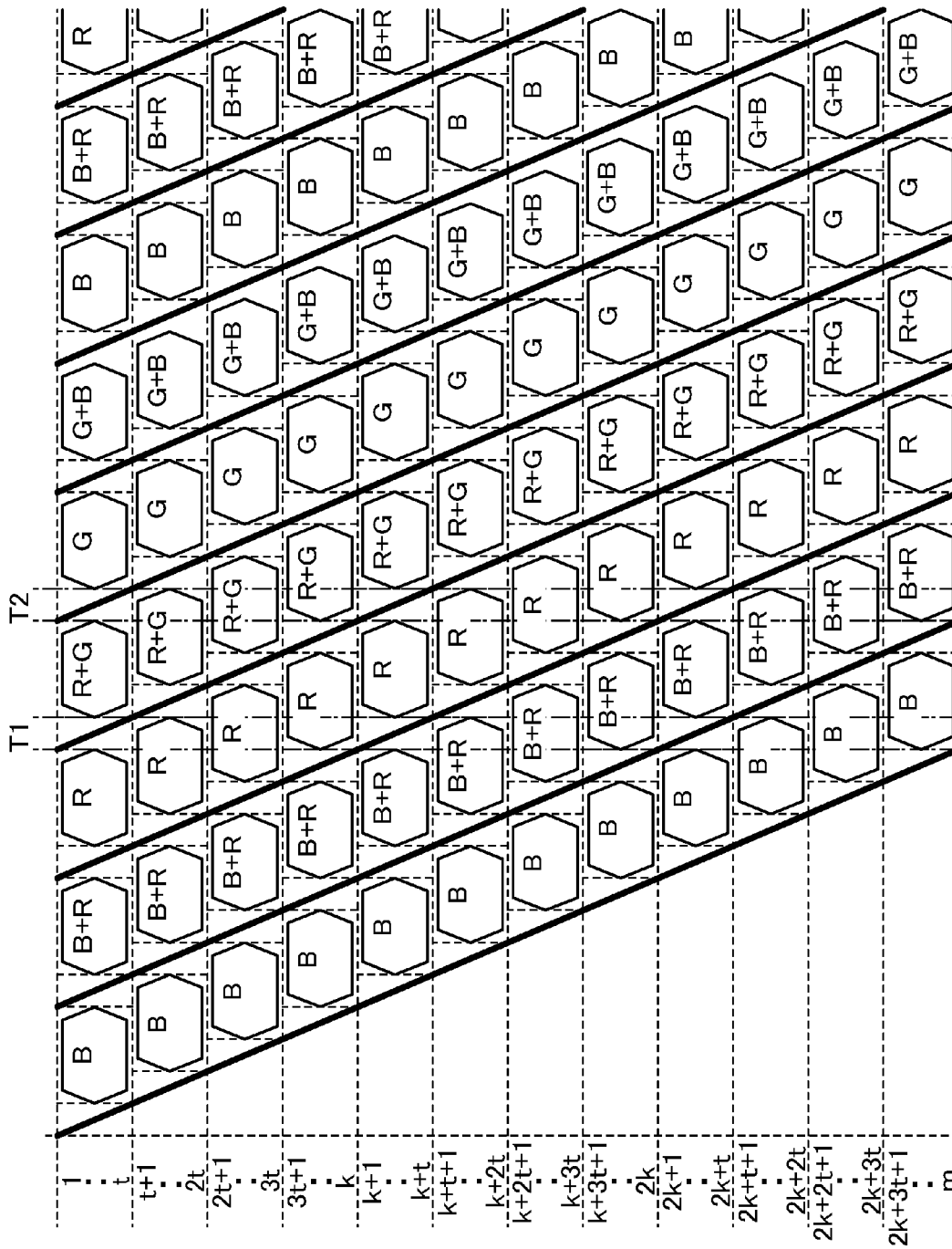
FIG. 12 illustrates an operation example of a liquid crystal display device.
Figure 13:
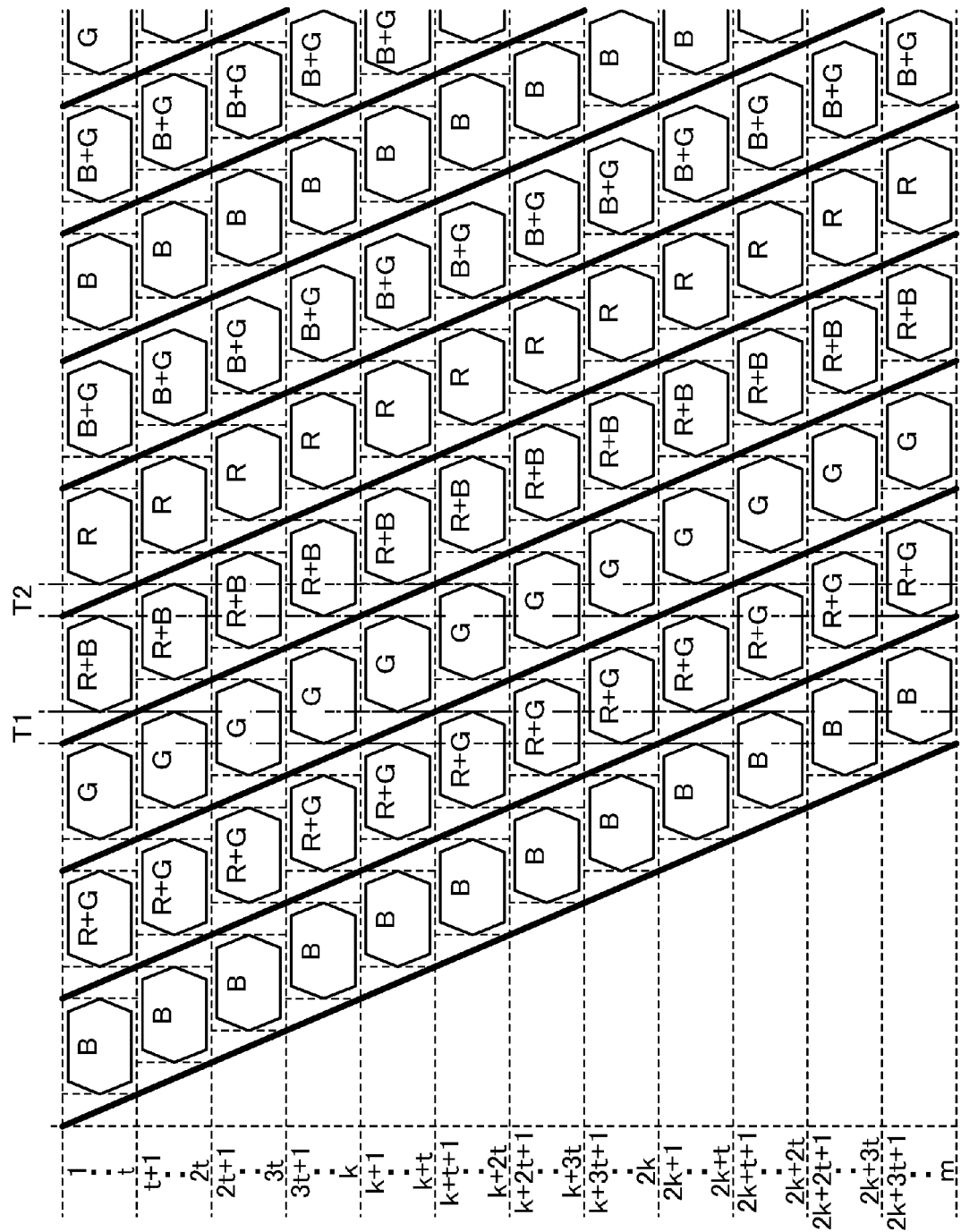
FIG. 13 illustrates an operation example of a liquid crystal display device.
Figure 14:
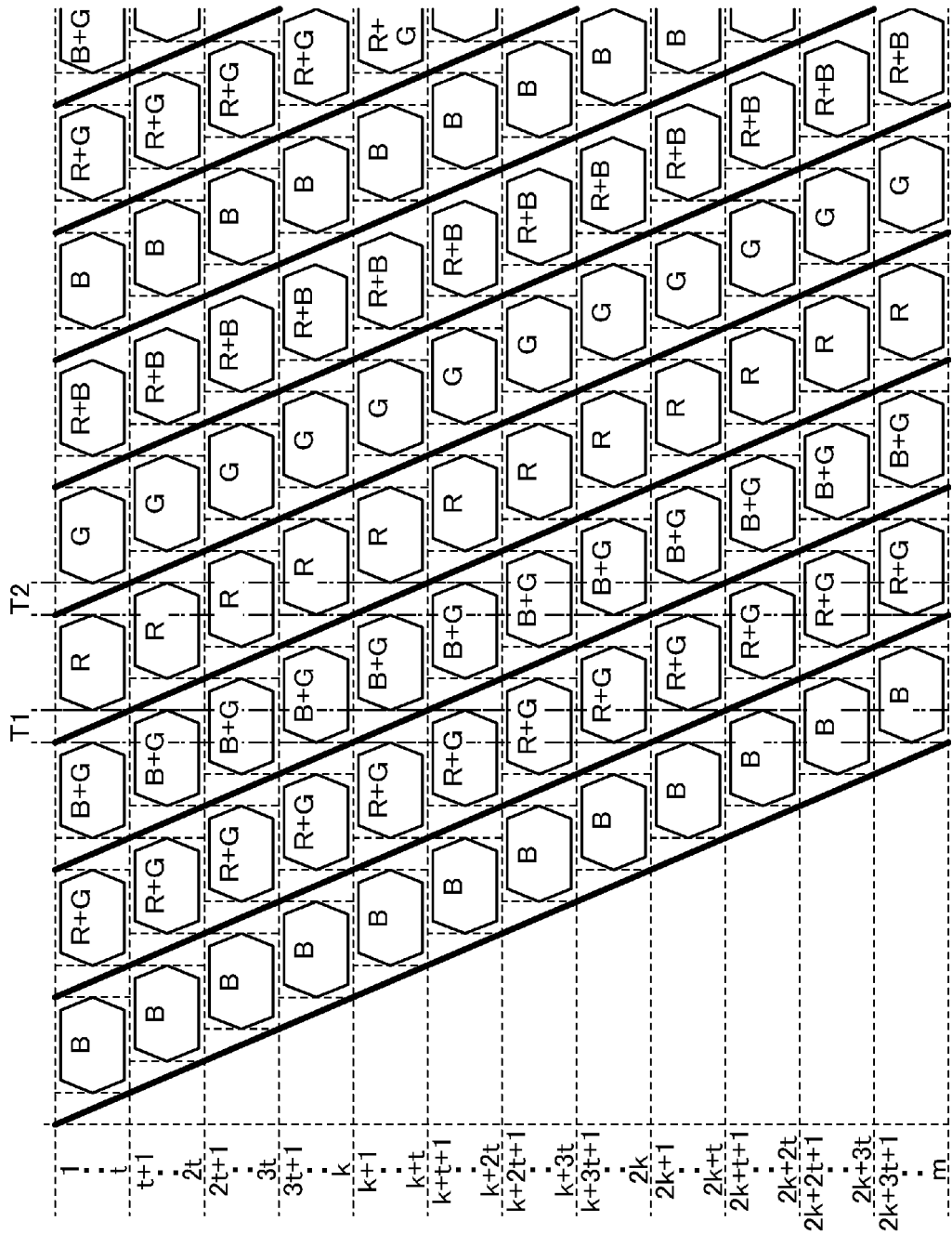
FIG. 14 illustrates an operation example of a liquid crystal display device.

In the liquid crystal display device of this embodiment, an image is formed per specific region of the pixel portion by turning on the light sources of the backlight unit in the following order: red (R)→green (G)→blue (B)→red (R) and green (G)→green (G) and blue (B)→blue (B) and red (R) (see FIG. 6). However, the order of turning on the light sources in the liquid crystal display device of this embodiment is not limited to the order. For example, it is possible to have a structure in which an image is formed by the following order of turning on the light sources: blue (B)→blue (B) and green (G)→green (G)→green (G) and red (R)→red (R)→red (R) and blue (B) (see FIG. 11); a structure in which an image is formed by the following order of turning on the light sources: blue (B)→blue (B) and red (R)→red (R)→red (R) and green (G)→green (G)→green (G) and blue (B) (see FIG. 12); a structure in which an image is formed by the following order of turning on the light sources: blue (B)→red (R) and green (G)→green (G)→blue (B) and red (R)→red (R)→green (G) and blue (B) (see FIG. 13); a structure in which an image is formed by the following order of turning on the light sources: blue (B)→red (R) and green (G)→blue (B) and green (G)→red (R)→green (G)→red (R) and blue (B) (see FIG. 14); or the like. Note that it is needless to say that the input order of an image signal for controlling transmission of light of a specific color needs to be designed in accordance with the order of turning on the light source, as appropriate.

Figure 15:
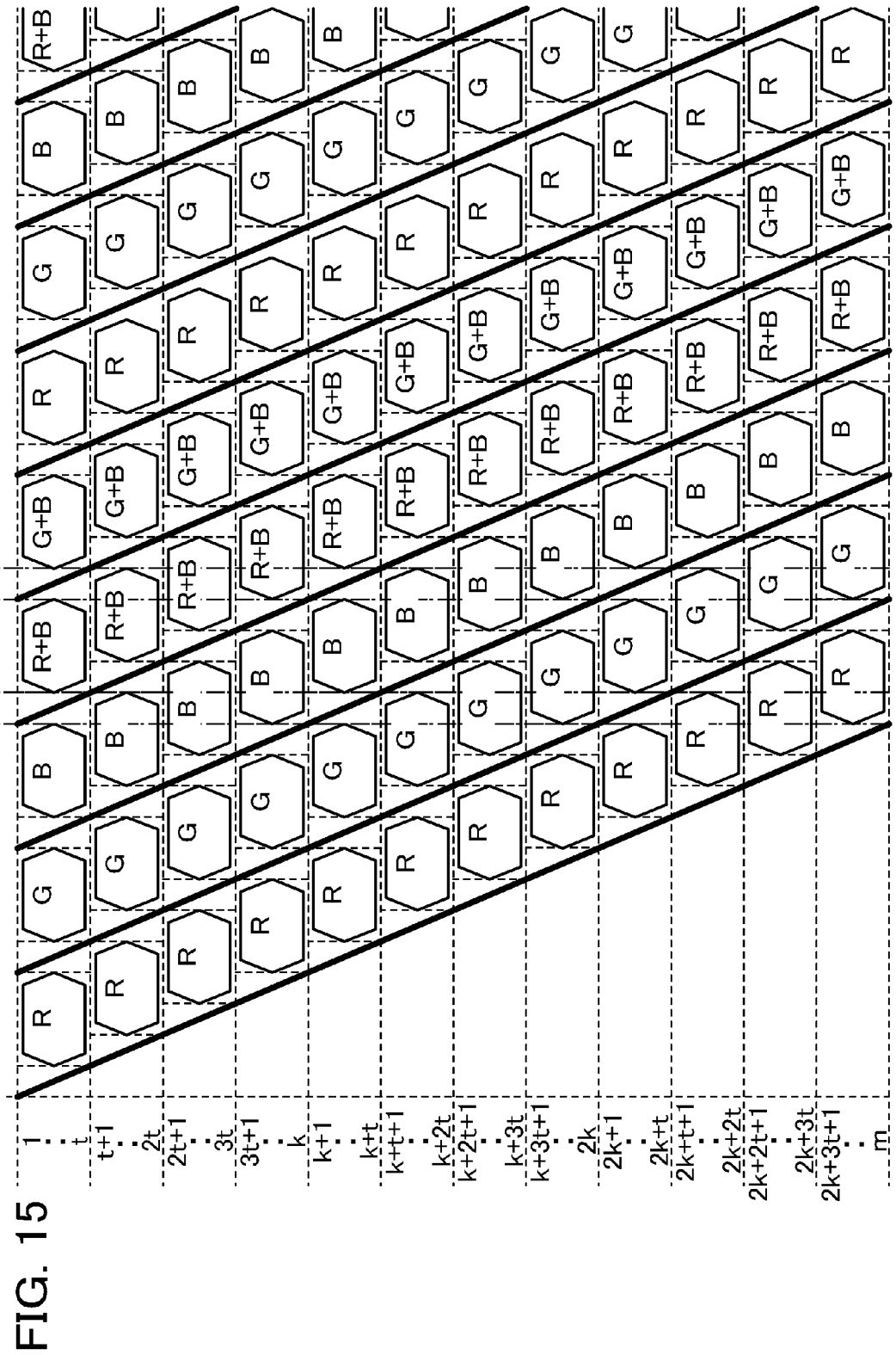
FIG. 15 illustrates an operation example of a liquid crystal display device.

In the liquid crystal display device of this embodiment, the light source that emits red (R) light, the light source that emits green (G) light, and the light source that emits blue (B) light included in the backlight unit are each turned on three times, whereby an image is formed (see FIG. 6); however, the number of lightings of the light sources in the liquid crystal display device of this embodiment can vary. For example, the backlight unit is turned on so that the light source that emits red (R) light and has a high luminosity factor and the light source that emits green (G) light are turned on twice and the light source that emits blue (B) light and has a low luminosity factor is turned on three times, whereby an image can be formed (see FIG. 15). Note that in the operation example illustrated in FIG. 15, an image is formed in the pixel portion by the operation from the input of the image signals for controlling transmission of red (R) light to the turning on of the light source that emits green (G) light and the light source that emits blue (B) light in the backlight unit.

In the liquid crystal display device of this embodiment, the three kinds of light sources, that is, the light source that emits red (R) light, the light source that emits green (G) light, and the light source that emits blue (B) light are used in combination for the backlight unit; however, the liquid crystal display device according to one embodiment of the present invention is not limited to having this structure. In other words, in the liquid crystal display device according to one embodiment of the present invention, light sources that emit lights of different colors can be provided in combination to form a backlight. For example, four kinds of light sources, that is, the light source that emits red (R) light, the light source that emits green (G) light, the light source that emits blue (B) light, and a light source that emits white (W) light or four kinds of light sources, that is, light source that emits red (R) light, the light source that emits green (G) light, the light source that emits blue (B) light, and a light source that emits yellow (Y) light can be used in combination; or three kinds of light sources, that is, a light source that emits cyan (C) light, a light source that emits magenta (M) light, and the light source that emits yellow (Y) light can be used in combination. Note that in the case where a light source that emits white (W) light is included in the backlight unit, white (W) light can be formed not by a color mixture but by the light source. Because the light source has high luminous efficiency, a backlight is formed using the light source, whereby power consumption can be reduced. In the case where a backlight unit includes two kinds of light sources that emit complementary color lights (e.g., the case where two kinds of light sources, that is, the light source that emits blue (B) light, and the light source of yellow (Y) light), the lights emitted from the light sources are mixed, whereby white (W) light can be formed. Moreover, it is possible to use a combination of six kinds of light sources, that is, a light source that emits pale red (R) light, a light source that emits pale green (G) light, a light source that emits pale blue (B), a light source that emits dark red (R) light, a light source that emits dark green (G) light, and a light source that emits dark blue (B) light; or a combination of six kinds of light sources, that is, the light source that emits red (R) light, the light source that emits green (G) light, the light source that emits blue (B) light, the light source that emits cyan (C) light, the light source that emits magenta (M) light, and the light source that emits yellow (Y) light. In such a manner, with a combination of a wider variety of light sources, the color gamut of the liquid crystal display device can be enlarged, and the image quality can be improved.

A plurality of structures described as the modification example of this embodiment can be applied to the liquid crystal display device of this embodiment.

This embodiment or part of this embodiment can be freely combined with the other embodiments or part of the other embodiments.

Embodiment 2

In this embodiment, a liquid crystal display device of one embodiment of the present invention having a structure which is different from that in Embodiment 1 will be described with reference to FIGS. 16A to 16D, FIGS. 17A and 17B, FIGS. 18A and 18B, and FIG. 19.

<Structure Example of Liquid Crystal Display Device>

FIG. 16A illustrates a structure example of a liquid crystal display device. The liquid crystal display device illustrated in FIG. 16A includes a pixel portion 60; a scan line driver circuit 61; a signal line driver circuit 62; 3i (i is a natural number that is 2 or more) scan lines 63 which are arranged parallel (or substantially parallel) to each other and whose potentials are controlled by the scan line driver circuit 61; and j (j is a natural number that is 2 or more) signal lines 641, j signal lines 642, and j signal lines 643 which are arranged parallel (or substantially parallel) to each other and whose potentials are controlled by the signal line driver circuit 62.

The pixel portion 60 is divided into three regions (regions 601 to 603) and includes a plurality of pixels which are arranged in a matrix (i rows and j columns) in each region. Each of the scan lines 63 is electrically connected to j pixels arranged in a given row among the plurality of pixels arranged in a matrix (3i rows and j columns) in the pixel portion 60. Further, each of the signal lines 641 is electrically connected to i pixels in a given column among the plurality of pixels arranged in a matrix (the i rows and the j columns) in the region 601. In addition, each of the signal lines 642 is electrically connected to i pixels in a given column among the plurality of pixels arranged in a matrix (the i rows and the j columns) in the region 602. Furthermore, each of the signal lines 643 is electrically connected to i pixels in a given column among the plurality of pixels arranged in a matrix (the i rows and the j columns) in the region 603.

Note that a start signal (GSP) for the scan line driver circuit, the clock signal (GCK) for the scan line driver circuit, and drive power supply potentials such as a high power supply potential and a low power supply potential are input to the scan line driver circuit 61 from the outside. Further, signals such as the start pulse (SSP) for the signal line driver circuit, the clock signal (SCK) for the signal line driver circuit, and image signals (data1 to data3), and drive power supply potentials such as a high power supply potential and a low power supply potential are input to the signal line driver circuit 62 from the outside.

FIGS. 16B to 16D illustrate examples of the circuit configurations of pixels. Specifically, FIG. 16B illustrates an example of the circuit configuration of a pixel 651 provided in the region 601; FIG. 16C illustrates an example of the circuit configuration of a pixel 652 provided in the region 602; and FIG. 16D illustrates an example of the circuit configuration of a pixel 653 provided in the region 603. The pixel 651 in FIG. 16B includes a transistor 6511, a capacitor 6512, and a liquid crystal element 6513. A gate of the transistor 6511 is electrically connected to the scan line 63, and one of a source and a drain of the transistor 6511 is electrically connected to the signal line 641. One of electrodes of the capacitor 6512 is electrically connected to the other of the source and the drain of the transistor 6511, and the other of the electrodes of the capacitor 6512 is electrically connected to a wiring for supplying a capacitor potential (the wiring is also referred to as a capacitor wiring). One of electrodes (also referred to as a pixel electrode) of the liquid crystal element 6513 is electrically connected to the other of the source and the drain of the transistor 6511 and one of the electrodes of the capacitor 6512, and the other of the electrodes (also referred to as a counter electrode) of the liquid crystal element 6513 is electrically connected to a wiring for supplying a counter potential.

The pixel 652 in FIG. 16C and the pixel 653 in FIG. 16D have the same circuit configuration as the pixel 651 in FIG. 16B. Note that the pixel 652 in FIG. 16C differs from the pixel 651 in FIG. 16B in that one of a source and a drain of a transistor 6521 is electrically connected to the signal line 642 instead of the signal line 641; and the pixel 653 in FIG. 16D differs from the pixel 651 in FIG. 16B in that one of a source and a drain of a transistor 6531 is electrically connected to the signal line 643 instead of the signal line 641.

<Structure Example of Scan Line Driver Circuit 61>

Figure 17A:
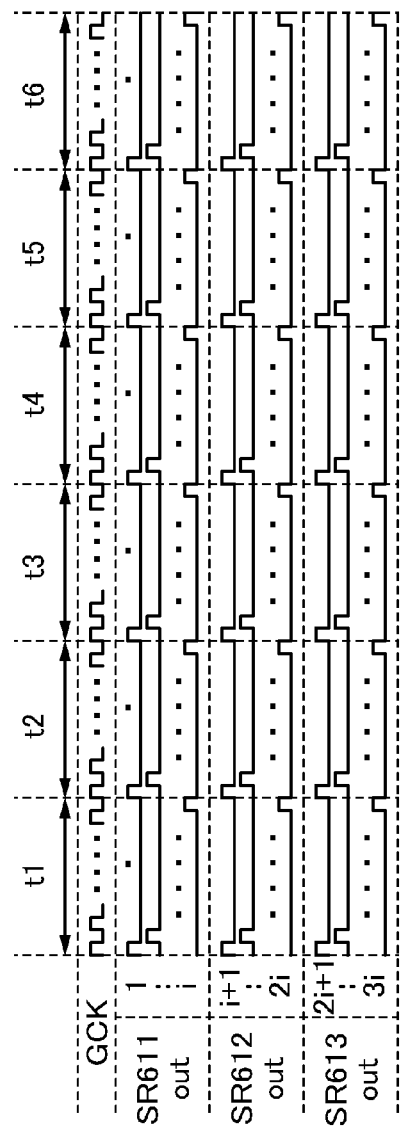
FIG. 17A illustrates a structure example of a scan line driver circuit.

FIG. 17A illustrates a structure example of the scan line driver circuit 61 included in the liquid crystal display device in FIG. 16A. The scan line driver circuit 61 illustrated in FIG. 17A includes shift registers 611 to 613 each including i output terminals. Note that each output terminal of the shift register 611 is electrically connected to one of the i scan lines 63 provided in the region 601. Each output terminal of the shift register 612 is electrically connected to one of the i scan lines 63 provided in the region 602. Each output terminal of the shift register 613 is electrically connected to one of the i scan lines 63 provided in the region 603. In other words, the shift register 611 scans selection signals in the region 601; the shift register 612 scans selection signals in the region 602; and the shift register 613 scans selection signals in the region 603. Specifically, the shift register 611 has a function of sequentially shifting selection signals from the scan line 63 in a first row (i.e., a function of sequentially selecting the scan lines 63 every ½ cycle of the clock signal (GCK)) for the scan line driver circuit by using the start pulse (GSP) for the scan line driver circuit input from the outside, as a trigger. The shift register 612 has a function of sequentially shifting selection signals from the scan line 63 in a (i+1)-th row, by using the start pulse (GSP) for the scan line driver circuit input from the outside, as a trigger. The shift register 613 has a function of sequentially shifting selection signals from the scan line 63 in a (2i+1)-th row, by using the start pulse (GSP) for the scan line driver circuit input from the outside, as a trigger.

Figure 17B:
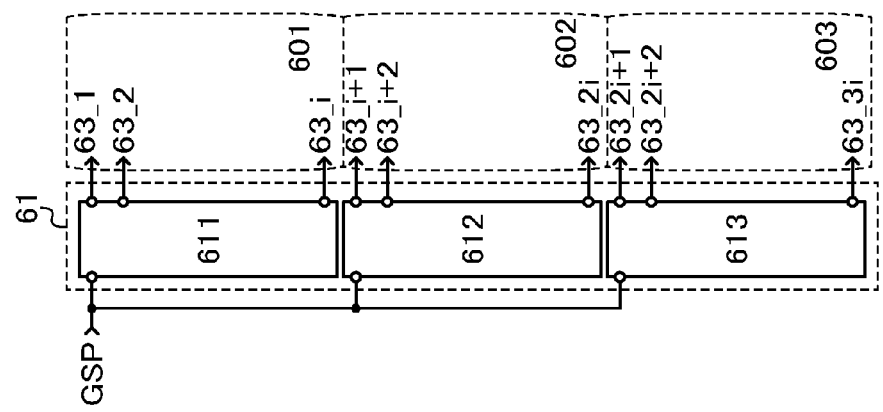
FIG. 17B illustrates an operation example of the scan line driver circuit.

An operation example of the scan line driver circuit 61 will be described with reference to FIG. 17B. Note that FIG. 17B illustrates the clock signal (GCK) for the scan line driver circuit, signals (SR611out) output from the i output terminals of the shift register 611, signals (SR612out) output from the i output terminals of the shift register 612, and signals (SR613out) output from the i output terminals of the shift register 613.

In sampling period (t1), the high-level potentials are sequentially shifted from the scan line 63_1 provided in the first row to the scan line 63_i provided in an i-th row every ½ cycle of the clock signal (horizontal scan period) in the shift register 611; the high-level potentials are sequentially shifted from the scan line 63_(i+1) provided in an (i+1)-th row to the scan line 63_2i provided in a 2i-th row every ½ cycle of the clock signal (horizontal scan period) in the shift register 612; and the high-level potentials are sequentially shifted from the scan line 63_(2i+1) provided in a (2i+1)-th row to the scan line 63_3i provided in the 3i-th row every ½ cycle of the clock signal (horizontal scan period) in the shift register 613.

Therefore, in the scan line driver circuit 61, j pixels 651 arranged in the first row to j pixels 651 arranged in the i-th row are sequentially selected; j pixels 652 arranged in the (i+1)-th row to j pixels 652 arranged in the 2i-th row are sequentially selected; and j pixels 653 arranged in the (2i+1)-th row to j pixels 653 arranged in the 3i-th row are sequentially selected. In other words, in the scan line driver circuit 61, selection signals can be supplied to 3j pixels in different three rows every horizontal scan period.

In sampling periods (t2) to (t6), the operation of the shift registers 611 to 613 is the same as that in the sampling period (t1). In other words, in the scan line driver circuit 61, as in the sampling period (t1), selection signals can be supplied to 3j pixels in given three rows every horizontal scan period.

<Structure Example of Signal Line Driver Circuit 62>

Figure 18A:
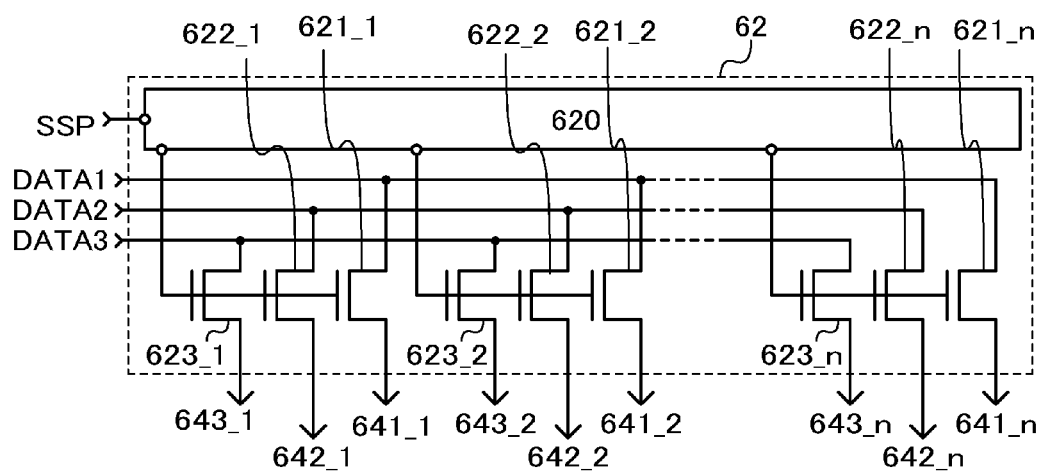
FIG. 18A illustrates a structure example of a signal line driver circuit.

FIG. 18A illustrates a structure example of the signal line driver circuit 62 included in the liquid crystal display device in FIG. 16A. The signal line driver circuit 62 illustrated in FIG. 18A includes a shift register 620 having j output terminals, j transistors 621, j transistors 622, and j transistors 623. Note that a gate of the transistor 621 is electrically connected to a p-th output terminal (p is a natural number that is 1 or more and j or less) of the shift register 620; one of a source and a drain of the transistor 621 is electrically connected to a wiring for supplying the first image signal (DATA1); and the other of the source and the drain of the transistor 621 is electrically connected to the signal line 641 provided in a p-th column in the pixel portion 60. A gate of the transistor 622 is electrically connected to the p-th output terminal of the shift register 620; one of a source and a drain of the transistor 622 is electrically connected to a wiring for supplying the second image signal (DATA2); and the other of the source and the drain of the transistor 622 is electrically connected to the signal line 642 provided in the p-th column in the pixel portion 60. A gate of the transistor 623 is electrically connected to the p-th output terminal of the shift register 620; one of a source and a drain of the transistor 623 is electrically connected to a wiring for supplying the third image signal (DATA3); and the other of the source and the drain of the transistor 623 is electrically connected to the signal line 643 in the p-th column in the pixel portion 60.

Figure 18B:
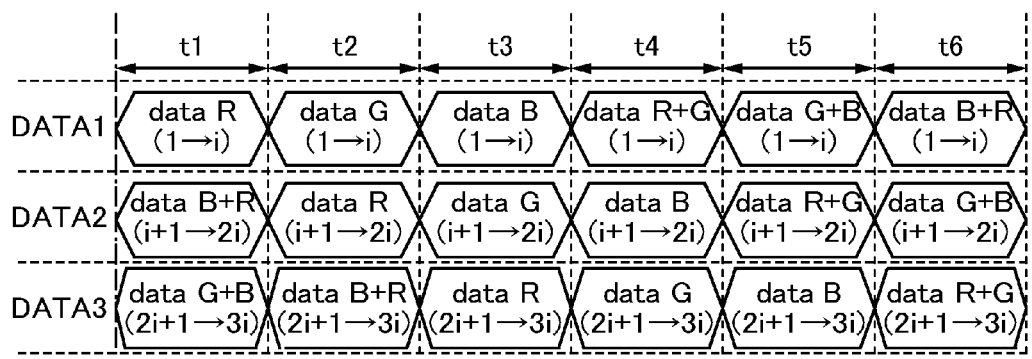
FIG. 18B illustrates an operation example of the signal line driver circuit.

FIG. 18B illustrates an example of timing of image signals which are supplied through the wirings for supplying the first to third image signals (DATA1 to DATA3).

As illustrated in FIG. 18B, the wiring which supplies the first image signal (DATA1) supplies an image signal (dataR (1→i)) for controlling transmission of red (R) light for pixels arranged in the first row to pixels arranged in the i-th row in the sampling period (t1). The wiring supplies an image signal (dataG (1→i)) for controlling transmission of green (G) light for pixels arranged in the first row to pixels arranged in the i-th row in the sampling period (t2). The wiring supplies an image signal (dataB (1→i)) for controlling transmission of blue (B) light for pixels arranged in the first row to pixels arranged in the i-th row in the sampling period (t3). The wiring supplies an image signal (dataR+G (1→i)) for controlling transmission of chromatic color light formed by color mixture of red (R) light and green (G) light for pixels arranged in the first row to pixels arranged in the i-th row in the sampling period (t4). The wiring supplies an image signal (dataG+B (1→i)) for controlling transmission of chromatic color light formed by color mixture of green (G) light and blue (B) light for pixels arranged in the first row to pixels arranged in the i-th row in the sampling period (t5). The wiring supplies an image signal (dataB+R (1→i)) for controlling transmission of chromatic color light formed by color mixture of blue (B) light and red (R) light for pixels arranged in the first row to pixels arranged in the i-th row in the sampling period (t6).

The wiring which supplies the second image signal (DATA2) supplies an image signal (dataB+R (i+1→2i)) for controlling transmission of chromatic color light formed by color mixture of blue (B) light and red (R) light for pixels arranged in the (i+1)-th row to pixels arranged in the 2i-th row in the sampling period (t1). The wiring supplies an image signal (dataR (i+1→2i)) for controlling transmission of red (R) light for pixels arranged in the (i+1)-th row to pixels arranged in the 2i-th row in the sampling period (t2). The wiring supplies an image signal (dataG (i+1→2i)) for controlling transmission of green (G) light for pixels arranged in the (i+1)-th row to pixels arranged in the 2i-th row in the sampling period (t3). The wiring supplies an image signal (dataB (i+1→2i)) for controlling transmission of blue (B) light for pixels arranged in the (i+1)-th row to pixels arranged in the 2i-th row in the sampling period (t4). The wiring supplies an image signal (dataR+G (i+1→2i)) for controlling transmission of chromatic color light formed by color mixture of red (R) light and green (G) light for pixels arranged in the (i+1)-th row to pixels arranged in the 2i-th row in the sampling period (t5). The wiring supplies an image signal (dataG+B (i+1→2i)) for controlling transmission of chromatic color light formed by color mixture of green (G) light and blue (B) light for pixels arranged in the (i+1)-th row to pixels arranged in the 2i-th row in the sampling period (t6).

The wiring which supplies the third image signal (DATA3) supplies an image signal (dataG+B (2i+1→3i)) for controlling transmission of chromatic color light formed by color mixture of green (G) light and blue (B) light for pixels arranged in the (2i+1)-th row to pixels arranged in the 3i-th row in the sampling period (t1). The wiring supplies an image signal (dataB+R (2i+1→3i)) for controlling transmission of chromatic color light formed by color mixture of blue (B) light and red (R) light for pixels arranged in the (2i+1)-th row to pixels arranged in the 3i-th row in the sampling period (t2). The wiring supplies an image signal (dataR (2i+1→3i)) for controlling transmission of red (R) light for pixels arranged in the (2i+1)-th row to pixels arranged in the 3i-th row in the sampling period (t3). The wiring supplies an image signal (dataG (2i+1→3i)) for controlling transmission of green (G) light for pixels arranged in the (2i+1)-th row to pixels arranged in the 3i-th row in the sampling period (t4). The wiring supplies an image signal (dataB (2i+1→3i)) for controlling transmission of blue (B) light for pixels arranged in the (2i+1)-th row to pixels arranged in the 3i-th row in the sampling period (t5). The wiring supplies an image signal (dataR+G (2i+1→3i)) for controlling transmission of chromatic color light formed by color mixture of red (R) light and green (G) light for pixels arranged in the (2i+1)-th row to pixels arranged in the 3i-th row in the sampling period (t6).

<Structure Example of Backlight>

A backlight similar to the backlight described in Embodiment 1 (see FIG. 5) can be used as a backlight of the liquid crystal display device described in this embodiment. Note that the backlight of this embodiment is provided with a backlight unit at least at positions in every h row and j column (here, h is i/4), as the backlight for the plurality of pixels of the 3i rows and the j columns, and the turning on of the backlight units can be controlled individually. In other words, the backlight includes at least a backlight unit for the first to h-th rows to a backlight unit for the (2i+3h+1)-th to 3i-th rows, and the turning on of the backlight units can be controlled individually.

<Operation Example of Liquid Crystal Display Device>

Figure 19:
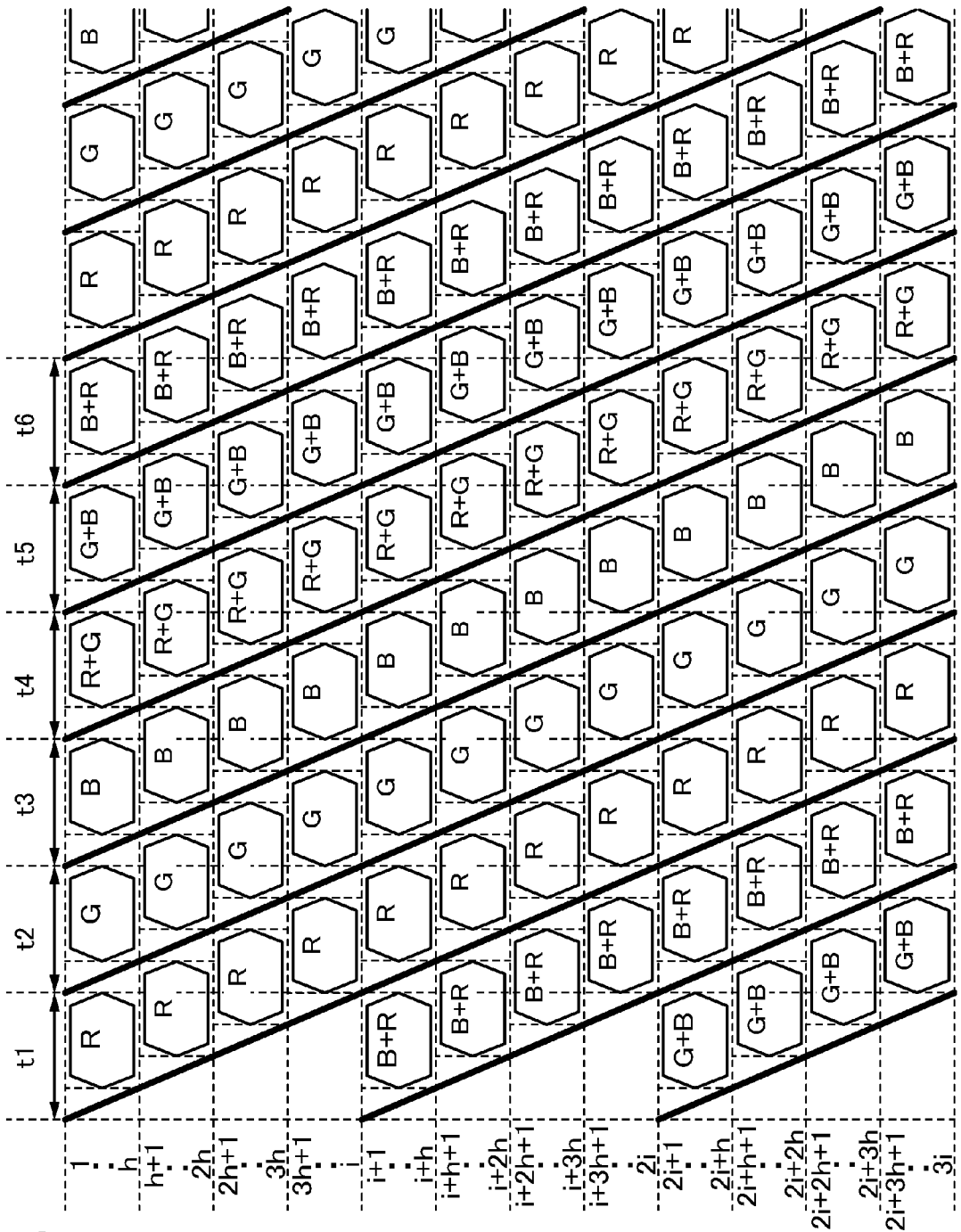
FIG. 19 illustrates an operation example of a liquid crystal display device.

FIG. 19 illustrates timing of scanning of the selection signal and timing of turning on the backlight in the above-described liquid crystal display device. Note that in FIG. 19, the vertical axis represents rows in the pixel portion, and the horizontal axis represents time. Specifically, in FIG. 19, 1 to 3i indicate the number of rows and solid lines indicate timing of when image signals are input in the rows. In the liquid crystal display device in each of the sampling periods (t1 to t6), image signals are input to each pixel in the sampling periods (t1 to t6) in the following manner: the j pixels 651 arranged in the first row to the j pixels 651 arranged in the i-th row are sequentially selected; the j pixels 652 arranged in the (i+1)-th row to the j pixels 652 arranged in the 2i-th row are sequentially selected; and the j pixels 653 arranged in the (2i+1)-th row to the j pixels 653 arranged in the 3i-th row are sequentially selected. Specifically, an example will be described using the sampling period (t1). In the liquid crystal display device, in the sampling period (t1), the transistors 6511 included in the j pixels 651 arranged in the first row to the transistors 6511 included in the j pixels 651 arranged in the i-th row are sequentially turned on, whereby image signals for controlling transmission of red (R) light can be sequentially input to each pixel through the signal line 641; the transistors 6521 included in the j pixels 652 arranged in the (i+1)-th row to the transistors 6521 included in the j pixels 652 arranged in the 2i-th row are sequentially turned on, whereby image signals for controlling transmission of chromatic color light formed by color mixture of blue (B) light and red (R) light can be sequentially input to each pixel through the signal line 642; and the transistors 6531 included in the j pixels 653 arranged in the (2i+1)-th row to the transistors 6531 included in the j pixels 653 arranged in the 3i-th row are sequentially turned on, whereby image signals for controlling transmission of chromatic color light formed by color mixture of green (G) light and blue (B) light can be sequentially input to each pixel through the signal line 643.

Further, in the liquid crystal display device, in the sampling period (t1), after an input of image signals for controlling transmission of red (R) light to the j pixels 651 arranged in the first row to the j pixels 651 arranged in the h-th row is terminated, the light source that emits red (R) light can be turned on in the backlight unit for the first to h-th rows; after an input of image signals for controlling transmission of chromatic color light formed by color mixture of blue (B) light and red (R) light to the j pixels 652 arranged in the (i+1)-th row to the j pixels 652 arranged in the (i+h)-th row is terminated, the light source that emits blue (B) light and the light source that emits red (R) light can be turned on in the backlight unit for the (i+1)-th to (i+h)-th rows; and after an input of image signals for controlling transmission of chromatic color light formed by color mixture of green (G) light and blue (B) light to the j pixels 653 arranged in the (2i+1)-th row to the j pixels 653 arranged in the (2i+h)-th row is terminated, the light source that emits green (G) light and the light source that emits blue (B) light can be turned on in the backlight unit for the (2i+1)-th to (2i+h)-th rows. In other words, in the liquid crystal display device, scanning of selection signals and the turning on of the backlight unit of a given color can be concurrently performed per specific region of the pixel portion (in the first to i-th rows, the (i+1)-th to 2i-th rows, and the (2i+1)-th to 3i-th rows).

Note that in the liquid crystal display device, operation from the input of the image signals for controlling transmission of red (R) light to the turning on of the light source that emits blue (B) light and the light source that emits red (R) light in the backlight is performed in the region 601 including the pixels arranged in the first to i-th rows; operation from the input of the image signals for controlling transmission of chromatic color light formed by color mixture of blue (B) light and red (R) light to the lighting on of the light source that emits green (G) light and the light source that emits blue (B) light in the backlight is performed in the region 602 including the pixels arranged in the (i+1)-th to 2i-th rows; and operation from the input of the image signals for controlling transmission of chromatic color light formed by color mixture of green (G) light and blue (B) light to the tuning on of the light source that emits red (R) light and the light source that emits green (G) light in the backlight is performed in the region 603 including the pixels arranged in the (2i+1)-th to 3i-th rows. Accordingly, an image is formed in the pixel portion.

<Liquid Crystal Display Device in this Embodiment>

In the liquid crystal display device disclosed in this embodiment, image signals can be concurrently supplied to pixels arranged in a plurality of rows among pixels arranged in a matrix. Thus, the frequency of input of an image signal to each pixel can be increased without change in response speed of a transistor or the like included in the liquid crystal display device. As a result, the liquid crystal display device is suitable for a field-sequential liquid crystal display device or a liquid crystal display device with high frame rate driving.

The liquid crystal display device disclosed in this specification is preferably applied to a field-sequential liquid crystal display device because of the following reasons. As described above, in the field-sequential liquid crystal display device, color information is time-divided. For that reason, display perceived by a user is sometimes changed (degraded) from display based on original display information (such a phenomenon is also referred to as color breaks) because of a lack of a given piece of display information due to temporary interruption of display, such as a blink of the user. An increase in frame frequency is effective in reducing color breaks. Further, in order to display an image by a field sequential method, the frequency of input of an image signal to each pixel needs to be higher than the frame frequency. For that reason, in the case where images are displayed with a field sequential method and high frame frequency driving in a conventional liquid crystal display device, requirements for performance (high-speed response) of elements in the liquid crystal display device are extremely strict. In contrast, in the liquid crystal display device disclosed in this specification, the frequency of input of an image signal to each pixel can be increased regardless of characteristics of elements. Therefore, color breaks in the liquid crystal display device in which images are displayed by a field sequential method can be easily reduced.

Further, in the case where backlight units are turned on as illustrated in FIG. 19, the adjacent backlight units do not emit lights of different colors. For example, in the sampling period (t4), when the light source that emits blue (B) light is turned on in the backlight unit for the (i+1)-th to (i+h)-th rows after input of the image signals for controlling transmission of blue (B) light to the j pixels 652 arranged in the (i+1)-th row to the j pixels 652 arranged in the (i+h)-th row is terminated, the light source that emits blue (B) light is turned on or emission itself is not performed (neither red (R) light nor green (G) light is emitted) in the backlight unit for the (3h+1)-th to i-th rows and the backlight unit for the (i+h+1)-th to (i+2h)-th rows. Thus, the probability of transmission of light of a color different from a given color through a pixel to which image data on the given color is input can be reduced.

In the case where a period in which two light sources included in the backlight unit are turned on at the same time is provided as in the operation example in FIG. 19, it is possible to improve display luminance of the liquid crystal display device. In the operation example in FIG. 19, it is possible to increase a lighting period of each of the plurality of light sources efficiently. Accordingly, in the operation example in FIG. 19, display color tones can be subdivided efficiently.

Modification Example

The liquid crystal display device described in this embodiment is one embodiment of the present invention, and the present invention includes a liquid crystal display device which is different from the above-described liquid crystal display device.

For example, the liquid crystal display device of this embodiment has a structure where the pixel portion 60 is divided into three regions; however, the structure of the liquid crystal display device according to one embodiment of the present invention is not limited to such a structure. In other words, in the liquid crystal display device according to one embodiment of the present invention, the pixel portion 60 can be divided into given plural regions. Note that it is apparent that in the case where the number of regions is changed, the number of regions and the number of shift registers should be the same.

In the liquid crystal display device in this embodiment, the number of pixels is the same in three regions (i.e., each of the regions includes pixels of i rows and j columns); alternatively, the number of pixels can vary between regions in the liquid crystal display device according to one embodiment of the present invention. Specifically, pixels can be arranged in a rows and the j columns (a is a natural number) in a first region, and pixels can be arranged in b rows and the j columns (b is a natural number which is different from a) in a second region.

Further, in the liquid crystal display device of this embodiment, the scan line driver circuit includes the shift registers; however, the shift registers can be replaced with circuits having similar functions. For example, the shift registers can be replaced with decoders.

Further, the liquid crystal display device of this embodiment includes a capacitor for holding voltage applied to a liquid crystal element (see FIGS. 16B to 16D); however, it is possible not to provide the capacitor. In this case, the aperture ratio of the pixel can be increased. The capacitance wiring extending to the pixel portion can be removed; therefore, it is possible to perform high-speed driving of various wirings extending to the pixel portion.

Figure 20:
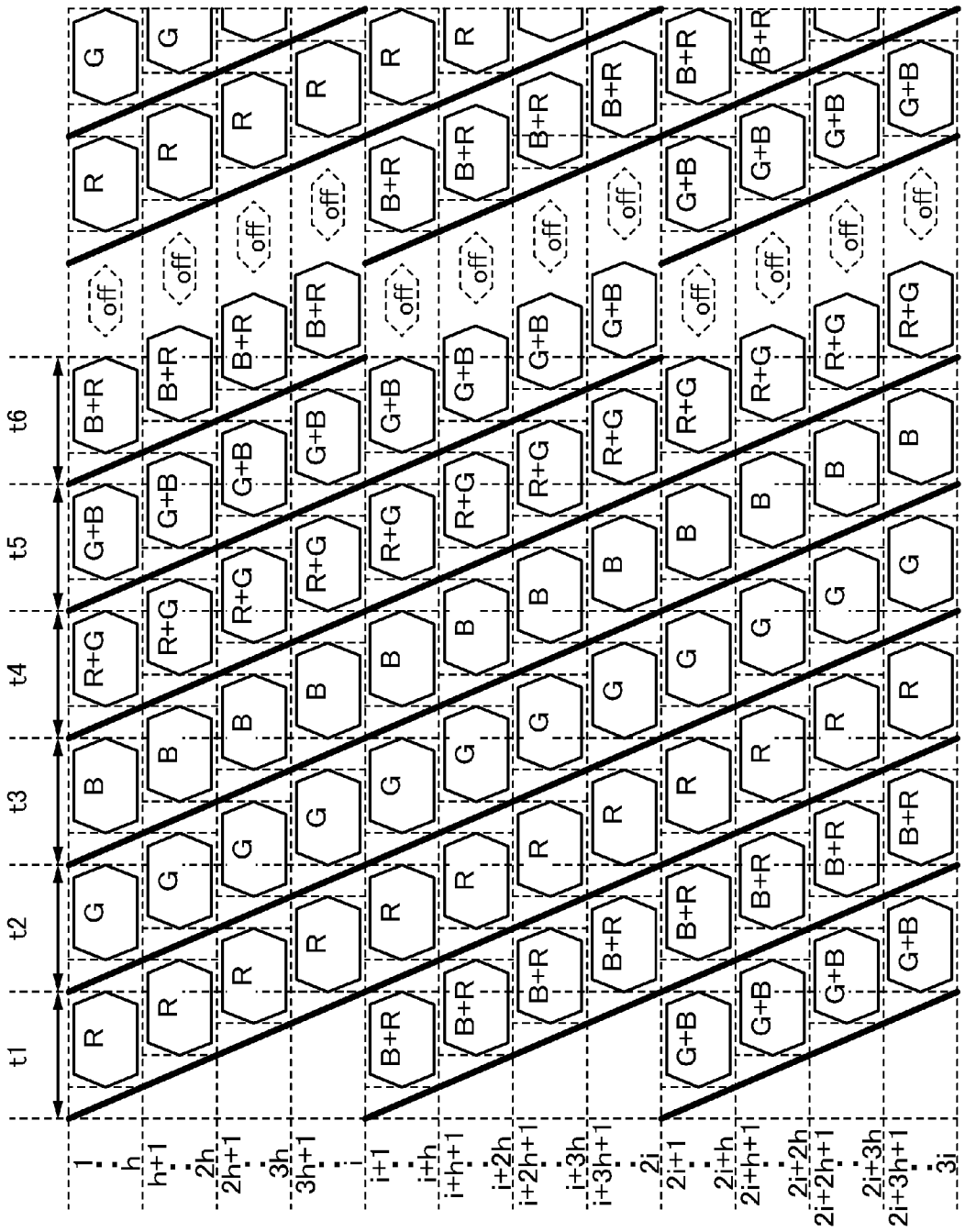
FIG. 20 illustrates an operation example of a liquid crystal display device.

The liquid crystal display device of this embodiment successively performs scanning of a selection signal and the turning on of the backlight unit (see FIG. 19); however, the operation of the liquid crystal display device is not limited to that of this structure. For example, before and after a period in which an image is formed in the pixel portion, it is possible to provide a period in which scanning of a selection signal and the turning on of the backlight unit are not performed (see FIG. 20). Thus, color break generated in the liquid crystal display device can be suppressed, and the quality of an image displayed by the liquid crystal display device can be improved. Note that the structure in which neither scanning of a selection signal nor the turning on of the backlight unit are performed is illustrated in FIG. 9; however, a structure in which scanning of a selection signal is performed and an image signal for not transmitting light to each pixel is input can also be formed.

Figure 21:
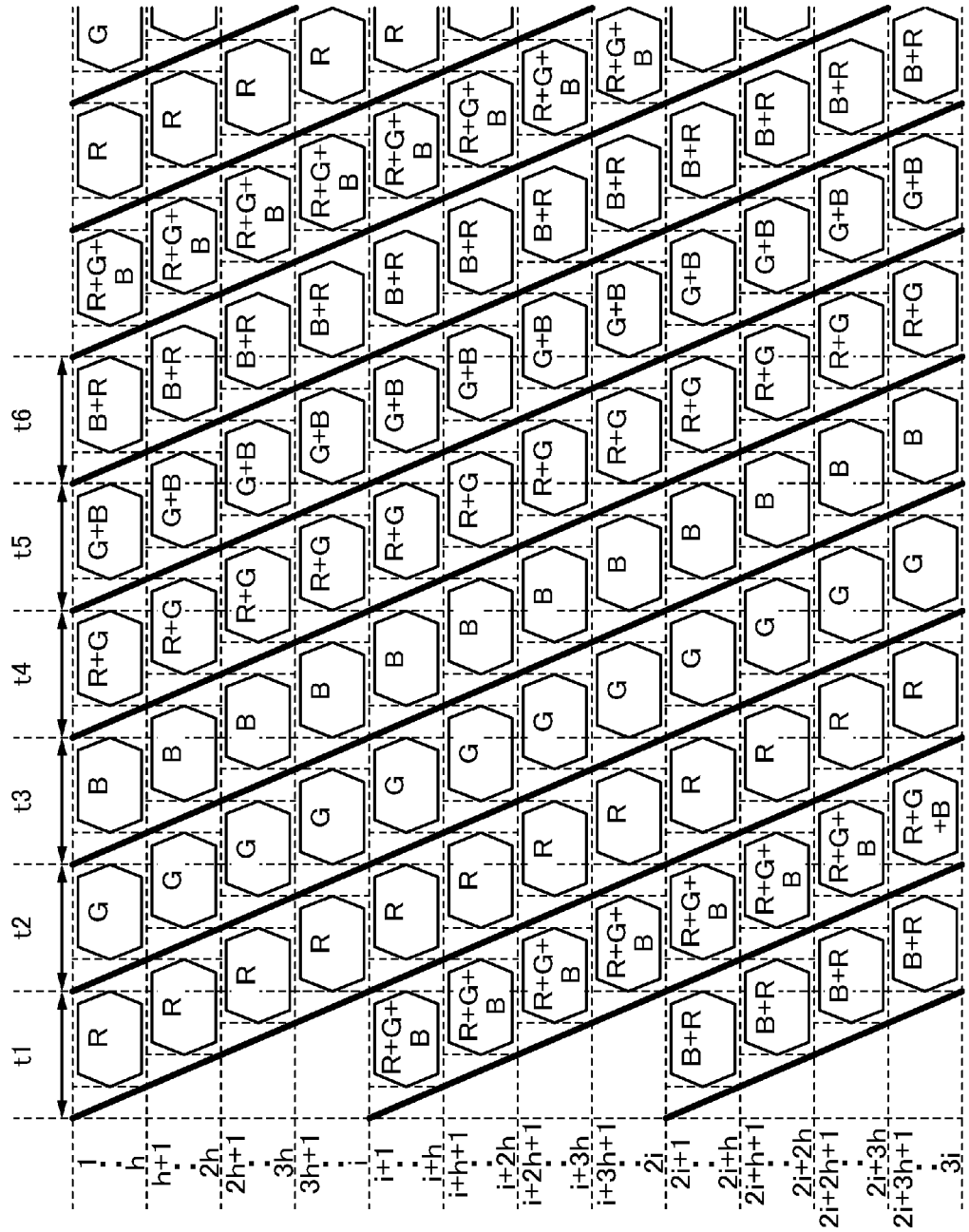
FIG. 21 illustrates an operation example of a liquid crystal display device.

The liquid crystal display device of this embodiment is provided with a period in which one or two light sources of three light sources included in the backlight unit is/are turned on per specific region in the pixel portion (see FIG. 19); however, it is possible to provide a period in which all three light sources included in the backlight unit are turned on (see FIG. 21). In this case, it is possible to further improve display luminance of the liquid crystal display device and to subdivide display color tones of the liquid crystal display device. Note that in the operation example illustrated in FIG. 21, operation from the input of the image signals for controlling transmission of red (R) light to the turning on of the light source that emits red (R) light, the light source that emits green (G) light, and the light source that emits blue (B) light in the backlight is performed in the region 601 including the pixels arranged in the first to i-th rows; operation from the input of the image signals for controlling transmission of white (W) light formed by color mixture of red (R) light, green (G) light, and blue (B) light to the turning on of the light source that emits blue (B) light and the light source that emits red (R) light in the backlight is performed in the region 602 including the pixels arranged in the (i+1)-th to 2i-th rows; and operation from the input of the image signals for controlling transmission of chromatic color light formed by color mixture of blue (B) light and red (R) light to the turning on of the light source that emits blue (B) light and the light source that emits red (R) light in the backlight is performed in the region 603 including the pixels arranged in the (2i+1)-th to 3i-th rows. Accordingly, an image is formed in the pixel portion.

In the liquid crystal display device of this embodiment, an image is formed per specific region of the pixel portion by turning on the light sources of the backlight unit in the following order: red (R)→green (G)→blue (B)→red (R) and green (G)→green (G) and blue (B)→blue (B) and red (R) (see FIG. 19). However, the order of turning on the light sources in the liquid crystal display device of this embodiment is not limited to the order. For example, it is possible to have a structure in which an image is formed by the following order of turning on the light sources: blue (B)→blue (B) and green (G)→green (G)→green (G) and red (R)→red (R)→red (R) and blue (B) (not illustrated); a structure in which an image is formed by the following order of turning on the light sources: blue (B)→blue (B) and red (R)→red (R)→red (R) and green (G)→green (G)→green (G) and blue (B) (not illustrated); a structure in which an image is formed by the following order of turning on the light sources: blue (B) red (R) and green (G)→green (G)→blue (B) and red (R)→red (R)→green (G) and blue (B) (not illustrated); a structure in which an image is formed by the following order of turning on the light sources: blue (B)→red (R) and green (G)→blue (B) and green (G)→red (R)→green (G)→red (R) and blue (B) (not illustrated); or the like. Note that it is needless to say that the input order of an image signal for controlling transmission of light of a specific color needs to be designed in accordance with the order of turning on the light source, as appropriate.

In the liquid crystal display device of this embodiment, the light source that emits red (R) light, the light source that emits green (G) light, and the light source that emits blue (B) light included in the backlight unit are each turned on three times, whereby an image is formed (see FIG. 19); however, the number of lightings of the light sources in the liquid crystal display device of this embodiment can vary. For example, the backlight unit is turned on so that the light source that emits red (R) light and has a high luminosity factor and the light source that emits green (G) light are turned on twice and the light source that emits blue (B) light and has a low luminosity factor is turned on three times, whereby an image can be formed (not illustrated).

In the liquid crystal display device of this embodiment, the three kinds of light sources, that is, the light source that emits red (R) light, the light source that emits green (G) light, and the light source that emits blue (B) light are used in combination for the backlight; however, the liquid crystal display device according to one embodiment of the present invention is not limited to having this structure. In other words, in the liquid crystal display device according to one embodiment of the present invention, light sources that emit lights of different colors can be provided in combination to form a backlight unit. For example, four kinds of light sources, that is, the light source that emits red (R) light, the light source that emits green (G) light, the light source that emits blue (B) light, and a light source that emits white (W) light or four kinds of light sources, that is, the light source that emits red (R) light, the light source that emits green (G) light, the light source that emits blue (B) light, and a light source that emits yellow (Y) light can be used in combination; or three kinds of light sources, that is, a light source that emits cyan (C) light, a light source that emits magenta (M) light, and the light source that emits yellow (Y) light can be used in combination. Note that in the case where a light source that emits white (W) light is included in the backlight unit, white (W) light can be formed not by a color mixture but by the light source. Because the light source has high luminous efficiency, a backlight is formed using the light source, whereby power consumption can be reduced. In the case where a backlight unit includes two kinds of light sources that emit complementary color lights (e.g., the case where two kinds of light sources, that is, the light source that emits blue (B) light, and the light source that emits yellow (Y) light), the respective color lights emitted from the light sources are mixed, whereby white (W) light can be formed. Moreover, it is possible to use a combination of six kinds of light sources, that is, a light source that emits pale red (R) light, a light source that emits pale green (G) light, a light source that emits pale blue (B), a light source that emits dark red (R) light, a light source that emits dark green (G) light, and a light source that emits dark blue (B) light; or a combination of six kinds of light sources, that is, the light source that emits red (R) light, the light source that emits green (G) light, the light source that emits blue (B) light, the light source that emits cyan (C) light, the light source that emits magenta (M) light, and the light source that emits yellow (Y) light. In such a manner, with a combination of a wider variety of light sources, the color gamut of the liquid crystal display device can be enlarged, and the image quality can be improved.

Note that a plurality of structures described as modification examples of this embodiment can also be used for the liquid crystal display device of this embodiment.

Note that this embodiment or part of this embodiment can be freely combined with the other embodiments or part of the other embodiments.

Embodiment 3

In this embodiment, a specific structure of the liquid crystal display device described in Embodiment 1 or 2 will be described.

<Specific Example of Transistor>

First, a specific example of a transistor used for the pixel portion or the various circuits of the liquid crystal display device described above will be described with reference to FIGS. 22A to 22D. Note that in the liquid crystal display device, the transistors provided in the pixel portion and the various circuits may have either the same structure or different structures.

Figure 22A:
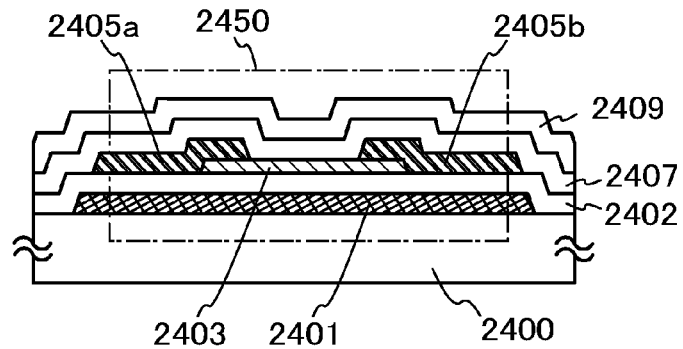
FIGS. 22A to 22D each illustrate a specific example of a transistor.

A transistor 2450 in FIG. 22A includes a gate layer 2401 over a substrate 2400, a gate insulating layer 2402 over the gate layer 2401, a semiconductor layer 2403 over the gate insulating layer 2402, and a source layer 2405a and a drain layer 2405b over the semiconductor layer 2403. An insulating layer 2407 is formed over the semiconductor layer 2403, the source layer 2405a, and the drain layer 2405b. A protective insulating layer 2409 may be formed over the insulating layer 2407. The transistor 2450 is a bottom-gate transistor, and is also an inverted staggered transistor.

Figure 22B:
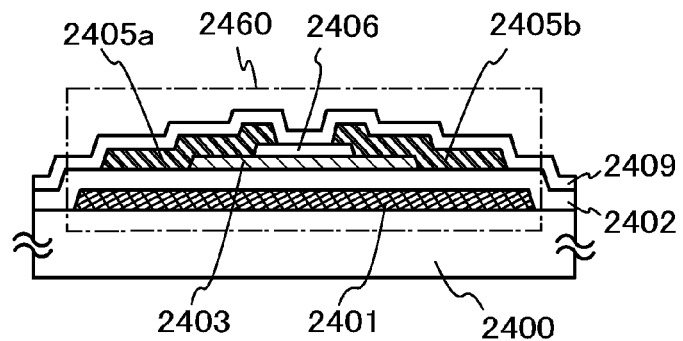

A transistor 2460 illustrated in FIG. 22B includes the gate layer 2401 over the substrate 2400, the semiconductor layer 2403 over the gate insulating layer 2402, a channel protective layer 2406 over the semiconductor layer 2403, and the source layer 2405a and the drain layer 2405b over the channel protective layer 2406 and the semiconductor layer 2403. The protective insulating layer 2409 may be formed over the source layer 2405a and the drain layer 2405b. The transistor 2460 is a bottom-gate transistor called a channel-protective type (also referred to as a channel-stop type) transistor and is also an inverted staggered transistor.

Figure 22C:
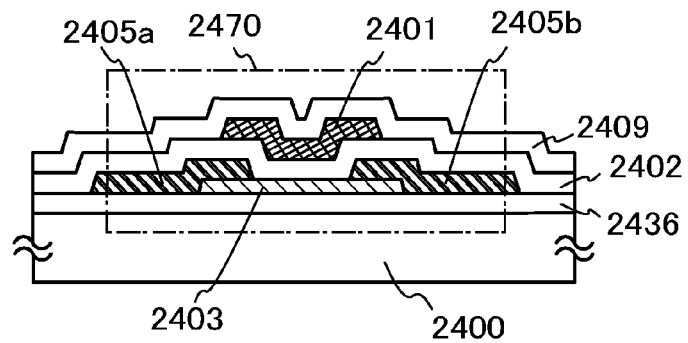

A transistor 2470 illustrated in FIG. 22C includes a base layer 2436 over the substrate 2400; the semiconductor layer 2403 over the base layer 2436; the source layer 2405a and the drain layer 2405b over the semiconductor layer 2403 and the base layer 2436; the gate insulating layer 2402 over the semiconductor layer 2403, the source layer 2405a, and the drain layer 2405b; and the gate layer 2401 over the gate insulating layer 2402. The protective insulating layer 2409 may be formed over the gate layer 2401. The transistor 2470 is a top-gate transistor.

Figure 22D:
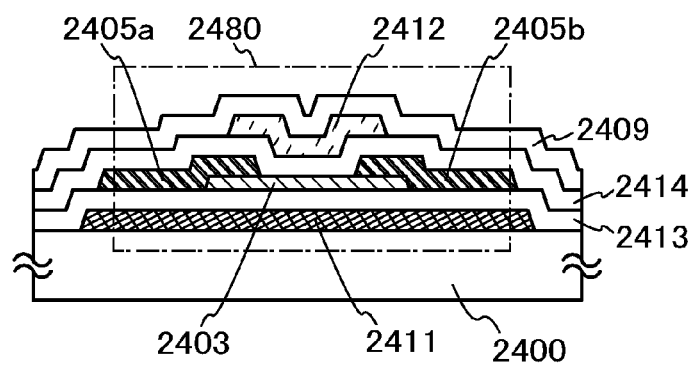

A transistor 2480 illustrated in FIG. 22D includes a first gate layer 2411 over the substrate 2400, a first gate insulating layer 2413 over the first gate layer 2411, the semiconductor layer 2403 over the first gate insulating layer 2413, and the source layer 2405a and the drain layer 2405b over the semiconductor layer 2403 and the first gate insulating layer 2413. A second gate insulating layer 2414 is formed over the semiconductor layer 2403, the source layer 2405a, and the drain layer 2405b, and a second gate layer 2412 is formed over the second gate insulating layer 2414. The protective insulating layer 2409 may be formed over the second gate layer 2412.

The transistor 2480 has a structure combining the transistor 2450 and the transistor 2470. The first gate layer 2411 and the second gate layer 2412 may be electrically connected to each other to function as one gate layer. One of the first gate layer 2411 and the second gate layer 2412 is referred to simply as a "gate", and the other of the first gate layer 2411 and the second gate layer 2412 is referred to simply as a "back gate" in some cases. Note that in the transistor 2480, the potential of the back gate is changed, whereby threshold voltage of the transistor 2480 can be changed when switching is controlled by the potential of the gate.

Note that examples of the substrate 2400 include a semiconductor substrate (e.g., a single crystal substrate or a silicon substrate), an SOI substrate, a glass substrate, a quartz substrate, a conductive substrate whose top surface is provided with an insulating layer, flexible substrates such as a plastic substrate, a bonding film, paper containing a fibrous material, and a base film. As an example of a glass substrate, a barium borosilicate glass substrate, an aluminoborosilicate glass substrate, soda lime glass substrate, and the like can be given. For a flexible substrate, a flexible synthetic resin such as plastics typified by poly(ethylene terephthalate) (PET), poly(ethylene naphthalate) (PEN), and poly(ether sulfone) (PES), or an acrylic resin can be used, for example.

For the gate layer 2401 and the first gate layer 2411, an element selected from aluminum (Al), copper (Cu), titanium (Ti), tantalum (Ta), tungsten (W), molybdenum (Mo), chromium (Cr), neodymium (Nd), and scandium (Sc); an alloy containing any of these elements; or a nitride containing any of these elements can also be used. A layered structure of these materials can also be used.

For the gate insulating layer 2402, the first gate insulating layer 2413, and the second gate insulating layer 2414, an insulator such as silicon oxide, silicon nitride, silicon oxynitride, silicon nitride oxide, aluminum oxide, tantalum oxide, or gallium oxide can be used. A layered structure of these materials can also be used. Note that silicon oxynitride refers to a substance which contains more oxygen than nitrogen and contains oxygen, nitrogen, silicon, and hydrogen at given concentrations ranging from 55 to 65 atomic %, 1 to 20 atomic %, 25 to 35 atomic %, and 0.1 to 10 atomic %, respectively, where the total percentage of atoms is 100 atomic %. Further, the silicon nitride oxide film refers to a film which contains more nitrogen than oxygen and contains oxygen, nitrogen, silicon, and hydrogen at given concentrations ranging from 15 to 30 atomic %, 20 to 35 atomic %, 25 to 35 atomic %, and 15 to 25 atomic %, respectively, where the total percentage of atoms is 100 atomic %.

The semiconductor layer 2403 can be formed using any of the following semiconductor materials, for example: a material containing an element belonging to Group 14 of the periodic table, such as silicon (Si) or germanium (Ge), as its main component; a compound such as silicon germanium (SiGe) or gallium arsenide (GaAs); an oxide such as zinc oxide (ZnO) or zinc oxide containing indium (In) and gallium (Ga); or an organic compound exhibiting semiconductor characteristics. A layered structure of layers formed using these semiconductor materials can also be used.

In the case where silicon (Si) is used for the semiconductor layer 2403, the crystal state of the semiconductor layer 2403 is not limited. In other words, any of amorphous silicon, microcrystalline silicon, polycrystalline silicon, and single crystal silicon can be used for the semiconductor layer 2403. The Raman spectrum of microcrystalline silicon is shifted to a lower wavenumber side than 520 cm$^{-1}$ that represents single crystal silicon. In other words, the peak of the Raman spectrum of the microcrystalline silicon exists between 520 cm$^{-1}$ which represents single crystal silicon and 480 cm$^{-1}$ which represents amorphous silicon. The microcrystalline silicon includes at least 1 atomic % or more of hydrogen or halogen to terminate dangling bonds. Moreover, the microcrystalline silicon may contain a rare gas element such as helium, argon, krypton, or neon to further promote lattice distortion, so that stability is increased and a favorable microcrystalline semiconductor can be obtained.

Moreover, in the case where an oxide (an oxide semiconductor) is used for the semiconductor layer 2403, one or more elements selected from In, Ga, Sn, Zn, Al, Mg, Hf, and lanthanoid is/are included. For example, an In—Sn—Ga—Zn—O-based oxide semiconductor which is an oxide of four metal elements; an In—Ga—Zn—O-based oxide semiconductor, an In—Sn—Zn—O-based oxide semiconductor, an In—Al—Zn—O-based oxide semiconductor, a Sn—Ga—Zn—O-based oxide semiconductor, an Al—Ga—Zn—O-based oxide semiconductor, and a Sn—Al—Zn—O-based oxide semiconductor, an In—Hf—Zn—O-based oxide semiconductor, an In—La—Zn—O-based oxide semiconductor, an In—Ce—Zn—O-based oxide semiconductor, an In—Pr—Zn—O-based oxide semiconductor, an In—Nd—Zn—O-based oxide semiconductor, an In—Pm—Zn—O-based oxide semiconductor, an In—Sm—Zn—O-based oxide semiconductor, an In—Eu—Zn—O-based oxide semiconductor, an In—Gd—Zn—O-based oxide semiconductor, an In—Tb—Zn—O-based oxide semiconductor layer, an In—Dy—Zn—O-based oxide semiconductor, an In—Ho—Zn—O-based oxide semiconductor, an In—Er—Zn—O-based oxide semiconductor, an In—Tm—Zn—O-based oxide semiconductor, an In—Yb—Zn—O-based oxide semiconductor, an In—Lu—Zn—O-based oxide semiconductor which are oxides of three metal elements; an In—Ga—O-based oxide, an In—Zn—O-based oxide semiconductor, a Sn—Zn—O-based oxide semiconductor, an Al—Zn—O-based oxide semiconductor, a Zn—Mg—O-based oxide semiconductor, a Sn—Mg—O-based oxide semiconductor, and an In—Mg—O-based oxide semiconductor which are oxides of two metal elements; and an In—O-based oxide semiconductor, a Sn—O-based oxide semiconductor, and a Zn—O-based oxide semiconductor which are oxides of one metal element. Further, SiO$_2$ may be contained in the above oxide semiconductor. Here, for example, the In—Ga—Zn—O-based oxide semiconductor means an oxide containing at least In, Ga, and Zn, and the composition ratio of the elements is not particularly limited. The In—Ga—Zn—O-based oxide semiconductor may contain an element other than In, Ga, and Zn.

As the oxide semiconductor, a thin film represented by the chemical formula, InMO$_3$(ZnO)$_m$ (m>0) can be used. Here, M represents one or more metal elements selected from Ga, Al, Mn, and Co. For example, M may be Ga, Ga and Al, Ga and Mn, Ga and Co, or the like.

In the case where an In—Zn—O-based material is used as an oxide semiconductor, a target to be used has a composition ratio of In:Zn=50:1 to 1:2 in an atomic ratio (In$_2$O$_3$:ZnO=25:1 to 1:4 in a molar ratio), preferably In:Zn=20:1 to 1:1 in an atomic ratio (In$_2$O$_3$:ZnO=10:1 to 1:2 in a molar ratio), further preferably In:Zn=1.5:1 to 15:1 in an atomic ratio (In$_2$O$_3$:ZnO=3:4 to 15:2 in a molar ratio). For example, in a target used for formation of an In—Zn—O-based oxide semiconductor which has an atomic ratio of In:Zn:O=X:Y:Z, the relation of Z>1.5X+Y is satisfied.

For the source layer 2405a, the drain layer 2405b, and the second gate layer 2412, an element selected from aluminum (Al), copper (Cu), titanium (Ti), tantalum (Ta), tungsten (W), molybdenum (Mo), chromium (Cr), neodymium (Nd), and scandium (Sc); an alloy containing any of these elements; or a nitride containing any of these elements can be used. A layered structure of these materials can also be used.

A conductive film to be the source layer 2405a and the drain layer 2405b (including a wiring layer formed using the same layer as the source and drain layers) may be formed using a conductive metal oxide. As the conductive metal oxide, indium oxide (In$_2$O$_3$), tin oxide (SnO$_2$), zinc oxide (ZnO), indium oxide-tin oxide (In$_2$O$_3$—SnO$_2$; abbreviated to ITO), indium oxide-zinc oxide (In$_2$O$_3$—ZnO), or any of these metal oxide materials in which silicon oxide is contained can be used.

As the channel protective layer 2406, an insulator such as silicon oxide, silicon nitride, silicon oxynitride, silicon nitride oxide, aluminum oxide, tantalum oxide, or gallium oxide can be used. A layered structure of these materials can also be used.

For the insulating layer 2407, an insulator such as silicon oxide, silicon oxynitride, aluminum oxide, aluminum oxynitride, or gallium oxide can be used. A layered structure of these materials can also be used.

For the protective insulating layer 2409, an insulator such as silicon nitride, aluminum nitride, silicon nitride oxide, or aluminum nitride oxide can be used. A layered structure of these materials can also be used.

As the base layer 2436, an insulator such as silicon oxide, silicon nitride, silicon oxynitride, silicon nitride oxide, aluminum oxide, tantalum oxide, or gallium oxide can be used. A layered structure of these materials can also be used.

In the case where an oxide semiconductor is used for the semiconductor layer 2403, an insulating layer in contact with the oxide semiconductor (here, corresponding to the gate insulating layer 2402, the insulating layer 2407, the channel protective layer 2406, the base layer 2436, the first gate insulating layer 2413, and the second gate insulating film 2414) is preferably formed of an insulating material including a Group 13 element and oxygen. Many of oxide semiconductor materials include a Group 13 element, and an insulating material including a Group 13 element works well with an oxide semiconductor. By using an insulating material including a Group 13 element for an insulating layer in contact with the oxide semiconductor, an interface with the oxide semiconductor can keep a favorable state.

An insulating material including a Group 13 element refers to an insulating material including one or more Group 13 elements. As the insulating material including a Group 13 element, gallium oxide, aluminum oxide, aluminum gallium oxide, and gallium aluminum oxide can be given for example. Here, aluminum gallium oxide refers to a material in which the amount of aluminum is larger than that of gallium in atomic percent, and gallium aluminum oxide refers to a material in which the amount of gallium is larger than or equal to that of aluminum in atomic percent.

For example, in the case of forming an insulating layer in contact with an oxide semiconductor layer containing gallium, a material including gallium oxide may be used as an insulating layer, so that favorable characteristics can be maintained at the interface between the oxide semiconductor layer and the insulating layer. When the oxide semiconductor layer and the insulating layer containing gallium oxide are provided in contact with each other, hydrogen pileup at the interface between the oxide semiconductor layer and the insulating layer can be reduced, for example. Note that a similar effect can be obtained in the case where an element in the same group as a constituent element of the oxide semiconductor is used in an insulating layer. For example, it is effective to form an insulating layer with the use of a material including aluminum oxide. Note that aluminum oxide has a property of not easily permeating water. Thus, it is preferable to use the material including aluminum oxide in terms of preventing entry of water to the oxide semiconductor layer.

In the case where an oxide semiconductor is used for the semiconductor layer 2403, the insulating material of the insulating layer in contact with the oxide semiconductor preferably includes oxygen in a proportion higher than that in the stoichiometric composition, by heat treatment under an oxygen atmosphere or oxygen doping or the like. "Oxygen doping" refers to addition of oxygen into a bulk. Note that the term "bulk" is used in order to clarify that oxygen is added not only to a surface of a thin film but also to the inside of the thin film. In addition, "oxygen doping" includes "oxygen plasma doping" in which oxygen which is made to be plasma is added to a bulk. The oxygen doping may be performed using an ion implantation method or an ion doping method.

For example, in the case where the insulating layer is formed using gallium oxide, the composition of gallium oxide can be set to be $Ga_2O_x$ (x=3+α, 0<α<1) by heat treatment under an oxygen atmosphere or oxygen doping.

In the case where the insulating layer is formed using aluminum oxide, the composition of aluminum oxide can be set to be $Al_2O_x$ (x=3+α, 0<α<1) by heat treatment under an oxygen atmosphere or oxygen doping.

In the case where the insulating layer is formed using gallium aluminum oxide (aluminum gallium oxide), the composition of gallium aluminum oxide (aluminum gallium oxide) can be set to be $Ga_xAl_{2-x}O_{3+α}$ (0<x<2, 0<α<1) by heat treatment under an oxygen atmosphere or oxygen doping.

By oxygen doping, an insulating layer which includes a region where the proportion of oxygen is higher than that in the stoichiometric composition can be formed. When the insulating layer including such a region is in contact with the oxide semiconductor layer, oxygen that exists excessively in the insulating layer is supplied to the oxide semiconductor layer, and oxygen deficiency in the oxide semiconductor layer or at an interface between the oxide semiconductor layer and the insulating layer is reduced. Thus, the oxide semiconductor layer can be formed to an i-type or substantially i-type oxide semiconductor.

Note that, in the case where an oxide semiconductor is used for the semiconductor layer 2403, one of insulating layers which are in contact with the semiconductor layer 2403 and are located on the upper side and the lower side may be an insulating layer which includes a region where the proportion of oxygen is higher than that in the stoichiometric composition. However, both the insulating layers are preferably insulating layers which each include a region where the proportion of oxygen is higher than that in the stoichiometric composition. The above-described effect can be enhanced with a structure where the semiconductor layer 2403 is provided between the insulating layers which each include a region where the proportion of oxygen is higher than that in the stoichiometric composition, which are used as the insulating layers in contact with the semiconductor layer 2403 and located on the upper side and the lower side of the semiconductor layer 2403.

In the case where an oxide semiconductor is used for the semiconductor layer 2403, the insulating layers on the upper side and the lower side of the semiconductor layer 2403 may include the same constituent element or different constituent elements. For example, the insulating layers on the upper side and the lower side may be both formed of gallium oxide whose composition is $Ga_2O_x$ (x=3+α, 0<α<1). Alternatively, one of the insulating layers on the upper side and the lower side may be formed of gallium oxide whose composition is $Ga_2O_x$ (x=3+α, 0<α<1) and the other may be formed of aluminum oxide whose composition is $Al_2O_x$ (x=3+α, 0<α<1).

In the case where an oxide semiconductor is used for the semiconductor layer 2403, an insulating layer in contact with the semiconductor layer 2403 may be formed by stacking insulating layers which each include a region where the proportion of oxygen is higher than that in the stoichiometric composition. For example, the insulating layer on the upper side of the semiconductor layer 2403 may be formed as follows: gallium oxide whose composition is $Ga_2O_x$ (x=3+α, 0<α<1) is formed and gallium aluminum oxide (aluminum gallium oxide) whose composition is $Ga_xAl_{2-x}O_{3+α}$ (0≤X≤2, 0<α<1) may be formed thereover. Note that the insulating layer on the lower side of the semiconductor layer 2403 may be formed by stacking insulating layers which each include a region where the proportion of oxygen is higher than that in the stoichiometric composition. Further, both of the insulating films on the upper side and the lower side of the semiconductor layer 2403 may be formed by stacking insulating layers which each include a region where the proportion of oxygen is higher than that in the stoichiometric composition.

Here, a transistor 951 in which an oxide semiconductor is used for a semiconductor layer, and a transistor 952 in which an oxide semiconductor is used for a semiconductor layer and a back gate is provided are formed, and evaluation results of the amount of shift in threshold voltage (Vth) between before and after negative-bias temperature stress photodegradation tests are shown.

Figure 30A:
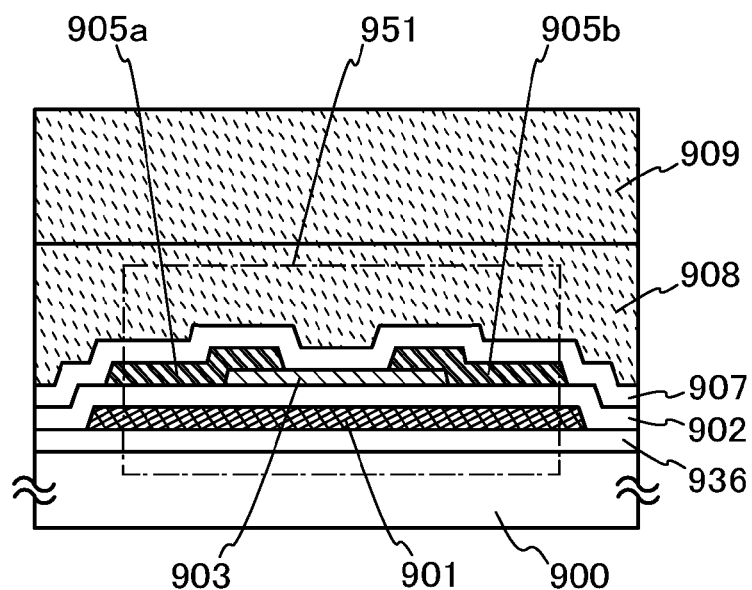
FIGS. 30A and 30B each illustrate a structure of a transistor.

First, a layered structure of the transistor 951 and a manufacturing method thereof will be described with reference to FIG. 30A. Over a substrate 900, as a base layer 936, a layered film of a silicon nitride film (having a thickness of 200 nm) and a silicon oxynitride film (having a thickness of 400 nm) was formed by a CVD method. Next, over the base layer 936, a layered film of a tantalum nitride film (having a thickness of 30 nm) and a tungsten film (having a thickness of 100 nm) was formed by a sputtering method and selectively etched, whereby a gate layer 901 was formed.

Next, a silicon oxynitride film (having a thickness of 30 nm) was formed as a gate insulating layer 902 over the gate layer 901 by a high-density plasma-enhanced CVD method.

Then, an oxide semiconductor film (having a thickness of 30 nm) was formed over the gate insulating layer 902 by a sputtering method using an In—Ga—Zn—O-based metal oxide target. Then, an island-shaped oxide semiconductor layer 903 was formed by selectively etching the oxide semiconductor film.

Next, first heat treatment is performed at 450° C. in a nitrogen atmosphere for 60 minutes.

Next, a layered film of a titanium film (having a thickness of 100 nm), an aluminum film (having a thickness of 200 nm), and a titanium film (having a thickness of 100 nm) was formed over the oxide semiconductor layer 903 by a sputtering method and selectively etched, whereby a source layer 905a and a drain layer 905b were formed.

Next, second heat treatment is performed at 300° C. in a nitrogen atmosphere for 60 minutes.

Next, a silicon oxide film (having a thickness of 300 nm) was formed by a sputtering method as an insulating layer 907 which is in contact with part of the oxide semiconductor layer 903 and over the source layer 905a and the drain layer 905b, and a polyimide resin layer (having a thickness of 1.5 μm) was formed as an insulating layer 908 over the insulating layer 907.

Next, third heat treatment was performed at 250° C. in a nitrogen atmosphere for 60 minutes.

Next, a polyimide resin layer (having a thickness of 2.0 μm) was formed as an insulating layer 909 over the insulating layer 908.

Next, fourth heat treatment was performed at 250° C. in a nitrogen atmosphere for 60 minutes.

Figure 30B:
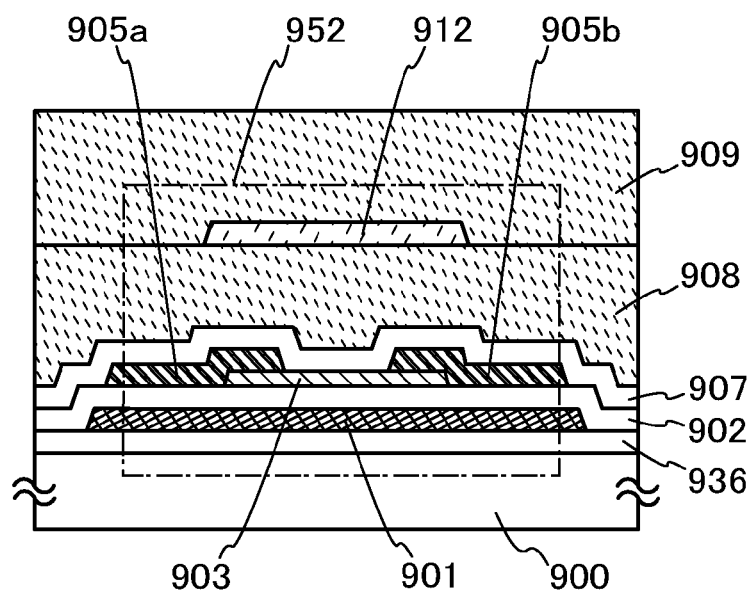

The transistor 952 illustrated in FIG. 30B can be formed in a manner similar to that of the transistor 951. Note that the transistor 952 is different from the transistor 951 in that a back gate layer 912 is formed between the insulating layer 908 and the insulating layer 909. A layered film of a titanium film (having a thickness of 100 nm), an aluminum film (having a thickness of 200 nm), and a titanium film (having a thickness of 100 nm) was formed over the insulating layer 908 by a sputtering method and selectively etched, whereby the back gate layer 912 was formed. Note that the back gate layer 912 is electrically connected to the source layer 905a.

The channel length of each of the transistor 951 and the transistor 952 was 3 μm, and the channel width of each of the transistor 951 and the transistor 952 was 20 μm.

Then, negative-bias temperature stress photodegradation tests performed on the transistor 951 and the transistor 952 which were formed in this embodiment will be described.

The negative-bias temperature stress photodegradation test is a kind of acceleration test and characteristic changes of a transistor in an environment where the transistor is irradiated with light can be measured in a short time. In particular, the amount of shift in Vth of the transistor in the negative-bias temperature stress photodegradation test is an important indicator for examining reliability. As the amount of shift in the Vth in the negative-bias temperature stress photodegradation test is small, the transistor has higher reliability. It is preferable that the amount of shift in the Vth between before and after the negative-bias temperature stress photodegradation tests be less than or equal to 1 V, preferably less than or equal to 0.5 V.

Specifically, the negative-bias temperature stress photodegradation test was performed in such a way that the temperature of a substrate over which a transistor is formed (substrate temperature) is set at fixed temperature, a source and a drain of the transistor are set at the same potential, and a gate is supplied with a potential which is lower than those of the source and the drain for a certain period while the transistor is irradiated with light.

Strength of the negative-bias temperature stress photodegradation test can be determined based on the light irradiation conditions, the substrate temperature, and the intensity of an electric field and time period of application of the electric field to a gate insulating layer. The intensity of the electric field applied to the gate insulating layer is determined in accordance with a value obtained by dividing a potential difference between the gate, and the source and drain by the thickness of the gate insulating layer. For example, in the case where the intensity of the electric field applied to the gate insulating layer having a thickness of 100 nm is to be 2 MV/cm, the potential difference may be set to 20 V.

Note that a test which is performed in such a way that a potential higher than a potential of the source and the drain is applied to the gate in an environment where the transistor is irradiated with light is called a positive-bias temperature stress photodegradation test. Variations in characteristics of a transistor easily occur using the negative-bias temperature stress photodegradation test, as compared to those using the positive-bias temperature stress photodegradation test; therefore, a measurement was performed using the negative-bias temperature stress photodegradation test in this embodiment.

Here, the negative-bias temperature stress photodegradation test was performed under such conditions that a substrate temperature is a room temperature (25° C.), the intensity of the electric field applied to the gate insulating layer 902 is 2 MV/cm, and a time period for light irradiation and electric field application was one hour. Further, a xenon light source "MAX-302" manufactured by Asahi Spectra Co., Ltd. was used, and light irradiation conditions were set as follows: peak wavelength is 400 nm (half width is 10 nm) and irradiance is 326 μW/cm$^2$.

First, initial characteristics of a transistor which is a test object were measured before the negative-bias temperature stress photodegradation test. Here, the transfer characteristics of the current between the source and the drain (hereinafter referred to as drain current or Id), i.e., Vg–Id characteristics, were measured when the substrate temperature was set to a room temperature (25° C.), the voltage between the source and the drain (hereinafter, drain voltage or Vd) was set to 3 V, and the voltage between the source and the gate (hereinafter, gate voltage or Vg) was changed from −5 V to +5 V.

Next, light was irradiated from the insulating layer 908 side, and negative voltage was applied to the gate so that a potential of the source and the drain of the transistor was 0 V and the intensity of the electric field applied to the gate insulating layer 902 of the transistor was 2 MV/cm. Since the thickness of the gate insulating layer 902 in each of the transistors is 30 nm here, a voltage of −6 V was kept being applied to the gate for one hour. The time of voltage application was one hour here; however, the time may be determined as appropriate in accordance with the purpose.

Next, application of voltage was terminated, and Vg–Id characteristics were measured under the same conditions as the measurement of the initial characteristics while light irradiation continues to be performed, whereby Vg–Id characteristics after the negative-bias temperature stress photodegradation test were obtained.

Figure 31:
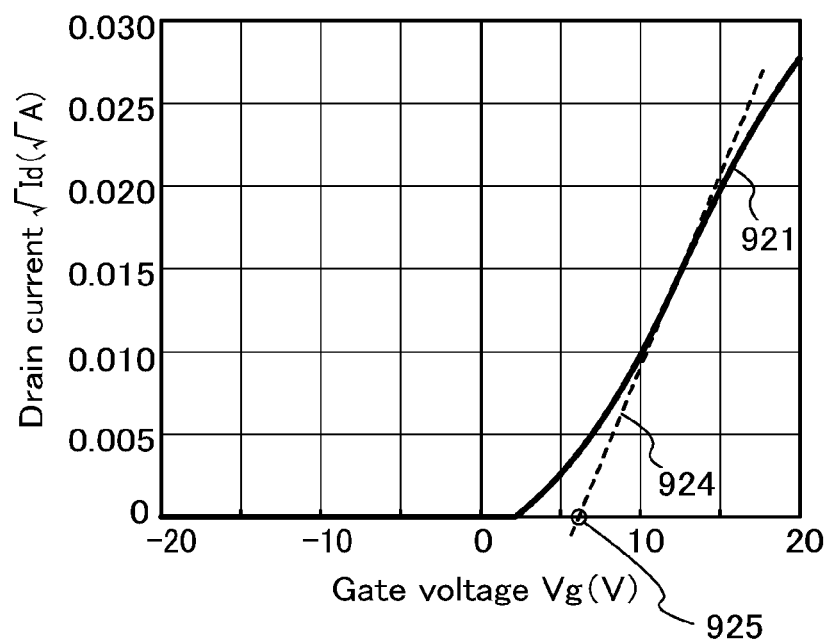
FIG. 31 illustrates a calculation method of Vth.

Here, a method for calculating Vth will be described with reference to FIG. 31. In FIG. 31, gate voltage is plotted on a linear scale on the horizontal axis, and a square root of drain current (hereinafter also referred to as √Id) is plotted on a linear scale on the vertical axis. A curve 921 is a curve expressed by square roots of Id values of the Vg–Id characteristics (hereinafter the curve is also referred to as an √Id curve).

First, an √Id curve (the curve 921) is obtained from the Vg–Id curve obtained by measurement. Then, a tangent line 924 of a point on the √Id curve at which a differential value of the √Id curve becomes a maximum value is obtained. Then, the tangent line 924 is extended, and Vg at a point where Id is 0 A on the tangent line 924, that is, a value at an intercept 925 of the tangent line 924 and the gate voltage axis is defined as Vth.

Figure 32A:
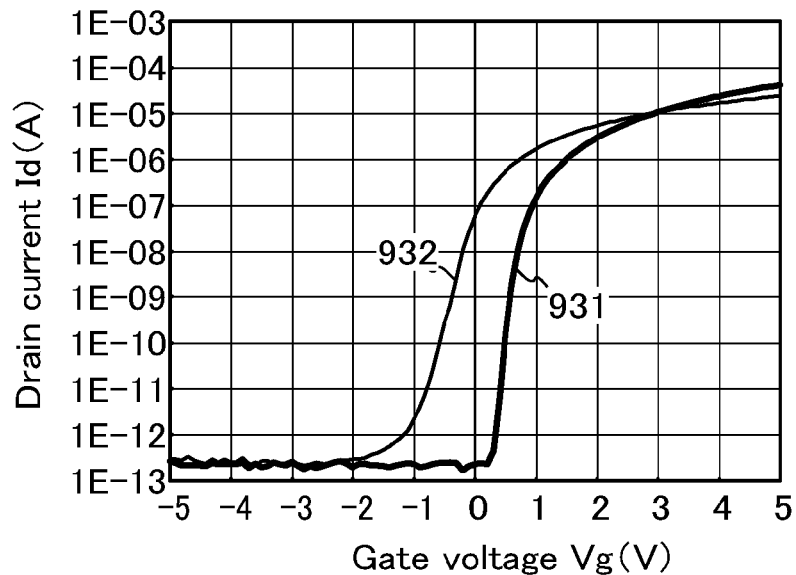
FIGS. 32A to 32C illustrate results of negative-bias temperature stress photodegradation tests.
Figure 32B:
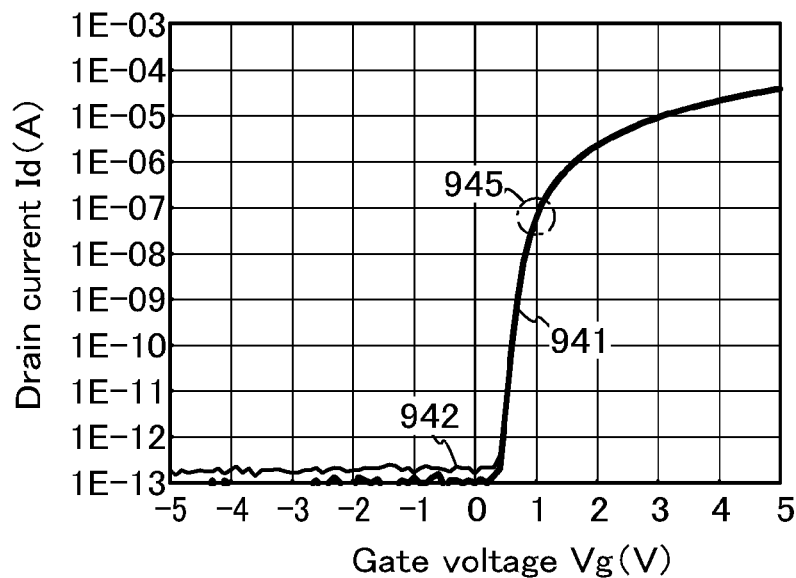
Figure 32C:
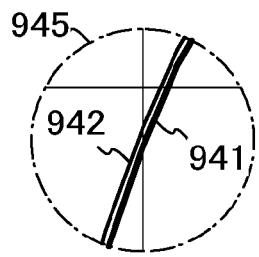

FIGS. 32A to 32C show Vg–Id characteristics of the transistor 951 and the transistor 952 before and after the negative-bias temperature stress photodegradation tests. In each of FIGS. 32A and 32B, the horizontal axis represents the gate voltage (Vg), and the vertical axis represents the drain current (Id) which is shown with a logarithmic scale.

FIG. 32A shows the Vg–Id characteristics of the transistor 951 before and after the negative-bias temperature stress photodegradation test. A curve 931 shows the initial Vg–Id characteristics of the transistor 951 before the negative-bias temperature stress photodegradation test. A curve 932 shows the Vg–Id characteristics of the transistor 951 after the negative-bias temperature stress photodegradation test. The Vth of the initial characteristics shown by the curve 931 was 1.01 V, and the Vth of the characteristics shown by the curve 932 after the test was 0.44 V.

FIG. 32B shows the Vg–Id characteristics of the transistor 952 before and after the negative-bias temperature stress photodegradation test. FIG. 32C is an enlarged view of a portion 945 illustrated in FIG. 32B. A curve 941 shows the initial Vg–Id characteristics of the transistor 952 before the negative-bias temperature stress photodegradation test. A curve 942 shows the Vg–Id characteristics of the transistor 952 after the negative-bias temperature stress photodegradation test. The Vth of the initial characteristics shown by the curve 941 was 1.16 V, and the Vth of the characteristics shown by the curve 942 after the test was 1.10 V. Note that the back gate layer 912 of the transistor 952 is electrically connected to the source layer 905a; therefore, the potential of the back gate layer 912 is the same as the potential of the source layer 905a.

In FIG. 32A, the Vth of the characteristics shown by the curve 932 after the test shifts in a negative direction by 0.57 V from that of the initial characteristics shown by the curve 931. In FIG. 32B, the Vth of the characteristics shown by the curve 942 after the test shifts in a negative direction by 0.06 V from that of the initial characteristics shown by the curve 941. It is confirmed that the amount of shift in the Vth of each of the transistor 951 and the transistor 952 is less than or equal to 1 V and that each of the transistor 951 and the transistor 952 has high reliability. It is also confirmed that the amount of shift in the Vth of the transistor 952 provided with the back gate layer 912 is less than or equal to 0.1 V and that the transistor 952 has higher reliability than the transistor 951.

<Specific Example of Layout of Pixel>

Figure 23A:
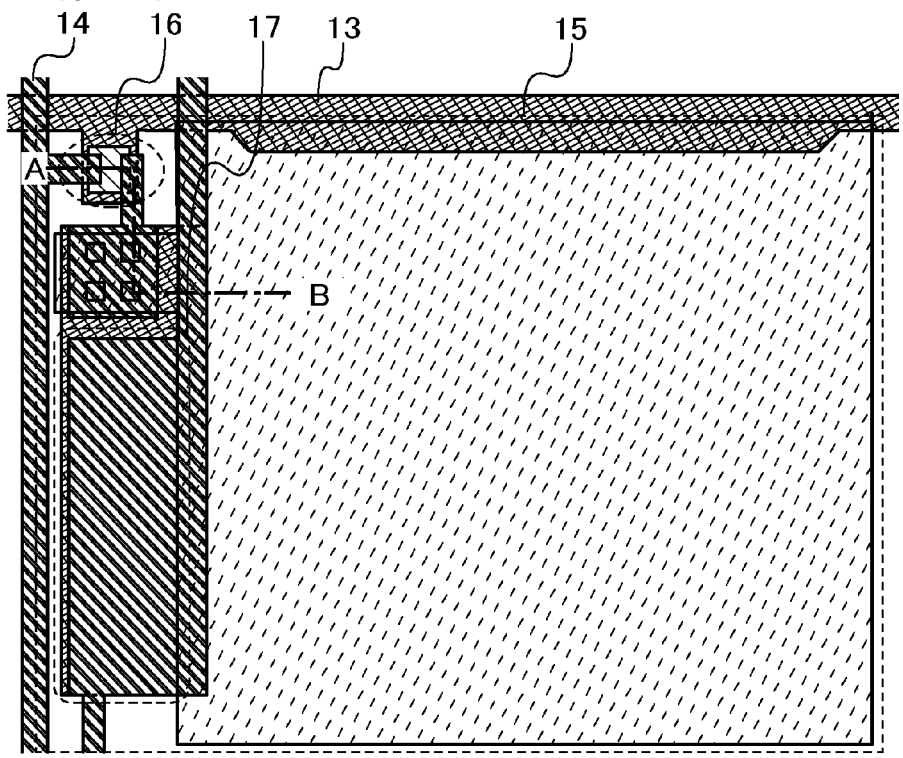
FIGS. 23A and 23B are top views of a specific example of a layout of a pixel.
Figure 23B:
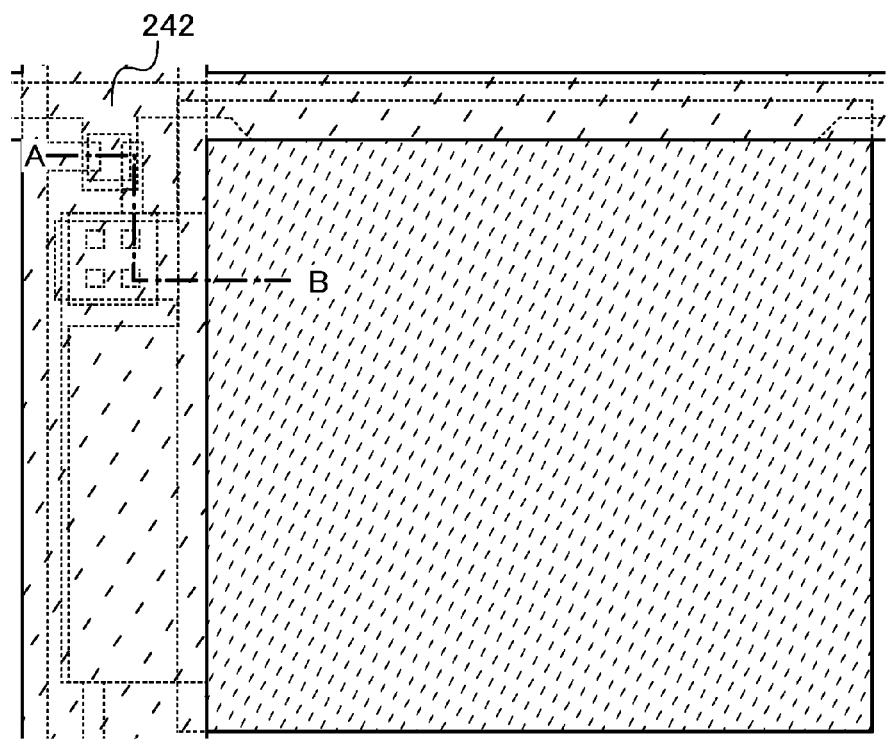
Figure 24:
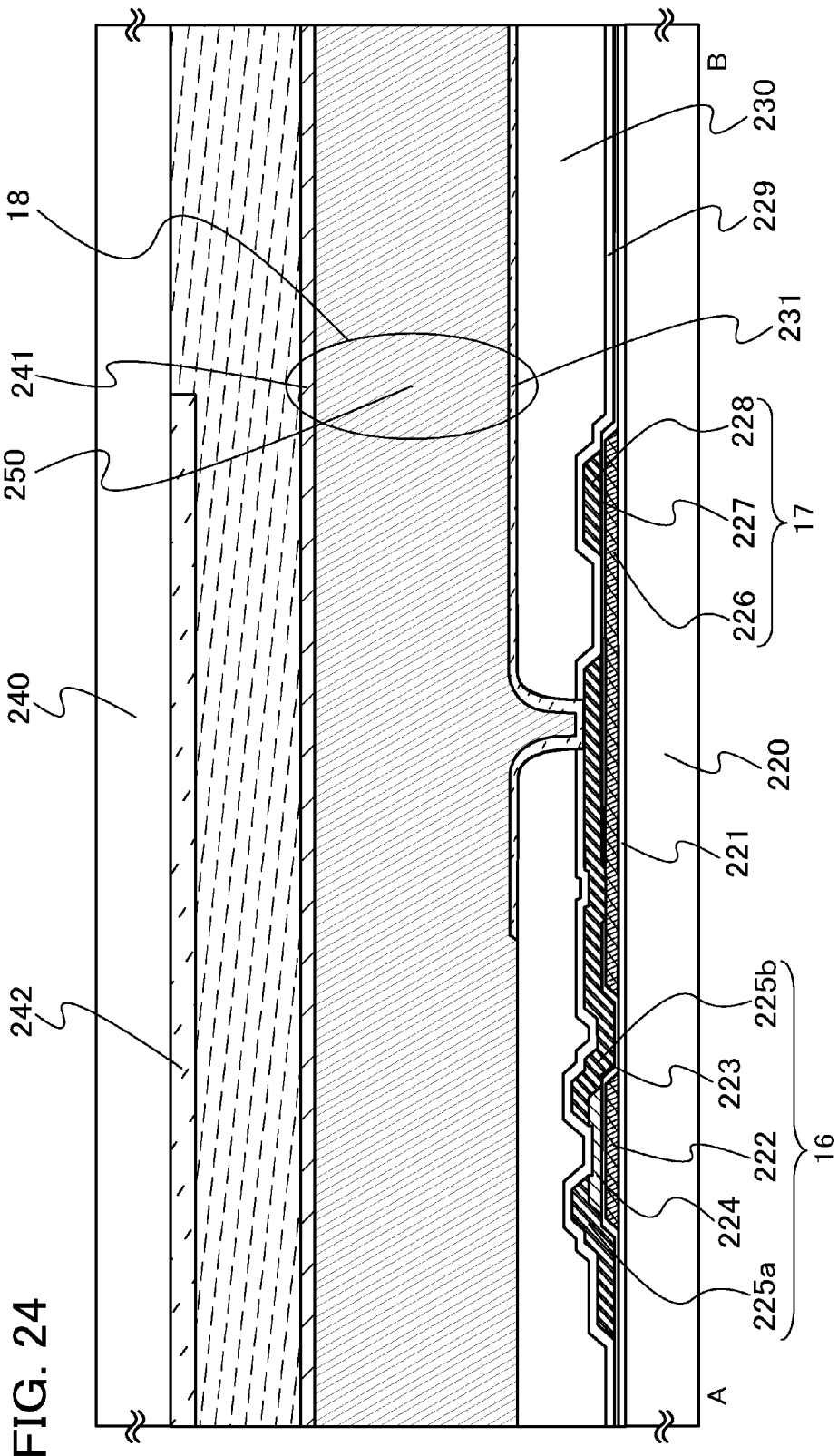
FIG. 24 is a cross-sectional view of a specific example of a layout of a pixel.

Next, specific examples of a layout of pixels in the above-described liquid crystal display device will be described with reference to FIGS. 23A and 23B and FIG. 24. Note that FIG. 23A is a top view of a layout of the pixel illustrated in FIG. 1B. FIG. 23B illustrates a layout including a light-blocking layer 242 provided over the pixel illustrated in FIG. 23A. FIG. 24 is a cross-sectional view taken along line A-B in FIGS. 23A and 23B. Note that structures of a liquid crystal layer, a counter electrode, and the like are omitted in FIGS. 23A and 23B. Hereinafter, a specific structure will be described with reference to FIG. 24.

The transistor 16 includes a conductive layer 222 provided over a substrate 220 with an insulating layer 221 interposed therebetween, an insulating layer 223 provided over the conductive layer 222, a semiconductor layer 224 which is over the conductive layer 222 and provided with the insulating layer 223 interposed therebetween, a conductive layer 225a provided over one end of the semiconductor layer 224, and a conductive layer 225b provided over the other end of the semiconductor layer 224. Note that the conductive layer 222 functions as a gate layer. The insulating layer 223 functions as a gate insulating layer. One of the conductive layer 225a and the conductive layer 225b functions as a source layer, and the other of the conductive layer 225a and the conductive layer 225b functions as a drain layer.

The capacitor 17 includes a conductive layer 226 provided over the substrate 220 with the insulating layer 221 interposed therebetween, an insulating layer 227 provided over the conductive layer 226, and a conductive layer 228 provided over the conductive layer 226 with the insulating layer 227 interposed therebetween. Note that the conductive layer 226 functions as one of electrodes of the capacitor 17. The insulating layer 227 functions as a dielectric of the capacitor 17. The conductive layer 228 functions as the other of the electrodes of the capacitor 17. The conductive layer 226 is formed using the same material as the conductive layer 222. The insulating layer 227 is formed using the same material as the insulating layer 223. The conductive layer 228 is formed using the same material as the conductive layer 225a and the conductive layer 225b. The conductive layer 226 is electrically connected to the conductive layer 225b.

Note that an insulating layer 229 and a planarization insulating layer 230 are provided over the transistor 16 and the capacitor 17.

The liquid crystal element 18 includes a transparent conductive layer 231 provided over the planarization insulating layer 230, a transparent conductive layer 241 provided on a counter substrate 240, and a liquid crystal layer 250 interposed between the transparent conductive layer 231 and the transparent conductive layer 241. Note that the transparent conductive layer 231 functions as a pixel electrode of the liquid crystal element 18. The transparent conductive layer 241 functions as a counter electrode of the liquid crystal element 18. The transparent conductive layer 231 is electrically connected to the conductive layer 225b and the conductive layer 226.

Note that an alignment film may be provided as appropriate between the transparent conductive layer 231 and the liquid crystal layer 250 or between the transparent conductive layer 241 and the liquid crystal layer 250. The alignment film can be formed using an organic resin such as polyimide or poly (vinyl alcohol). Alignment treatment such as rubbing is performed on the surface in order to align liquid crystal molecules in a certain direction. Rubbing can be performed by rolling a roller wrapped with a cloth of nylon or the like while being in contact with the alignment film and the surface of the alignment film is rubbed in a certain direction. Note that it is also possible to form the alignment film that has alignment characteristics with the use of an inorganic material such as silicon oxide by an evaporation method, without alignment treatment.

Injection of liquid crystal for forming the liquid crystal layer 250 may be performed by a dispenser method (dropping method) or a dipping method (pumping method).

Note that the light-blocking layer 242 which can block light is formed on the counter substrate 240 so that disclination caused by disorder of alignment of the liquid crystals between pixels is prevented from being observed or diffusion light is prevented from entering a plurality of pixels which is adjacent to each other in parallel. The light-blocking layer 242 can be formed using an organic resin containing a black pigment such as a carbon black or low-valent titanium oxide whose oxidation number is smaller than that of titanium dioxide. Alternatively, a film formed using chromium can be used for the light-blocking layer 242.

In particular, in the case where an oxide semiconductor is used for the semiconductor layer 224 of the transistor 16, the structure illustrated in FIG. 24 is preferable in the following point. As described above, a transistor in which an oxide semiconductor is used for a semiconductor layer is degraded by light irradiation. In contrast, light can be blocked from reaching the semiconductor layer 224 of the transistor 16 illustrated in FIG. 24 because of at least the conductive layers 222, 225a, and 225b and the light-blocking layer 242. Therefore, reliability of the transistor 16 can be improved.

The transparent conductive layer 231 and the transparent conductive layer 241 can be formed using a light-transmitting conductive material such as indium tin oxide including silicon oxide (ITSO), indium tin oxide (ITO), zinc oxide (ZnO), indium zinc oxide (IZO), or gallium-doped zinc oxide (GZO), for example.

Note that FIG. 24 illustrates a liquid crystal element with a structure where the liquid crystal layer 250 is provided between the transparent conductive layer 231 and the transparent conductive layer 241; however, the structure of the liquid crystal display device according to one embodiment of the present invention is not limited to this structure. A pair of electrodes may be formed over one substrate as in an IPS liquid crystal element or a liquid crystal element using a blue phase.

<Specific Example of Liquid Crystal Display Device>

Figures 25A, 25B:
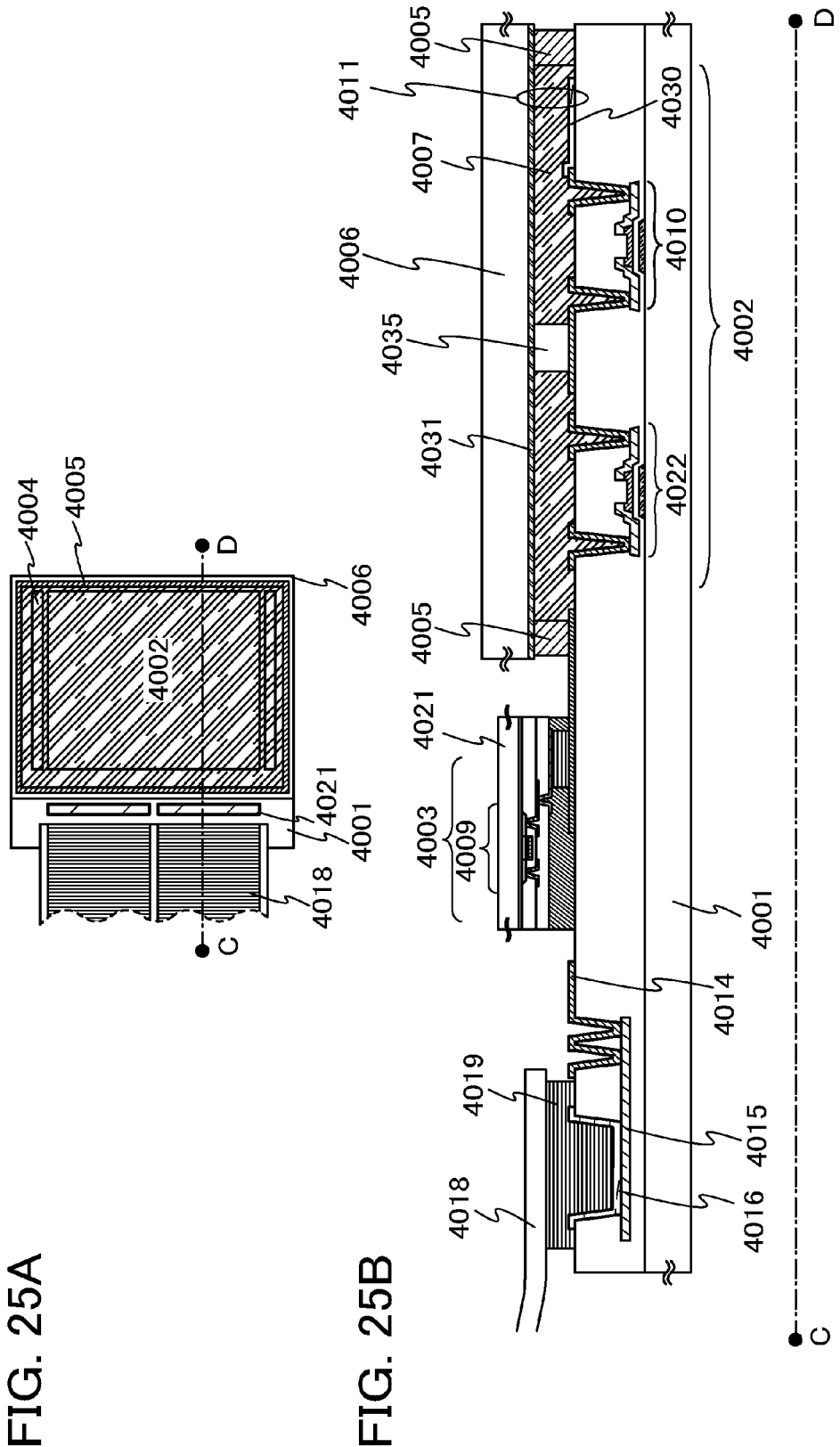
FIG. 25A is a top view of a specific example of a liquid crystal display device.
FIG. 25B is a cross-sectional view of the specific example of the liquid crystal display device.

Next, a specific example of a panel of a liquid crystal display device will be described with reference to FIGS. 25A and 25B. FIG. 25A is a top view of a panel where a substrate 4001 and a counter substrate 4006 are bonded to each other with a sealant 4005. FIG. 25B corresponds to a cross-sectional view taken along broken line C-D in FIG. 25A.

The sealant 4005 is provided so as to surround a pixel portion 4002 and a scan line driver circuit 4004 provided over the substrate 4001. In addition, the counter substrate 4006 is provided over the pixel portion 4002 and the scan line driver circuit 4004. Thus, the pixel portion 4002 and the scan line driver circuit 4004 are sealed together with liquid crystals 4007 by the substrate 4001, the sealant 4005, and the counter substrate 4006.

A substrate 4021 provided with a signal line driver circuit 4003 is mounted in a region which is different from a region surrounded by the sealant 4005 over the substrate 4001. FIG. 25B illustrates a transistor 4009 included in the signal line driver circuit 4003.

A plurality of transistors is included in the pixel portion 4002 and the scan line driver circuit 4004 which are provided over the substrate 4001. FIG. 25B illustrates transistors 4010 and 4022 which are included in the pixel portion 4002.

A pixel electrode 4030 included in a liquid crystal element 4011 is electrically connected to the transistor 4010. A counter electrode 4031 of the liquid crystal element 4011 is formed on the counter substrate 4006. A portion where the pixel electrode 4030, the counter electrode 4031, and the liquid crystal 4007 overlap with each other corresponds to the liquid crystal element 4011.

A spacer 4035 is provided in order to control a distance (cell gap) between the pixel electrode 4030 and the counter electrode 4031. Note that although FIG. 25B illustrates the case where the spacer 4035 is obtained by patterning of an insulating film, a spherical spacer may be used.

A variety of signals and potentials are supplied to the signal line driver circuit 4003, the scan line driver circuit 4004, and the pixel portion 4002 from a connection terminal 4016 through lead wirings 4014 and 4015. The connection terminal 4016 is electrically connected to a terminal of an FPC 4018 through an anisotropic conductive film 4019.

Note that as the substrate 4001, the counter substrate 4006, and the substrate 4021, glass, ceramics, or plastics can be used. Plastics include a fiberglass-reinforced plastic (FRP) plate, a poly(vinyl fluoride) (PVF) film, a polyester film, an acrylic resin film, and the like.

Note that a light-transmitting material such as a glass plate, plastics, a polyester film, or an acrylic resin film is used for a substrate which is positioned in a direction in which light is extracted through the liquid crystal element 4011.

Figure 26:
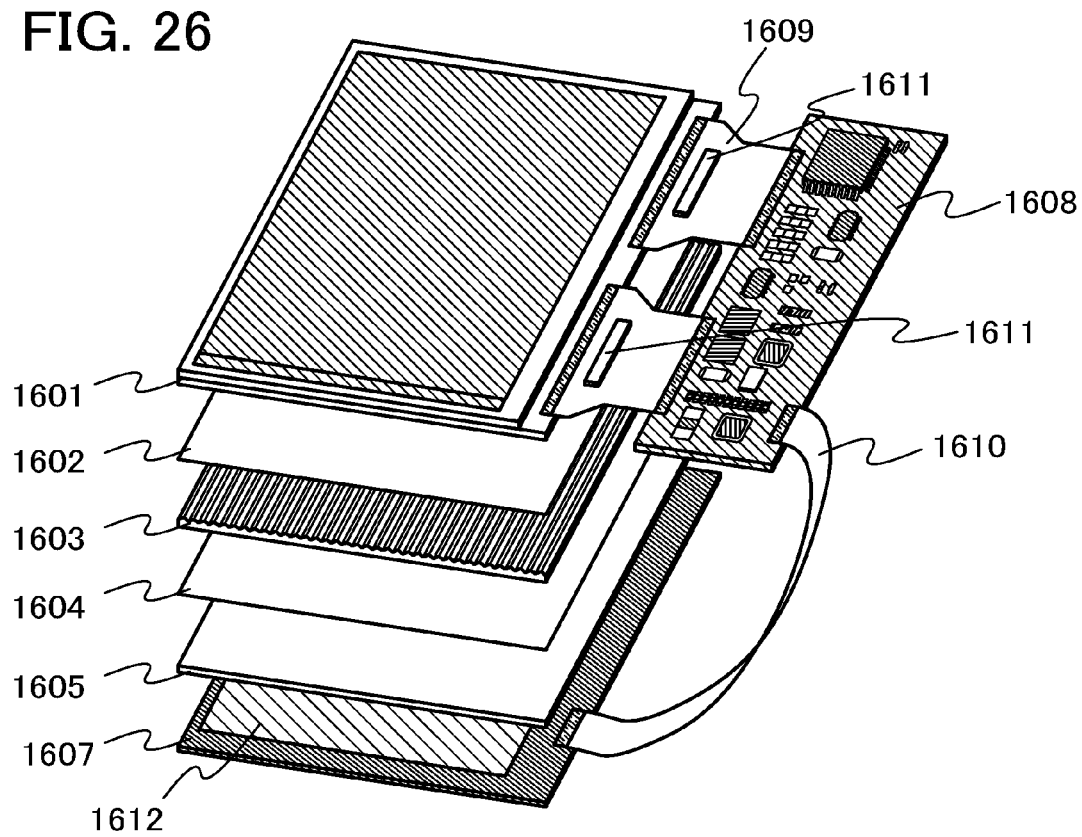
FIG. 26 is a perspective view of a specific example of a liquid crystal display device.

FIG. 26 is an example of a perspective view of the structure of the liquid crystal display device according to one embodiment of the present invention. The liquid crystal display device illustrated in FIG. 26 includes a panel 1601 including a pixel portion, a first diffusion plate 1602, a prism sheet 1603, a second diffusion plate 1604, a light guide plate 1605, a backlight panel 1607, a circuit board 1608, and substrates 1611 provided with signal line driver circuits.

The panel 1601, the first diffusion plate 1602, the prism sheet 1603, the second diffusion plate 1604, the light guide plate 1605, and the backlight panel 1607 are sequentially stacked. The backlight panel 1607 includes a backlight 1612 including a plurality of backlight units. Light from the backlight 1612 that is diffused in the light guide plate 1605 is delivered to the panel 1601 through the first diffusion plate 1602, the prism sheet 1603, and the second diffusion plate 1604.

Although the first diffusion plate 1602 and the second diffusion plate 1604 are used in this embodiment, the number of diffusion plates is not limited to two. The number of diffusion plates may be one, or may be three or more. It is acceptable as long as the diffusion plate is provided between the light guide plate 1605 and the panel 1601. Thus, the diffusion plate may be provided only on a side closer to the panel 1601 than the prism sheet 1603, or may be provided only on a side closer to the light guide plate 1605 than the prism sheet 1603.

Further, the shape of the cross section of the prism sheet 1603 is not limited to a sawtooth shape illustrated in FIG. 26, but may be a shape with which light from the light guide plate 1605 can be concentrated on the panel 1601 side.

The circuit board 1608 includes a circuit for generating various kinds of signals to be input to the panel 1601, a circuit for processing the signals, and the like. In addition, in FIG. 26, the circuit board 1608 and the panel 1601 are connected to each other via COF tapes 1609. Further, the substrates 1611 provided with the signal line driver circuits are connected to the COF tapes 1609 by a chip on film (COF) method.

FIG. 26 illustrates an example in which the circuit board 1608 is provided with a control circuit which controls driving of the backlight 1612 and the control circuit and the backlight panel 1607 are connected to each other through an FPC 1610. Note that the control circuit may be formed over the panel 1601. In that case, the panel 1601 and the backlight panel 1607 are connected to each other through an FPC or the like.

<Various Kinds of Electronic Devices Including Liquid Crystal Display Device>

Examples of electronic devices each including the liquid crystal display device disclosed in this specification will be described below with reference to FIGS. 27A to 27F.

Figure 27A:
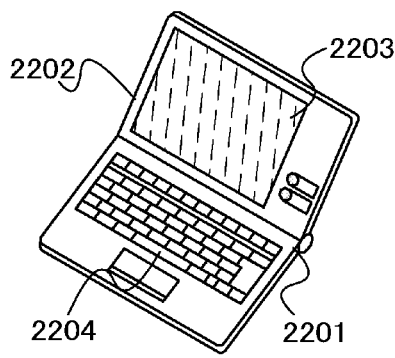
FIGS. 27A to 27F illustrate electronic devices as examples.

FIG. 27A illustrates a laptop personal computer, which includes a main body 2201, a housing 2202, a display portion 2203, a keyboard 2204, and the like.

Figure 27B:
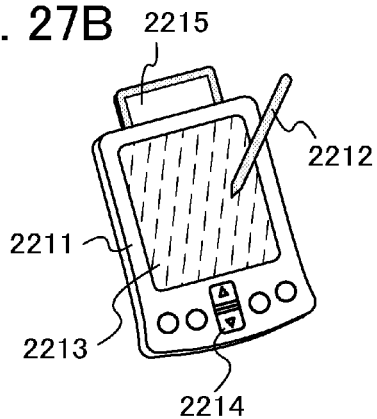

FIG. 27B illustrates a portable information terminal (PDA), which includes a main body 2211 provided with a display portion 2213, an external interface 2215, operation buttons 2214, and the like. Further, a stylus 2212 for operation is included as an accessory.

Figure 27C:
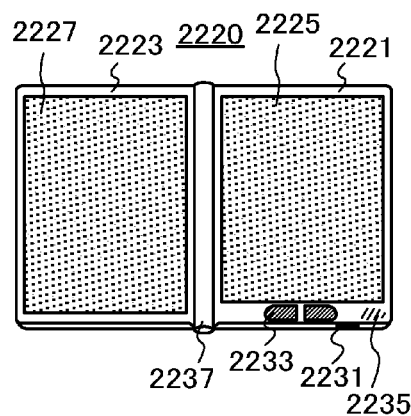

FIG. 27C illustrates an e-book reader 2220. The e-book reader 2220 includes two housings 2221 and 2223. The housings 2221 and 2223 are combined with each other with a hinge 2237 so that the e-book reader 2220 can be opened and closed with the hinge 2237 used as an axis. With such a structure, the e-book reader 2220 can be used like a paper book.

A display portion 2225 is incorporated in the housing 2221, and a display portion 2227 is incorporated in the housing 2223. The display portions 2225 and 2227 may display one image or different images. In the case where the display portions 2225 and 2227 display different images, for example, a display portion on the right side (the display portion 2225 in FIG. 27C) can display text and a display portion on the left side (the display portion 2227 in FIG. 27C) can display images.

Further, in FIG. 27C, the housing 2221 includes an operation portion and the like. For example, the housing 2221 includes a power button 2231, operation keys 2233, a speaker 2235, and the like. With the operation key 2233, pages can be turned. Note that a keyboard, a pointing device, or the like may be provided on the same surface as the display portion of the housing. Further, an external connection terminal (e.g., an earphone terminal, a USB terminal, or a terminal which can be connected to an AC adapter or a variety of cables such as USB cables), a recording medium insertion portion, or the like may be provided on a back surface or a side surface of the housing. Furthermore, the e-book reader 2220 may function as an electronic dictionary.

The e-book reader 2220 may transmit and receive data wirelessly. Through wireless communication, desired book data or the like can be purchased and downloaded from an electronic book server.

Figure 27D:
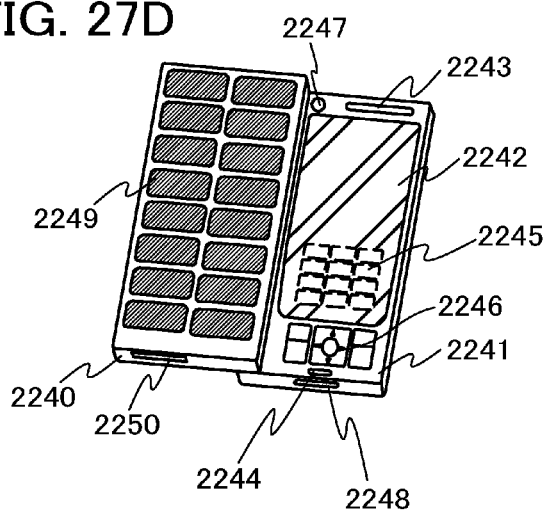

FIG. 27D illustrates a cellular phone. The cellular phone includes two housings 2240 and 2241. The housing 2241 includes a display panel 2242, a speaker 2243, a microphone 2244, a pointing device 2246, a camera lens 2247, an external connection terminal 2248, and the like. The housing 2240 includes a solar cell 2249 for storing electricity in the cellular phone, an external memory slot 2250, and the like. Further, an antenna is incorporated in the housing 2241.

The display panel 2242 has a touch panel function. A plurality of operation keys 2245 which are displayed as images are indicated by dashed lines in FIG. 27D. Note that the cellular phone includes a DC-DC converter for raising voltage output from the solar cell 2249 to voltage needed for each circuit. Further, the cellular phone can include a contactless IC chip, a small recording device, or the like in addition to the above components.

The display direction of the display panel 2242 is changed as appropriate in accordance with applications. Further, the camera lens 2247 is provided on the same surface as the display panel 2242; thus, the cellular phone can be used as a video phone. The speaker 2243 and the microphone 2244 can be used for videophone calls, recording, and playing sound, and the like as well as voice calls. Furthermore, the housings 2240 and 2241 which are developed as illustrated in FIG. 27D can overlap with each other by sliding; thus, the size of the cellular phone can be decreased, which makes the cellular phone suitable for being carried.

The external connection terminal 2248 can be connected to an AC adapter or a variety of cables such as USB cables, so that electricity can be stored and data communication can be performed. In addition, a larger amount of data can be saved and moved by insertion of a recording medium in the external memory slot 2250. Further, in addition to the above functions, the cellular phone may have an infrared communication function, a television reception function, or the like.

Figure 27E:
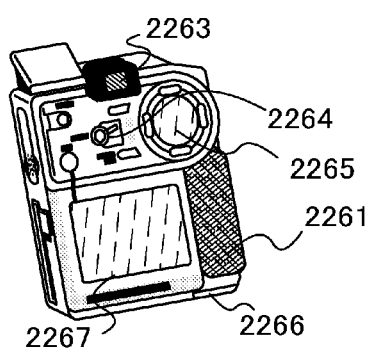

FIG. 27E illustrates a digital camera. The digital camera includes a main body 2261, a display portion A 2267, an eyepiece portion 2263, an operation switch 2264, a display portion B 2265, a battery 2266, and the like.

Figure 27F:
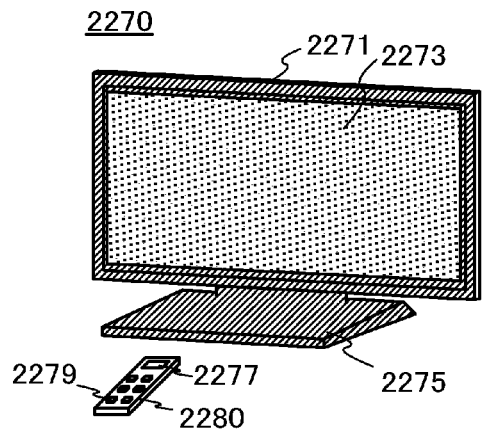

FIG. 27F illustrates a television set. A television set 2270 includes a display portion 2273 incorporated in a housing 2271. The display portion 2273 can display images. Note that here, the housing 2271 is supported by a stand 2275.

The television set 2270 can be operated by an operation switch of the housing 2271 or a remote control 2280. Channels and volume can be controlled with operation keys 2279 of the remote control 2280, so that an image displayed on the display portion 2273 can be controlled. Further, the remote control 2280 may have a display portion 2277 for displaying data output from the remote control 2280.

Note that the television set 2270 preferably includes a receiver, a modem, and the like. A general television broadcast can be received with the receiver. Further, when the television set is connected to a communication network with or without wires via the modem, one-way (from a transmitter to a receiver) or two-way (between a transmitter and a receiver or between receivers) data communication can be performed.

Embodiment 4

In this embodiment, one embodiment of a substrate used in a liquid crystal display device according to one embodiment of the present invention will be described with reference to FIGS. 28A, 28B, 28C1, 28C2, 28D1, 28D2, 28E1, and 28E2, and FIG. 29.

First, over a formation substrate 6200, a layer to be separated 6116 including a necessary element as an element substrate, such as a transistor, an interlayer insulating film, a wiring, or a pixel electrode is formed so that a separation layer 6201 is interposed between the formation substrate 6200 and the layer to be separated 6116.

As the formation substrate 6200, a quartz substrate, a sapphire substrate, a ceramic substrate, a glass substrate, a metal substrate, or the like can be used. Note that a substrate having a thickness without clearly exhibiting flexibility is used for such a substrate, whereby an element such as a transistor can be formed with high accuracy. The thickness with which flexibility is not clearly expressed means approximately elastic modulus of a glass substrate used when a liquid crystal display is normally formed, or higher than the elastic module.

The separation layer 6201 is formed by a sputtering method, a plasma-enhanced CVD method, a coating method, a printing method, or the like to be a single layer or a stacked layer using an element such as tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), iridium (Ir), or silicon (Si); an alloy material containing the element as its main component; or a compound material containing the element as its main component.

In the case where the separation layer 6201 has a single-layer structure, a tungsten layer, a molybdenum layer, or a layer containing a mixture of tungsten and molybdenum is preferably formed. Alternatively, the separation layer 6201 can be formed using a layer containing an oxide of tungsten, a layer containing an oxynitride of tungsten, a layer containing an oxide of molybdenum, a layer containing an oxynitride of molybdenum, or a layer containing an oxide or an oxynitride of a mixture of tungsten and molybdenum. Note that the mixture of tungsten and molybdenum corresponds to an alloy of tungsten and molybdenum, for example.

In the case where the separation layer 6201 has a layered structure, preferably, a metal layer is formed as a first layer, and a metal oxide layer is formed as a second layer. Typically, a tungsten layer, a molybdenum layer, or a layer containing a mixture of tungsten and molybdenum may be formed as a first layer, and a layer containing oxide, nitride, oxynitride, or nitride oxide of tungsten, molybdenum, or a mixture of tungsten and molybdenum may be formed as a second layer. For the formation of a metal oxide layer as the second layer, the following method may be applied: an oxide layer (e.g., a layer which can be used as an insulating layer of silicon oxide or the like) is formed over a metal layer as the first layer, whereby an oxide of the metal is formed on a surface of the metal layer.

Figure 28A:

The layer to be separated 6116 is formed over the separation layer 6201 (see FIG. 28A). The layer to be separated 6116 includes a necessary element as an element substrate, such as a transistor, an interlayer insulating film, a wiring, or a pixel electrode. These elements can be formed by a photolithography method or the like.

Figure 28B:
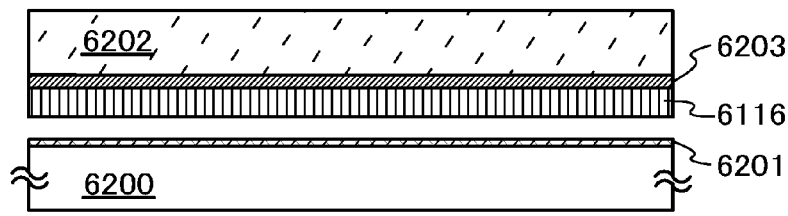
Figure 28B:
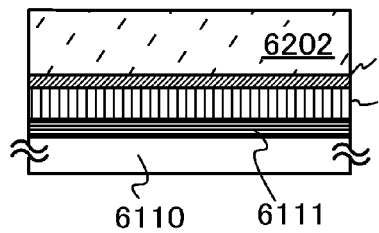
Figure 28B:
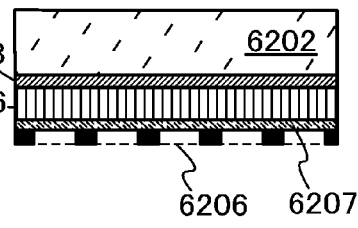
Figure 28B:
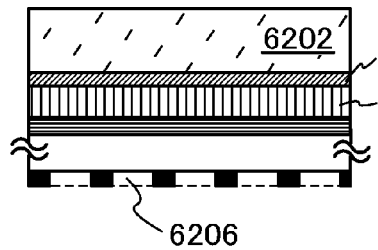
Figure 28B:
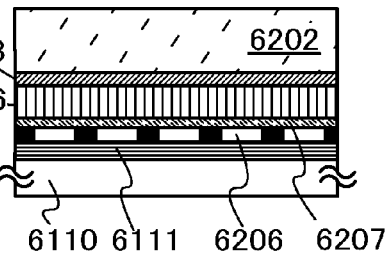
Figure 28B:
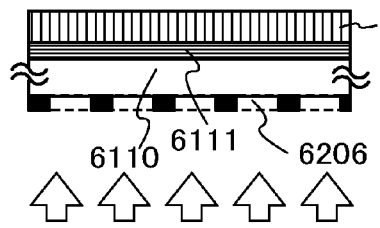
Figure 28B:
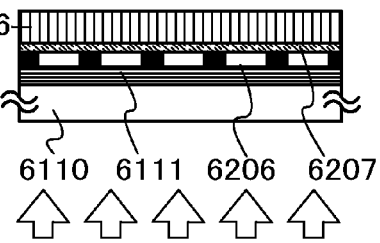

Next, after the layer to be separated 6116 is bonded to a temporary supporting substrate 6202 using an adhesive 6203 for separation, the layer to be separated 6116 is separated from the separation layer 6201 of the formation substrate 6200 and transferred to the temporary supporting substrate 6202 (see FIG. 28B). By this process, the layer to be separated 6116 is placed on the temporary supporting substrate side. Note that in this specification, a process in which a separation layer is transferred to a temporary supporting substrate from a formation substrate is referred to as a transfer process.

As the temporary supporting substrate 6202, a glass substrate, a quartz substrate, a sapphire substrate, a ceramic substrate, a metal substrate, or the like can be used. Alternatively, a plastic substrate which can withstand the following process temperature may be used.

As the adhesive 6203 for separation which is used here, an adhesive which is soluble in water or a solvent, an adhesive which is capable of being plasticized upon irradiation of UV light or the like, and the like are used so that the temporary supporting substrate 6202 and the layer to be separated 6116 can be separated when necessary.

Any of various methods can be used as appropriate as the process for transferring the layer to be separated to the temporary supporting substrate 6202. For example, when a film including a metal oxide film is formed as the separation layer 6201 on the side in contact with the layer to be separated 6116, the metal oxide film is embrittled by crystallization, whereby the layer to be separated 6116 can be separated from the formation substrate 6200. When an amorphous silicon film containing hydrogen is formed as the separation layer 6201 between the formation substrate 6200 and the layer to be separated 6116, by removing the amorphous silicon film containing hydrogen by laser light irradiation or etching, the layer to be separated 6116 can be separated from the formation substrate 6200. In addition, in the case where a film containing nitrogen, oxygen, hydrogen, or the like (e.g., an amorphous silicon film containing hydrogen, a film of an alloy containing hydrogen, or a film of an alloy containing oxygen) is used as the separation layer 6201, the separation layer 6201 is irradiated with laser light, so that nitrogen, oxygen, or hydrogen contained in the separation layer 6201 can be released as a gas to promote separation between the layer to be separated 6116 and the formation substrate 6200. Alternatively, separation of the layer to be separated 6116 from the formation substrate 6200 may be carried out after a liquid is made to penetrate an interface between the separation layer 6201 and the layer to be separated 6116. As another separation method, when the separation layer 6201 is formed using tungsten, the separation may be performed while the separation layer 6201 is etched with the use of a mixed solution of ammonia water and a hydrogen peroxide solution.

When a plurality of the above-described separation methods is combined, the separation process can be conducted easily. This corresponds to the following process or the like: the separation is performed with physical force (by a machine or the like) after performing laser light irradiation; etching on the separation layer 6201 with a gas, a solution, or the like; or partial mechanical removal with a sharp knife, scalpel, or the like so as to make a condition where the separation layer 6201 and the layer to be separated 6116 can be easily separated from each other. In the case where the separation layer 6201 is formed using a layered structure of metal and metal oxide, the layer to be separated 6116 can be easily physically separated from the separation layer 6201 using a groove formed by laser irradiation; a flaw formed by a sharp knife, scalpel, or the like; or the like, as a trigger.

Further alternatively, the separation may be performed while pouring a liquid such as water during the separation.

As another method in which the layer to be separated 6116 is separated from the formation substrate 6200, a method in which the formation substrate 6200 provided with the layer to be separated 6116 is removed by mechanical polishing or the like, a method in which the formation substrate 6200 provided with the layer to be separated 6116 is removed by etching using a solution or a halogen fluoride gas such as $NF_3$, $BrF_3$, or $ClF_3$, or the like may be used. In this case, the separation layer 6201 is not necessarily provided.

Next, the separation layer 6201 which is separated from the formation substrate 6200 and exposed or the surface of the layer to be separated 6116 is bonded to a transfer substrate 6110 with use of a first adhesive layer 6111 including an adhesive different from the adhesive 6203 for separation (see FIG. 28C1).

As a material of the first adhesive layer 6111, various curable adhesives, e.g., a light curable adhesive such as a UV curable adhesive, a reactive curable adhesive, a thermal curable adhesive, and an anaerobic adhesive can be used.

As the transfer substrate 6110, various substrates with high toughness can be used; for example, an organic resin film, a metal substrate, or the like can be preferably used. The substrate with high toughness is superior in resistance to shock and difficult to break. The organic resin film is lightweight, and the metal substrate is also lightweight when it is thin; therefore, a large reduction in weight can be achieved, as compared to the case where a normal glass substrate is used. With such a substrate, a display device which is lightweight and difficult to break can be formed.

As a material used for forming such a substrate, for example, a polyester resin such as poly(ethylene terephthalate) (PET) or poly(ethylene naphthalate) (PEN), an acrylic resin, a polyacrylonitrile resin, a polyimide resin, poly(methyl methacrylate), a polycarbonate (PC) resin, a polyethersulfone (PES) resin, a polyamide resin, a polycycloolefin resin, polystyrene, a polyamide imide resin, polyvinylchloride, and the like can be given. A substrate formed using any of these organic materials has high toughness; therefore, the substrate is superior even in resistance to shock and difficult to break. Further, these organic materials are lightweight; therefore, a display device whose weight is largely reduced in comparison with the case where a normal glass substrate is used can be formed. In this case, it is preferable that the transfer substrate 6110 further include a metal plate 6206 provided with an opening in a portion overlapped with at least a region of each pixel through which light is transmitted. With this structure, the transfer substrate 6110 which is difficult to break and which has high toughness and high resistance to shock while suppressing a change in dimension can be formed. Further, the thickness of the metal plate 6206 is small, so that the transfer substrate 6110 which has lower weight than a conventional glass substrate can be formed. When such a substrate is used, a lightweight display device which is difficult to break can be formed (see FIG. 28D1).

Figure 29:
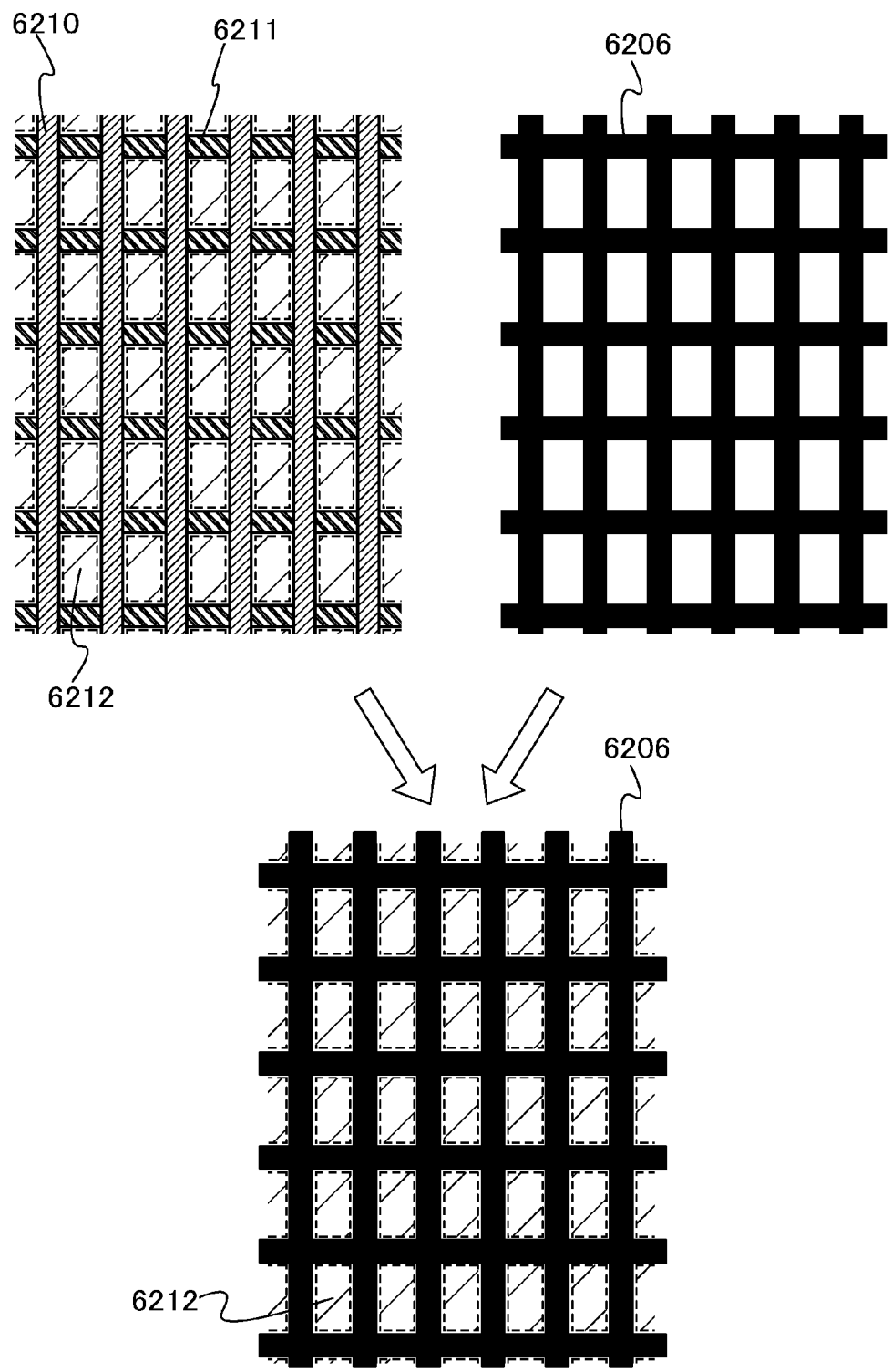
FIG. 29 illustrates an example of a liquid crystal display device.

FIG. 29 illustrates an example of a top view of a liquid crystal display device. In the case of a liquid crystal display device in which a first wiring layer 6210 intersects with a second wiring layer 6211 and a region surrounded by the first wiring layer 6210 and the second wiring layer 6211 is a light-transmitting region 6212 as illustrated in FIG. 29, the metal plate 6206 in which a portion overlapped with the first wiring layer 6210 and the second wiring layer 6211 remains and openings in a grid are provided may be used. Such a metal plate 6206 is attached to the first wiring layer 6210 and the second wiring layer 6211, whereby a reduction in accuracy of alignment due to the use of a substrate formed using an organic resin or a change in dimension due to a stretch of a substrate can be suppressed. Note that in the case where a polarization plate (not illustrated) is needed, the polarization plate may be provided between the transfer substrate 6110 and the metal plate 6206 or may be provided outside the metal plate 6206. The polarization plate may be attached to the metal plate 6206 in advance. Note that in terms of reduction in weight, it is preferable to use a thin substrate as the metal plate 6206 as far as the effect of the stability of the dimension is produced.

Then, the temporary supporting substrate 6202 is separated from the layer to be separated 6116. The adhesive 6203 for separation is formed using a material which can separate the temporary supporting substrate 6202 and the layer to be separated 6116 when necessary; therefore, the temporary supporting substrate 6202 may be separated by a method suited to the material. Note that a backlight is turned on, so that the transfer substrate 6110 is irradiated with light from the direction shown by arrows in the drawing (see FIG. 28E1).

As described above, the layer to be separated 6116 provided with elements from a transistor to a pixel electrode can be formed over the transfer substrate 6110, and an element substrate which is lightweight and has high resistance to shock can be formed.

Modification Example

The display device having the above-described configuration is one embodiment of the present invention; the present invention also includes a display device that has a structure which is different from the structure of the display device. After the transfer process (see FIG. 28B) and before the transfer substrate 6110 is attached to the temporary supporting substrate 6202, the metal plate 6206 may be attached to the exposed separation layer 6201 or the surface of the layer to be separated 6116 (see FIG. 28C2). In this case, a barrier layer 6207 may be provided between the metal plate 6206 and the layer to be separated 6116 so that a contaminant from the metal plate 6206 is prevented from adversely affecting characteristics of the transistor in the layer to be separated 6116. In the case where the barrier layer 6207 is provided, after the barrier layer 6207 is provided on the exposed separation layer 6201 or the surface of the layer to be separated 6116, the metal plate 6206 may be attached to the barrier layer 6207. The barrier layer 6207 may be formed using an inorganic material, an organic material, or the like and typically silicon nitride and the like can be given. However, one embodiment of the present invention is not limited thereto as long as contamination of the transistor can be prevented. The barrier layer 6207 is formed so as to have a light-transmitting property with respect to at least visible light; for example, the barrier layer 6207 is formed using a light-transmitting material or a film to be thin enough to have a light-transmitting property. Note that a second adhesive layer (not illustrated) may be formed using an adhesive which is different from the adhesive 6203 for separation, and the metal plate 6206 may be bonded.

Then, the first adhesive layer 6111 is formed on the surface of the metal plate 6206, and the transfer substrate 6110 is attached to the first adhesive layer 6111 (FIG. 28D2), and the temporary supporting substrate 6202 is separated from the layer to be separated 6116 (FIG. 28E2), whereby an element substrate which is lightweight and has high resistance to shock can be formed similarly. Note that a backlight is turned on, so that the transfer substrate 6110 is irradiated with light from the direction shown by arrows in the drawing.

The element substrate formed in this manner, which is lightweight and has high resistance to shock, and a counter substrate are provided with a liquid crystal layer interposed therebetween and are fixed to each other using a sealant, whereby a liquid crystal display device which is lightweight and has high resistance to shock can be formed. As the counter substrate, a substrate which has high toughness and a light-transmitting property with respect to at least visible light (a substrate similar to a plastic substrate which can be used for the transfer substrate 6110) can be used. The substrate may be provided with a polarization plate, a black matrix, and an alignment film, if necessary. As a method for forming a liquid crystal layer, a dispenser method, an injection method, or the like can be employed.

In the liquid crystal display device which is lightweight and has high resistance to shock, which is formed as described above, a minute element such as a transistor can be formed over a glass substrate which has relatively good stability of the dimension or the like, and a conventional manufacturing method can be employed. Therefore, a minute element can be formed with high accuracy. Accordingly, the liquid crystal display device which can provide a high quality image with high definition and is lightweight while having resistance to shock can be provided.

Further, the liquid crystal display device which is formed as described above can also have flexibility.

This application is based on Japanese Patent Application serial no. 2010-152016 filed with the Japan Patent Office on Jul. 2, 2010, the entire contents of which are hereby incorporated by reference.

What is claimed is:

1. A driving method of a liquid crystal display device, the driving method comprising the steps of:
    irradiating a first pixel, a second pixel, and a third pixel with first light, second light, and third light, respectively, which are generated in a backlight at the same time in a first period;
    irradiating the first pixel, the second pixel, and the third pixel with fourth light, the first light, and the second light, respectively, which are generated in the backlight at the same time in a second period;
    irradiating the first pixel, the second pixel, and the third pixel with fifth light, the fourth light, and the first light, respectively, which are generated in the backlight at the same time in a third period;
    irradiating the first pixel, the second pixel, and the third pixel with sixth light, the fifth light, and the fourth light, respectively, which are generated in the backlight at the same time in a fourth period;
    irradiating the first pixel, the second pixel, and the third pixel with the third light, the sixth light, and the fifth light, respectively, which are generated in the backlight at the same time in a fifth period; and
    irradiating the first pixel, the second pixel, and the third pixel with the second light, the third light, and the sixth light, respectively, which are generated in the backlight at the same time in a sixth period,
    wherein the first light, the second light, the third light, the fourth light, the fifth light, and the sixth light are different in color,
    wherein the backlight includes a first region for irradiating light to the first pixel, a second region for irradiating light to the second pixel, and a third region for irradiating light to the third pixel, and
    wherein the first region, the second region, and the third region emit light of different colors from each other in each of the first period to the sixth period.

2. The driving method according to claim 1,
    wherein the first period, the second period, the third period, the fourth period, the fifth period, and the sixth period are sequentially arranged.

3. The driving method according to claim 1,
    wherein three of the first light, the second light, the third light, the fourth light, the fifth light, and the sixth light are generated by mixing any two of the other of the three of the first light, the second light, the third light, the fourth light, the fifth light, and the sixth light.

4. The driving method according to claim 3,
    wherein the three of the first light, the second light, the third light, the fourth light, the fifth light, and the sixth light each are red, green, or blue.

5. A driving method of a liquid crystal display device comprising first to third groups each of which has a plurality of pixels arranged in a matrix form, the driving method comprising the steps of:
    irradiating the plurality of pixels in the first group, the plurality of pixels in the second group, and the plurality of pixels in the third group with first light, second light, and third light, respectively, which are generated in a backlight at the same time in a first period;
    irradiating the plurality of pixels in the first group, the plurality of pixels in the second group, and the plurality of pixels in the third group with fourth light, the first light, and the second light, respectively, which are generated in the backlight at the same time in a second period;
    irradiating the plurality of pixels in the first group, the plurality of pixels in the second group, and the plurality of pixels in the third group with fifth light, the fourth light, and the first light, respectively, which are generated in the backlight at the same time in a third period;
    irradiating the plurality of pixels in the first group, the plurality of pixels in the second group, and the plurality of pixels in the third group with sixth light, the fifth light, and the fourth light, respectively, which are generated in the backlight at the same time in a fourth period;
    irradiating the plurality of pixels in the first group, the plurality of pixels in the second group, and the plurality of pixels in the third group with the third light, the sixth light, and the fifth light, respectively, which are generated in the backlight at the same time in a fifth period; and
    irradiating the plurality of pixels in the first group, the plurality of pixels in the second group, and the plurality of pixels in the third group with the second light, the third light, and the sixth light, respectively, which are generated in the backlight at the same time in a sixth period,
    wherein the first light, the second light, the third light, the fourth light, the fifth light, and the sixth light are different in color,
    wherein the backlight includes a first region for irradiating light to the first group, a second region for irradiating light to the second group, and a third region for irradiating light to the third group, and
    wherein the first region, the second region, and the third region emit light of different colors from each other in each of the first period to the sixth period.

6. The driving method according to claim 5,
    wherein the first period, the second period, the third period, the fourth period, the fifth period, and the sixth period are sequentially arranged.

7. The driving method according to claim 5,
    wherein, in each of the first to sixth periods, the plurality of pixels in the first group is sequentially selected,
    wherein, in each of the first to sixth periods, the plurality of pixels in the second group is sequentially selected, and
    wherein, in each of the first to sixth periods, the plurality of pixels in the third group is sequentially selected.

8. The driving method according to claim 5,
    wherein three of the first light, the second light, the third light, the fourth light, the fifth light, and the sixth light are generated by mixing any two of the other of the three of the first light, the second light, the third light, the fourth light, the fifth light, and the sixth light.

9. The driving method according to claim 8,
    wherein the three of the first light, the second light, the third light, the fourth light, the fifth light, and the sixth light each are red, green, or blue.

10. A driving method of a liquid crystal display device comprising first to third groups each of which has a plurality of pixels arranged in a matrix form, the driving method comprising the steps of:
    selecting the plurality of pixels in the first to third groups and then irradiating the plurality of pixels in the first group, the plurality of pixels in the second group, and the plurality of pixels in the third group with first light, second light, and third light, respectively, which are generated in a backlight at the same time in a first period;

selecting the plurality of pixels in the first to third groups and then irradiating the plurality of pixels in the first group, the plurality of pixels in the second group, and the plurality of pixels in the third group with fourth light, the first light, and the second light, respectively, which are generated in the backlight at the same time in a second period;

selecting the plurality of pixels in the first to third groups and then irradiating the plurality of pixels in the first group, the plurality of pixels in the second group, and the plurality of pixels in the third group with fifth light, the fourth light, and the first light, respectively, which are generated in the backlight at the same time in a third period;

selecting the plurality of pixels in the first to third groups and then irradiating the plurality of pixels in the first group, the plurality of pixels in the second group, and the plurality of pixels in the third group with sixth light, the fifth light, and the fourth light, respectively, which are generated in the backlight at the same time in a fourth period;

selecting the plurality of pixels in the first to third groups and then irradiating the plurality of pixels in the first group, the plurality of pixels in the second group, and the plurality of pixels in the third group with the third light, the sixth light, and the fifth light, respectively, which are generated in the backlight at the same time in a fifth period; and selecting the plurality of pixels in the first to third groups and then irradiating the plurality of pixels in the first group, the plurality of pixels in the second group, and the plurality of pixels in the third group with the second light, the third light, and the sixth light, respectively, which are generated in the backlight at the same time in a sixth period, wherein the first light, the second light, the third light, the fourth light, the fifth light, and the sixth light are different in color, wherein the backlight includes a first region for irradiating light to the first group, a second region for irradiating light to the second group, and a third region for irradiating light to the third group, and wherein the first region, the second region, and the third region emit light of different colors from each other in each of the first period to the sixth period.

11. The driving method according to claim 10,
wherein the first period, the second period, the third period, the fourth period, the fifth period, and the sixth period are sequentially arranged.

12. The driving method according to claim 10,
wherein, in each of the first to sixth periods, the plurality of pixels in the first group is sequentially selected,
wherein, in each of the first to sixth periods, the plurality of pixels in the second group is sequentially selected, and
wherein, in each of the first to sixth periods, the plurality of pixels in the third group is sequentially selected.

13. The driving method according to claim 10,
wherein three of the first light, the second light, the third light, the fourth light, the fifth light, and the sixth light are generated by mixing any two of the other of the three of the first light, the second light, the third light, the fourth light, the fifth light, and the sixth light.

14. The driving method according to claim 13,
wherein the three of the first light, the second light, the third light, the fourth light, the fifth light, and the sixth light each are red, green, or blue.

15. A liquid crystal display device comprising:
a first pixel, a second pixel, and a third pixel; and
a backlight,
wherein the first pixel, the second pixel, and the third pixel are configured to be irradiated with first light, second light, and third light, respectively, which are generated in the backlight at the same time in a first period, wherein the first pixel, the second pixel, and the third pixel are configured to be irradiated with fourth light, the first light, and the second light, respectively, which are generated in the backlight at the same time in a second period, wherein the first pixel, the second pixel, and the third pixel are configured to be irradiated with fifth light, the fourth light, and the first light, respectively, which are generated in the backlight at the same time in a third period, wherein the first pixel, the second pixel, and the third pixel are configured to be irradiated with sixth light, the fifth light, and the fourth light, respectively, which are generated in the backlight at the same time in a fourth period, wherein the first pixel, the second pixel, and the third pixel are configured to be irradiated with the third light, the sixth light, and the fifth light, respectively, which are generated in the backlight at the same time in a fifth period, wherein the first pixel, the second pixel, and the third pixel are configured to be irradiated with the second light, the third light, and the sixth light, respectively, which are generated in the backlight at the same time in a sixth period, wherein the first light, the second light, the third light, the fourth light, the fifth light, and the sixth light are different in color, wherein the backlight includes a first region for irradiating light to the first pixel, a second region for irradiating light to the second pixel, and a third region for irradiating light to the third pixel, and wherein the first region, the second region, and the third region emit light of different colors from each other in each of the first period to the sixth period.

16. The liquid crystal display device according to claim 15,
wherein the first period, the second period, the third period, the fourth period, the fifth period, and the sixth period are sequentially arranged.

17. The liquid crystal display device according to claim 15,
wherein three of the first light, the second light, the third light, the fourth light, the fifth light, and the sixth light are generated by mixing any two of the other of the three of the first light, the second light, the third light, the fourth light, the fifth light, and the sixth light.

18. The liquid crystal display device according to claim 17,
wherein the three of the first light, the second light, the third light, the fourth light, the fifth light, and the sixth light each are red, green, or blue.

19. A liquid crystal display device comprising:
first to third groups each of which has a plurality of pixels arranged in a matrix form; and
a backlight,
wherein the plurality of pixels in the first group, the plurality of pixels in the second group, and the plurality of pixels in the third group are configured to be irradiated with first light, second light, and third light, respectively, which are generated in the backlight at the same time in a first period, wherein the plurality of pixels in the first group, the plurality of pixels in the second group, and the plurality of pixels in the third group are configured to be irradiated with fourth light, the first light, and the second light, respectively, which are generated in the backlight at the same time in a second period, wherein the plurality of pixels in the first group, the plurality of pixels in the second group, and the plurality of pixels in the third group are configured to be irradiated with fifth light, the fourth light, and the first light, respectively, which are generated in the backlight at the same time in a third period, wherein the plurality of pixels in the first group, the plurality of pixels in the second group, and the plurality of pixels in the third group are configured to be irradiated with sixth light, the fifth light, and the fourth light, respectively, which are generated in the backlight at the same time in a fourth period, wherein the plurality of pixels in the first group, the plurality of pixels in the second group, and the plurality of pixels in the third group are configured to be irradiated with the third light, the sixth light, and the fifth light, respectively, which are generated in the backlight at the same time in a fifth period, wherein the plurality of pixels in the first group, the plurality of pixels in the second group, and the plurality of pixels in the third group are configured to be irradiated with the second light, the third light, and the sixth light, respectively, which are generated in the backlight at the same time in a sixth period, wherein the first light, the second light, the third light, the fourth light, the fifth light, and the sixth light are different in color, wherein the backlight includes a first region for irradiating light to the first group, a second region for irradiating light to the second group, and a third region for irradiating light to the third group, and wherein the first region, the second region, and the third region emit light of different colors from each other in each of the first period to the sixth period.

20. The liquid crystal display device according to claim 19, wherein the first period, the second period, the third period, the fourth period, the fifth period, and the sixth period are sequentially arranged.

21. The liquid crystal display device according to claim 19, wherein, in each of the first to sixth periods, the plurality of pixels in the first group is sequentially selected, wherein, in each of the first to sixth periods, the plurality of pixels in the second group is sequentially selected, and wherein, in each of the first to sixth periods, the plurality of pixels in the third group is sequentially selected.

22. The liquid crystal display device according to claim 19, wherein three of the first light, the second light, the third light, the fourth light, the fifth light, and the sixth light are generated by mixing any two of the other of the three of the first light, the second light, the third light, the fourth light, the fifth light, and the sixth light.

23. The liquid crystal display device according to claim 22, wherein the three of the first light, the second light, the third light, the fourth light, the fifth light, and the sixth light each are red, green, or blue.

24. A liquid crystal display device comprising:
first to third groups each of which has a plurality of pixels arranged in a matrix form; and
a backlight,
wherein the plurality of pixels in the first group, the plurality of pixels in the second group, and the plurality of pixels in the third groups are configured to be selected and then irradiated with first light, second light, and third light, respectively, which are generated in the backlight at the same time in a first period, wherein the plurality of pixels in the first group, the plurality of pixels in the second group, and the plurality of pixels in the third group are configured to be selected and then irradiated with fourth light, the first light, and the second light, respectively, which are generated in the backlight at the same time in a second period, wherein the plurality of pixels in the first group, the plurality of pixels in the second group, and the plurality of pixels in the third groups are configured to be selected and then irradiated with fifth light, the fourth light, and the first light, respectively, which are generated in the backlight at the same time in a third period, wherein the plurality of pixels in the first group, the plurality of pixels in the second group, and the plurality of pixels in the third group are configured to be selected and then irradiated with sixth light, the fifth light, and the fourth light, respectively, which are generated in the backlight at the same time in a fourth period, wherein the plurality of pixels in the first group, the plurality of pixels in the second group, and the plurality of pixels in the third group are configured to be selected and then irradiated with the third light, the sixth light, and the fifth light, respectively, which are generated in the backlight at the same time in a fifth period, wherein the plurality of pixels in the first group, the plurality of pixels in the second group, and the plurality of pixels in the third group are configured to be selected and then irradiated with the second light, the third light, and the sixth light, respectively, which are generated in the backlight at the same time in a sixth period, wherein the first light, the second light, the third light, the fourth light, the fifth light, and the sixth light are different in color, wherein the backlight includes a first region for irradiating light to the first group, a second region for irradiating light to the second group, and a third region for irradiating light to the third group, and wherein the first region, the second region, and the third region emit light of different colors from each other in each of the first period to the sixth period.

25. The liquid crystal display device according to claim 24, wherein the first period, the second period, the third period, the fourth period, the fifth period, and the sixth period are sequentially arranged.

26. The liquid crystal display device according to claim 24, wherein, in each of the first to sixth periods, the plurality of pixels in the first group is sequentially selected, wherein, in each of the first to sixth periods, the plurality of pixels in the second group is sequentially selected, and wherein, in each of the first to sixth periods, the plurality of pixels in the third group is sequentially selected.

27. The liquid crystal display device according to claim 24, wherein three of the first light, the second light, the third light, the fourth light, the fifth light, and the sixth light are generated by mixing any two of the other of the three of the first light, the second light, the third light, the fourth light, the fifth light, and the sixth light.

28. The liquid crystal display device according to claim 27, wherein the three of the first light, the second light, the third light, the fourth light, the fifth light, and the sixth light each are red, green, or blue.

29. A backlight comprising:

a first region, a second region, and a third region, wherein the first region, the second region, and the third region are configured to emit first light, second light, and third light, respectively, at the same time in a first period, wherein the first region, the second region, and the third region are configured to emit fourth light, the first light, and the second light, respectively, at the same time in a second period, wherein the first region, the second region, and the third region are configured to emit fifth light, the fourth light, and the first light, respectively, at the same time in a third period, wherein the first region, the second region, and the third region are configured to emit sixth light, the fifth light, and the fourth light, respectively, at the same time in a fourth period, wherein the first region, the second region, and the third region are configured to emit the third light, the sixth light, and the fifth light, respectively, at the same time in a fifth period, wherein the first region, the second region, and the third region are configured to emit the second light, the third light, and the sixth light, respectively, at the same time in a sixth period, wherein the first light, the second light, the third light, the fourth light, the fifth light, and the sixth light are different in color, and wherein the first region, the second region, and the third region emit light of different colors from each other in each of the first period to the sixth period.

30. The backlight according to claim 29, wherein the first period, the second period, the third period, the fourth period, the fifth period, and the sixth period are sequentially arranged.

31. The backlight according to claim 29, wherein three of the first light, the second light, the third light, the fourth light, the fifth light, and the sixth light are generated by mixing any two of the other of the three of the first light, the second light, the third light, the fourth light, the fifth light, and the sixth light.

32. The backlight according to claim 31, wherein the three of the first light, the second light, the third light, the fourth light, the fifth light, and the sixth light each are red, green, or blue.

33. A backlight comprising:

first to third regions each of which has a plurality of backlight units, wherein the plurality of backlight units in the first region, the plurality of backlight units in the second region, and the plurality of backlight units in the third region are configured to emit first light, second light, and third light, respectively, at the same time in a first period, wherein the plurality of backlight units in the first region, the plurality of backlight units in the second region, and the plurality of backlight units in the third region are configured to emit fourth light, the first light, and the second light, respectively, at the same time in a second period, wherein the plurality of backlight units in the first region, the plurality of backlight units in the second region, and the plurality of backlight units in the third region are configured to emit fifth light, the fourth light, and the first light, respectively, at the same time in a third period, wherein the plurality of backlight units in the first region, the plurality of backlight units in the second region, and the plurality of backlight units in the third region are configured to emit sixth light, the fifth light, and the fourth light, respectively, at the same time in a fourth period, wherein the plurality of backlight units in the first region, the plurality of backlight units in the second region, and the plurality of backlight units in the third region are configured to emit the third light, the sixth light, and the fifth light, respectively, at the same time in a fifth period, wherein the plurality of backlight units in the first region, the plurality of backlight units in the second region, and the plurality of backlight units in the third region are configured to emit the second light, the third light, and the sixth light, respectively, at the same time in a sixth period, wherein the first light, the second light, the third light, the fourth light, the fifth light, and the sixth light are different in color, and wherein the first region, the second region, and the third region emit light of different colors from each other in each of the first period to the sixth period.

34. The backlight according to claim 33, wherein the first period, the second period, the third period, the fourth period, the fifth period, and the sixth period are sequentially arranged.

35. The backlight according to claim 33, wherein, in each of the first to sixth periods, the plurality of backlight units in the first region are configured to sequentially emit one of the first light, the second light, the third light, the fourth light, the fifth light, and the sixth light, wherein, in each of the first to sixth periods, the plurality of backlight units in the second region are configured to sequentially emit one of the first light, the second light, the third light, the fourth light, the fifth light, and the sixth light, and wherein, in each of the first to sixth periods, the plurality of backlight units in the third region are configured to sequentially emit one of the first light, the second light, the third light, the fourth light, the fifth light, and the sixth light.

36. The backlight according to claim 33, wherein three of the first light, the second light, the third light, the fourth light, the fifth light, and the sixth light are generated by mixing any two of the other of the three of the first light, the second light, the third light, the fourth light, the fifth light, and the sixth light.

37. The backlight according to claim 27, wherein the three of the first light, the second light, the third light, the fourth light, the fifth light, and the sixth light each are red, green, or blue.

38. The backlight according to claim 33, wherein the plurality of backlight units of the first to third regions is arranged in a matrix form.

39. A liquid crystal display device comprising:

a first pixel, a second pixel, and a third pixel; and a backlight, wherein the first pixel, the second pixel, and the third pixel are configured to be irradiated with first light, second light, and third light, respectively, which are generated in the backlight at the same time in a first period, wherein the first pixel, the second pixel, and the third pixel are configured to be irradiated with fourth light, the first light, and the second light, respectively, which are generated in the backlight at the same time in a second period, wherein the first pixel, the second pixel, and the third pixel are configured to be irradiated with fifth light, the fourth light, and the first light, respectively, which are generated in the backlight at the same time in a third period, wherein the second pixel and the third pixel are configured to be irradiated with the fifth light and the fourth light, respectively, which are generated in the backlight at the same time in a fourth period, wherein the first pixel and the third pixel are configured to be irradiated with sixth light and the fifth light, respectively, which are generated in the backlight at the same time in a fifth period, wherein the first pixel and the second pixel are configured to be irradiated with the third light and the sixth light, respectively, which are generated in the backlight at the same time in a sixth period, wherein the first light, the second light, the third light, the fourth light, the fifth light, and the sixth light are different in color, wherein the backlight includes a first region for irradiating light to the first pixel, a second region for irradiating light to the second pixel, and a third region for irradiating light to the third pixel, wherein the first region emits light of different colors in each of the first period to the third period, the fifth period, and the sixth period, and does not emit any of the first light to the sixth light in the fourth period, wherein the second region emits light of different colors in each of the first period to the fourth period and the sixth period, and does not emit any of the first light to the sixth light in the fifth period, and wherein the third region emits light of different colors in each of the first period to the fifth period, and does not emit any of the first light to the sixth light in the sixth period.

40. The liquid crystal display device according to claim 39, wherein the first period, the second period, the third period, the fourth period, the fifth period, and the sixth period are sequentially arranged.

41. The liquid crystal display device according to claim 39, wherein three of the first light, the second light, the third light, the fourth light, the fifth light, and the sixth light are generated by mixing any two of the other of the three of the first light, the second light, the third light, the fourth light, the fifth light, and the sixth light.

42. The liquid crystal display device according to claim 41, wherein the three of the first light, the second light, the third light, the fourth light, the fifth light, and the sixth light each are red, green, or blue.

43. A backlight comprising:
a first region, a second region, a third region, wherein the first region, the second region, and the third region are configured to emit first light, second light, and third light, respectively, at the same time in a first period, wherein the first region, the second region, and the third region are configured to emit fourth light, the first light, and the second light, respectively, at the same time in a second period, wherein the first region, the second region, and the third region are configured to emit fifth light, the fourth light, and the first light, respectively, at the same time in a third period, wherein the second region and the third region are configured to emit the fifth light and the fourth light, respectively, at the same time in a fourth period, wherein the first region and the third region are configured to emit sixth light and the fifth light, respectively, at the same time in a fifth period, wherein the first region and the second region are configured to emit the third light and the sixth light, respectively, at the same time in a sixth period, wherein the first light, the second light, the third light, the fourth light, the fifth light, and the sixth light are different in color, wherein the first region emits light of different colors in each of the first period to the third period, the fifth period, and the sixth period, and does not emit any of the first light to the sixth light in the fourth period, wherein the second region emits light of different colors in each of the first period to the fourth period and the sixth period, and does not emit any of the first light to the sixth light in the fifth period, and wherein the third region emits light of different colors in each of the first period to the fifth period, and does not emit any of the first light to the sixth light in the sixth period.

44. The backlight according to claim 43, wherein the first period, the second period, the third period, the fourth period, the fifth period, and the sixth period are sequentially arranged.

45. The backlight according to claim 43, wherein three of the first light, the second light, the third light, the fourth light, the fifth light, and the sixth light are generated by mixing any two of the other of the three of the first light, the second light, the third light, the fourth light, the fifth light, and the sixth light.

46. The backlight according to claim 45, wherein the three of the first light, the second light, the third light, the fourth light, the fifth light, and the sixth light each are red, green, or blue.

* * * * *

UNITED STATES PATENT AND TRADEMARK OFFICE
CERTIFICATE OF CORRECTION

PATENT NO. : 8,988,337 B2  
APPLICATION NO. : 13/165977  
DATED : March 24, 2015  
INVENTOR(S) : Shunpei Yamazaki et al.

Page 1 of 1

It is certified that error appears in the above-identified patent and that said Letters Patent is hereby corrected as shown below:

In the Specification

At column 13, line 54, "row the" should be --row → the--;

At column 14, line 22, "this" should be --This--;

At column 20, line 66, "63_31" should be --63_3$i$--;

At column 21, line 47, "(1→i)" should be --(1→$i$))--;

At column 21, line 50, "(1→i)" should be --(1→$i$))--;

At column 21, line 53, "(1→i)" should be --(1→$i$))--;

At column 21, line 56, "(1→i)" should be --(1→$i$))--;

At column 21, line 60, "(1→i)" should be --(1→$i$))--;

At column 21, line 65, "(1→i)" should be --(1→$i$))--;

At column 24, line 15, "this" should be --This--;

At column 26, line 43, "(B) red" should be --(B) → red--;

In the Claims

In claim 37, at column 52, line 47, "27," should be --34,--.

Signed and Sealed this  
Fifteenth Day of September, 2015

Michelle K. Lee  
*Director of the United States Patent and Trademark Office*